US012381916B2

(12) United States Patent
Ganguli et al.

(10) Patent No.: US 12,381,916 B2
(45) Date of Patent: Aug. 5, 2025

(54) ZERO TRUST POLICY ENGINE FOR CONTROLLING ACCESS TO NETWORK APPLICATIONS

(71) Applicant: Zscaler, Inc., San Jose, CA (US)

(72) Inventors: Sanjit Ganguli, Great Falls, VA (US); Nathan Howe, Frankfurt (DE); Daniel Ballmer, Enumclaw, WA (US)

(73) Assignee: Zscaler, Inc., San Jose, CA (US)

( * ) Notice: Subject to any disclaimer, the term of this patent is extended or adjusted under 35 U.S.C. 154(b) by 269 days.

(21) Appl. No.: 18/340,517

(22) Filed: Jun. 23, 2023

(65) Prior Publication Data
US 2024/0283826 A1    Aug. 22, 2024

Related U.S. Application Data

(60) Provisional application No. 63/447,393, filed on Feb. 22, 2023.

(51) Int. Cl.
*H04L 9/40* (2022.01)
(52) U.S. Cl.
CPC .......... *H04L 63/20* (2013.01); *H04L 63/0281* (2013.01); *H04L 63/08* (2013.01)
(58) Field of Classification Search
CPC ...... H04L 63/20; H04L 63/0281; H04L 63/08
USPC .......................................................... 726/1
See application file for complete search history.

(56) References Cited

U.S. PATENT DOCUMENTS

| | | | |
|---|---|---|---|
| 11,438,363 B2 | 9/2022 | Howe | |
| 11,596,027 B2 | 2/2023 | Howe | |
| 11,870,818 B1 * | 1/2024 | Sutherland | ............ H04L 63/102 |
| 2014/0208418 A1 * | 7/2014 | Libin | .................. G06F 21/6209 |
| | | | 726/19 |
| 2022/0027431 A1 | 1/2022 | Zheng et al. | |
| 2022/0286428 A1 | 9/2022 | Howe et al. | |
| 2022/0286429 A1 | 9/2022 | Howe et al. | |
| 2022/0286854 A1 | 9/2022 | Howe et al. | |
| 2022/0286860 A1 | 9/2022 | Howe et al. | |
| 2022/0286894 A1 | 9/2022 | Howe et al. | |
| 2022/0286911 A1 | 9/2022 | Howe et al. | |
| 2022/0286912 A1 | 9/2022 | Howe et al. | |
| 2022/0294828 A1 * | 9/2022 | Keiser, Jr. | ........... H04L 63/0245 |
| 2022/0408255 A1 | 12/2022 | Howe | |
| 2023/0328063 A1 * | 10/2023 | Li | ....................... H04L 63/0876 |
| | | | 726/1 |
| 2023/0403282 A1 * | 12/2023 | Smith | ................... H04L 63/102 |

* cited by examiner

*Primary Examiner* — Michael S McNally
(74) *Attorney, Agent, or Firm* — Baratta Law PLLC; Lawrence A. Baratta, Jr.

(57) ABSTRACT

Systems and methods are provided for controlling network access in a zero trust environment. A method, according to one implementation, includes the step of monitoring and controlling access between a user device and a network application using a zero trust policy engine having a Zero Trust Architecture (ZTA) in which no user, user device, or network application is inherently trusted. The method further includes the step of granting trust by allowing the user device to access the network application when identity and context information associated with a user of the user device is verified and when policy checks of the zero trust policy engine are enforced.

20 Claims, 37 Drawing Sheets

Applications

RECOMMENDED SEGMENT DETAILS

| | |
|---|---|
| ID | 20220617-1 |
| Recommended Users | 50 |
| Observed Users | 40(Finance:25, Audit and Control:14, CEO:1) |
| Client Process | logon.exe |
| TCP Port Ranges | [80, 443, 8080, 8100] |
| Grouping Reason | Similar user groups: Finance |

Attack Surface Reduction — 99.9% Reduction 50,000 employees → 50

⬇ Download

> No filter have been applied

Applications (38)

| Application | Current Application Segment | Post and Protocol | Server_IP |
|---|---|---|---|
| budget.acme.com | Application Discovery | 443(TCP) | 10.1.1.1, 10.1.1.100 |
| budget2.acme.com | Application Discovery | 443(TCP) | 192.168.100.121 |
| budget3.acme.com | Application Discovery | 443(TCP) | 10.1.1.1, 10.1.1.100 |
| budget4.acme.com | Application Discovery | 443(TCP) | 192.168.100.121 |
| planning.acme.com | Application Discovery | 8080(TCP) | 10.1.1.1, 10.1.1.100 |
| planning2.acme.com | Application Discovery | 8080(TCP) | 192.168.100.121 |

FIG. 32

SaaS Security Report

Applications    Assets    Alerts & Activities    Security Configuration    3rd-Party Applications

Overview

APPLICATIONS IN USE

84

Sanctioned Applications    12

Unsanctioned Applications    72

APPLICATIONS BY RISK INDEX

Last 7 days ▾

○ 1   17
○ 2   22
○ 3   24
○ 4   14

APPLICATIONS BY CATEGORY

Number of Applications

18   Productivity and CRM Tools
18   Sales & Marketing
12   IT Services
10   Collaboration and Online Meetings Search Application...

Cloud Applications (84)   🗓 Schedule Report   ⬇ Download CSV

| Application | Application Category | Total Bytes | Users | Risk Index | Sanctional State |
|---|---|---|---|---|---|
| Google Search | Web Search | 1.23 GB | 12 | 2 | ⊙ Sanctioned |
| Microsoft Teams | Collaboration and Online Meetings | 102.31 MB | 8 | 1 | ⊙ Sanctioned |
| GDrive | File Sharing | 45.73 MB | 4 | 1 | ⊙ Sanctioned |
| Gmail | Web Mail | 39.51 MB | 5 | 2 | ○ Unsanctioned |
| Google Chat | Instant Messaging | 17.47 MB | 5 | 1 | ○ Unsanctioned |

Sidebar: ZIA, Dashboard, Analytics, Configurations, Administrative Forum, Authorization, Search

FIG. 36

| Control Framework | Dara Center Model | Cloud Model |
|---|---|---|
| Users on company network | Yes | No |
| Device under IT control | Yes | No |
| Corporate network controlled by IT | Yes | No |
| Apps in DC | Yes | No |
| Data in DC | Yes | No |

ZERO TRUST POLICY ENGINE FOR CONTROLLING ACCESS TO NETWORK APPLICATIONS

CROSS-REFERENCE TO RELATED APPLICATION

The present application claims the benefit of priority to Provisional App. No. 63/447,393, filed Feb. 22, 2023, the contents of which are incorporated by reference herein.

FIELD OF THE DISCLOSURE

The present disclosure generally relates to computer networking systems and methods. More particularly, the present disclosure relates to systems and methods for using a zero trust policy engine to monitor and control access of a user device to network applications and file sharing storage devices.

BACKGROUND

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA), Zscaler Private Access (ZPA), Zscaler Digital Experience Monitoring (ZDX), etc., all available from Zscaler, Inc., the applicant and assignee of the present application.

BRIEF SUMMARY OF THE DISCLOSURE

The present disclosure relates to systems and methods for implementing zero trust policies. The systems and methods of the present disclosure may be instantiated in any suitable manner in any network or system, such as a cloud-based system, within an enforcement node, within memory or non-transitory computer-readable media, etc. The systems and methods may be implemented in hardware, software, and/or firmware and distributed accordingly to monitor and control access between user devices and network resources (e.g., applications, databases, file sharing storage devices, etc.) of a network, sub-network, domain, or the like.

According to one implementation, a method may include a step of monitoring and controlling access between a user device and a network application using a zero trust policy engine having a Zero Trust Architecture (ZTA) in which no user, user device, or network application is inherently trusted. The method may also include a step of granting trust by allowing the user device to access the network application when identity and context information associated with a user of the user device is verified and when policy checks of the zero trust policy engine are enforced.

In some additional embodiments, the zero trust policy engine may be configured to act as an "inline switchboard controller" that is configured for monitoring and controlling the access from an inline perspective communicatively positioned between the user device and the network application. The zero trust policy engine, for example, may be configured to control access of the user device by limiting visibility of the network. The zero trust policy engine may include multiple instantiations configured as enforcement nodes distributed through a network in which the user device and network application are operating. For example, each enforcement node may be configured to monitor and control access by one or more user devices.

The step of verifying the identity and context information associated with the user may further include verifying identity information about both the user and the user device and also verifying context information about how the user device is being used to connect to the network application. The method may further include the steps of a) measuring and controlling risk based on a dynamic risk score calculated in response to verifying the identity and context of the user and user device, and b) enforcing the policy checks of the zero trust policy engine policy based on the dynamic risk score to determine whether to block or allow the user device to access the network application.

According to some embodiments, the step of granting trust may include allowing the user device to limited access to the network application or a network file sharing storage medium. The zero trust policy engine, for example, may be part of a security-as-a-service system or cybersecurity system. In some cases, the method may include the step of controlling risk by one or more of a) preventing data compromise, b) preventing data loss, c) detecting and preventing threat, and d) detecting and preventing intrusion. This step of controlling risk may include one or more of a) inspecting inbound and outbound traffic to prevent malware execution and data loss, and b) using adaptive controls based on changes in behavior or context.

The step of enforcing policy checks may include one or more functions of Allow, Block, Caution, Isolate and Stream Pixels, Prioritize, and Deceive. The zero trust policy engine may include a proxy architecture that is independent of pass-through functionality, such as systems associated with firewalls and Virtual Private Networks (VPNs). The zero trust policy engine may be incorporated in a Security Service Edge (SSE) framework, which may include one or more of Secure Web Gateway (SWG), ZTNA, CASB, FWaaS, browser isolation, sandboxing, SSL inspection, and threat protection. The zero trust policy engine may also be incorporated in one or more of a Work From Anywhere (WFA) system, WAN transformation system, and/or secure cloud migration system.

Upon detection of a request by the user device to download sensitive data from a network resource, the method may further include the steps of a) pixelating the sensitive data, and b) streaming the pixelated sensitive data from the network resource to the user device. In response to receiving a merge request related to the merging of two or more companies each having a heterogeneous network, the method may further include the step of seamlessly integrating the heterogeneous networks using application-based or connection-based segmentation to enable users associated with any of the two or more companies to access network applications from any of the heterogeneous networks of the merged companies. Furthermore, in some embodiments, the method may further include the steps of 1) obtaining security-related information associated with one or more of a)

operations and results of the zero trust policy engine, b) applicable networks, c) applicable users, d) applicable user devices, e) accessed network applications, and f) accessed data, and 2) displaying the security-related information on one or more dashboards or user interfaces associated with a network administrator.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a user device, which may be used with the cloud-based system or the like.

FIG. 32 is a screenshot showing an Applications UI.

FIG. 36 is a screenshot of a Software as a Service (SaaS) Security Report showing how ZTA can identify sanctioned and unsanctioned SaaS usage.

DETAILED DESCRIPTION OF THE DISCLOSURE

The present disclosure is directed to various systems and methods for enforcing zero trust policies in a Zero Trust Architecture (ZTA) associated with cybersecurity in a network. In this context, "zero trust" may refer to a scenario in which no user, user device, application, workload, or the like is granted trust until certain conditions are met. That is, most (or all) user devices are not able to simply connect to a network and given unlimited access to any applications or files in that network. Instead, each session between a user device and a network resource (e.g., application, database, etc.) is initially blocked until the user and user device can be verified and other factors are checked. For instance, according to various embodiments of the present disclosure, a zero trust policy engine may be configured to enforce certain policies that monitor and control this access.

In one implementation, a security method includes the step of monitoring and controlling access between a user device and a network application using a zero trust policy engine having a ZTA in which no user, user device, or network application is inherently trusted. The method also includes the step of granting trust by allowing the user device to access the network application when identity and context information associated with a user of the user device is verified and when policy checks of the zero trust policy engine are enforced.

According to various embodiments, the zero trust policy engine may be configured to act as an inline switchboard controller for monitoring and controlling the access from an inline perspective communicatively positioned between the user device and the network application. The zero trust policy engine may be configured to control access of the user device by limiting visibility of the network. The zero trust policy engine may include multiple instantiations configured as enforcement nodes distributed through a network in which the user device and network application are operating. For example, each enforcement node may be configured to monitor and control access by one or more user devices. The step of verifying the identity and context information associated with the user may further include verifying identity information about both the user and the user device and also verifying context information about how the user device is being used to connect to the network application. The method may further include the steps of a) measuring and controlling risk based on a dynamic risk score calculated in response to verifying the identity and context of the user and user device, and b) enforcing the policy checks of the zero trust policy engine policy based on the dynamic risk score to determine whether to block or allow the user device to access the network application.

Example Cloud-Based System Architecture

Figure 1A:
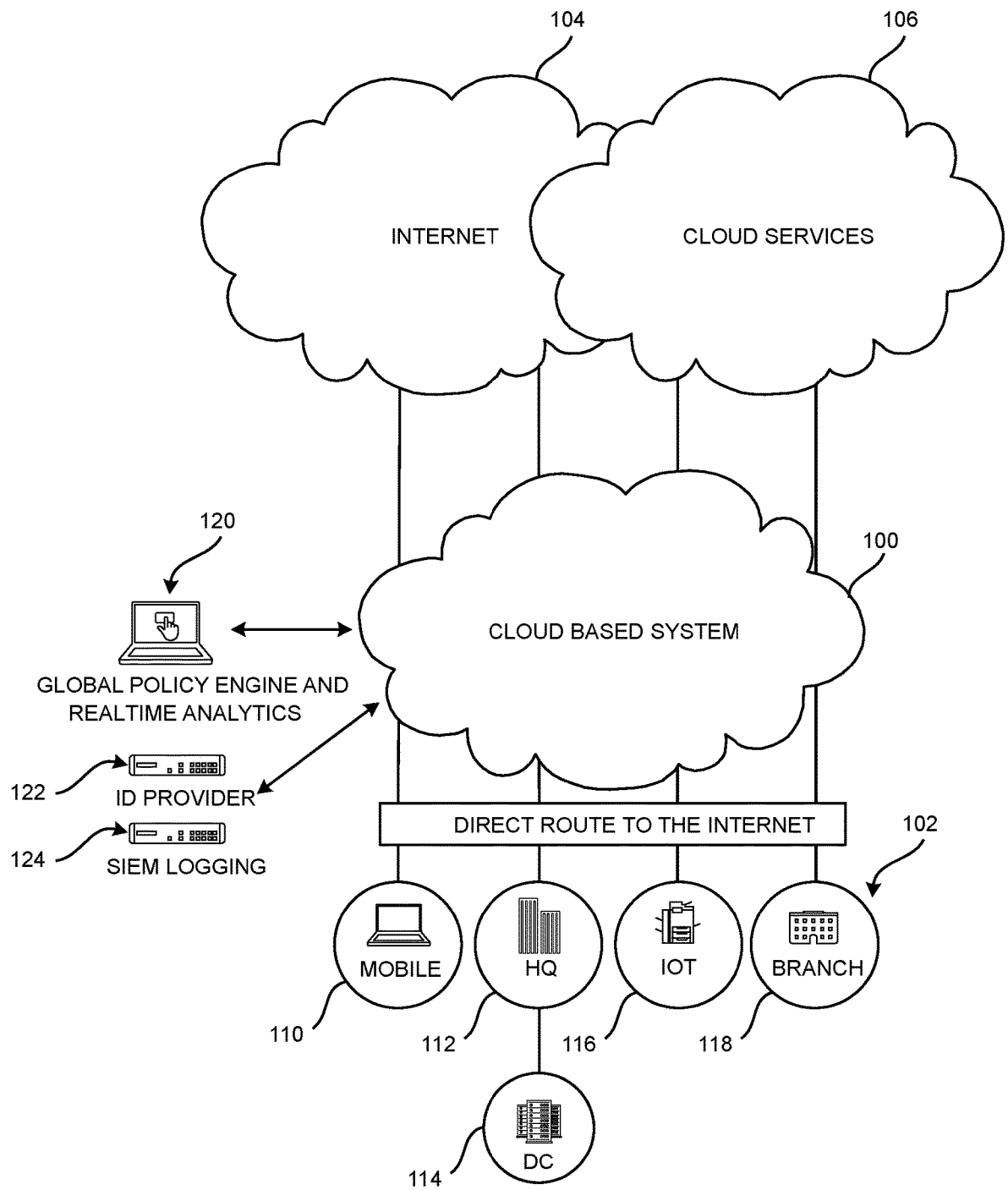
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet 104 as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
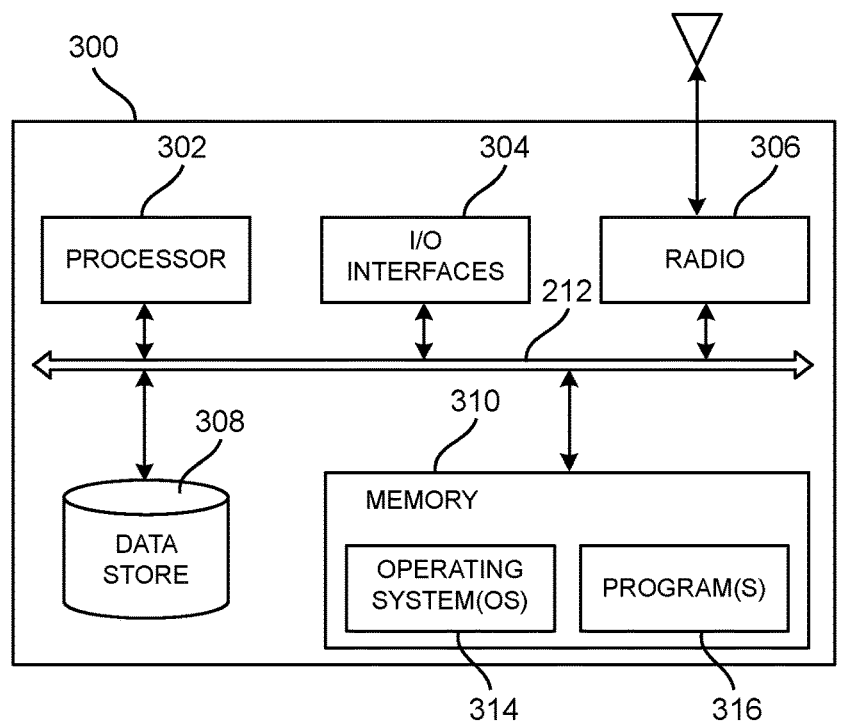

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. Also, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
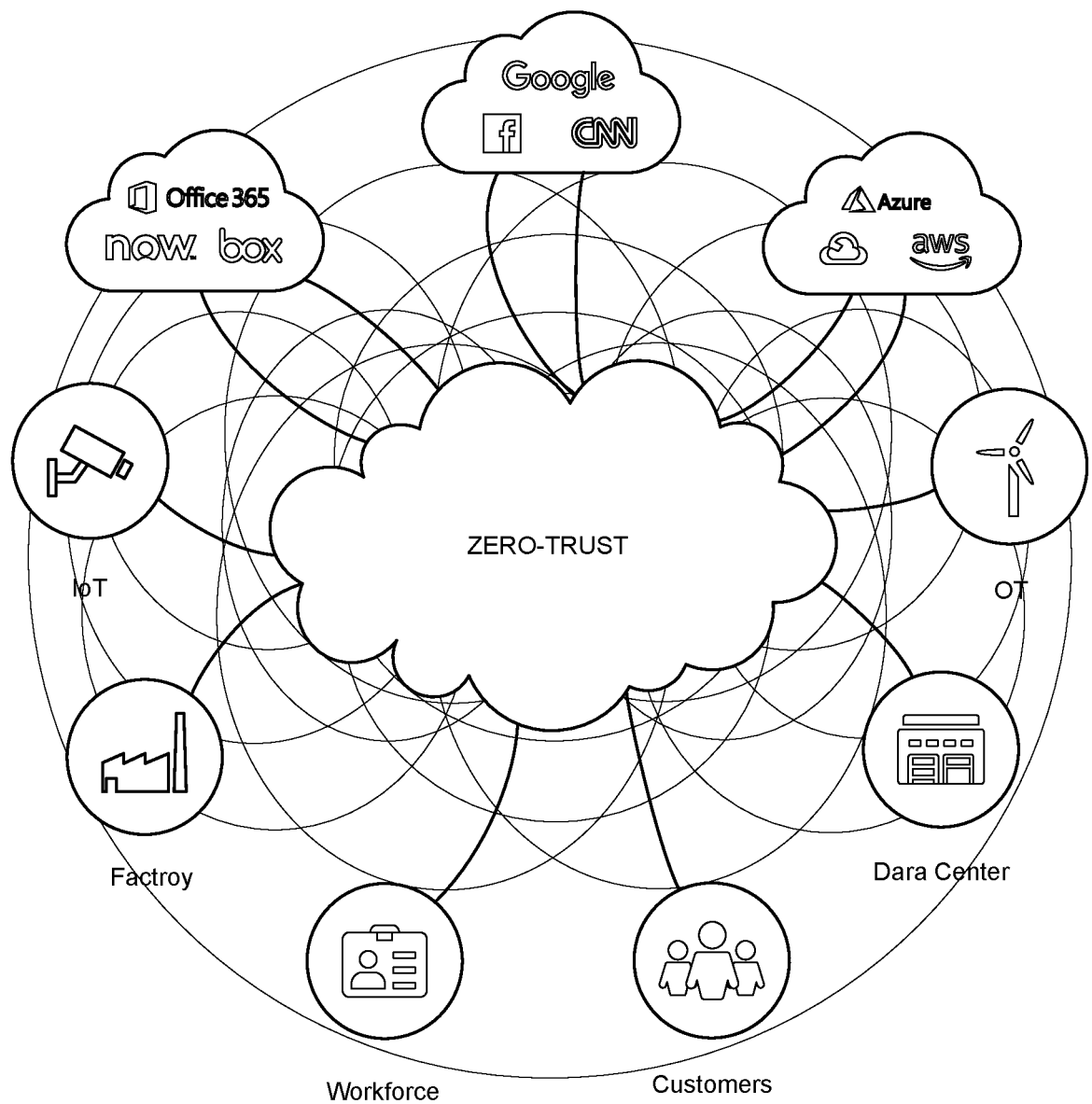
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined micro-segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
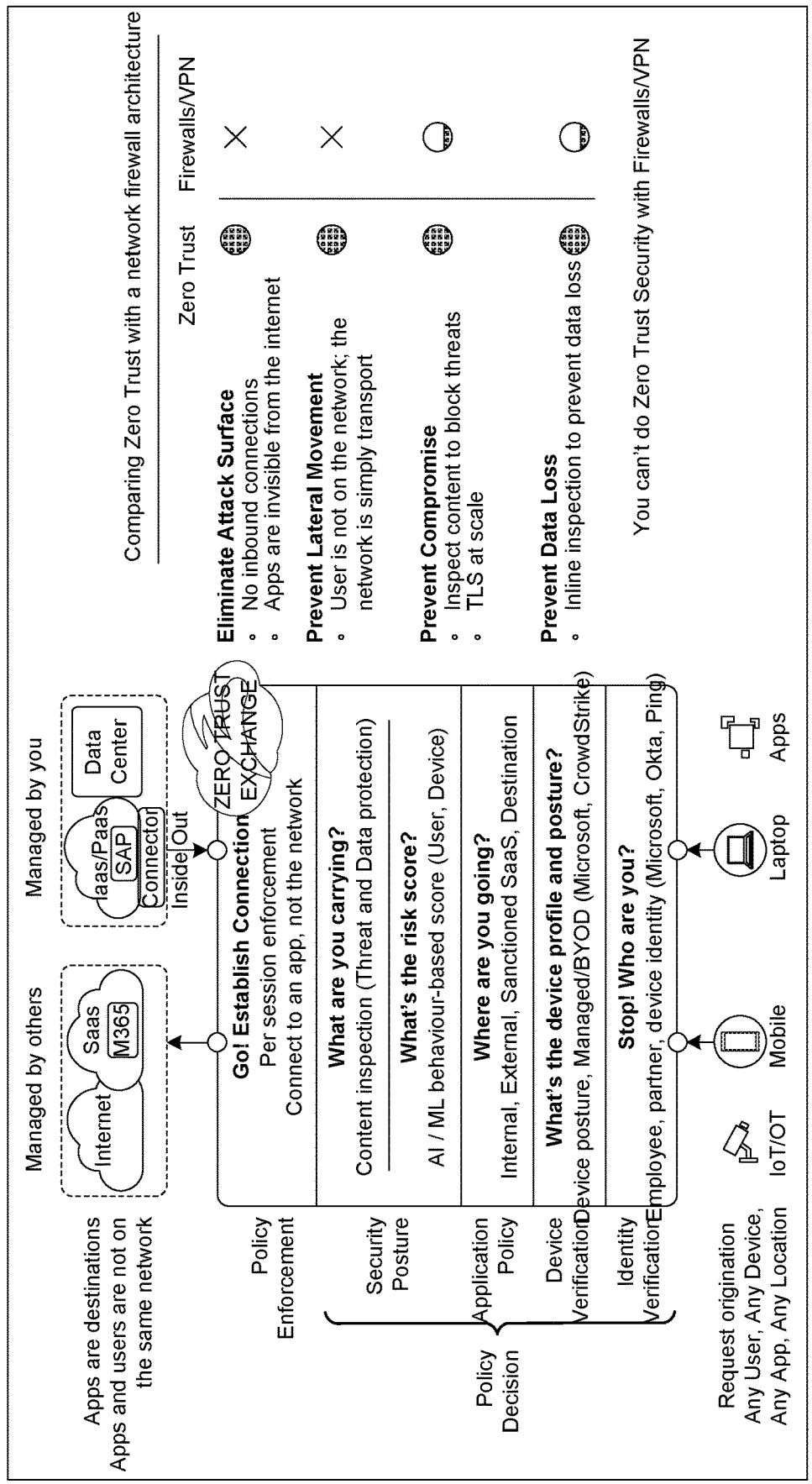
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
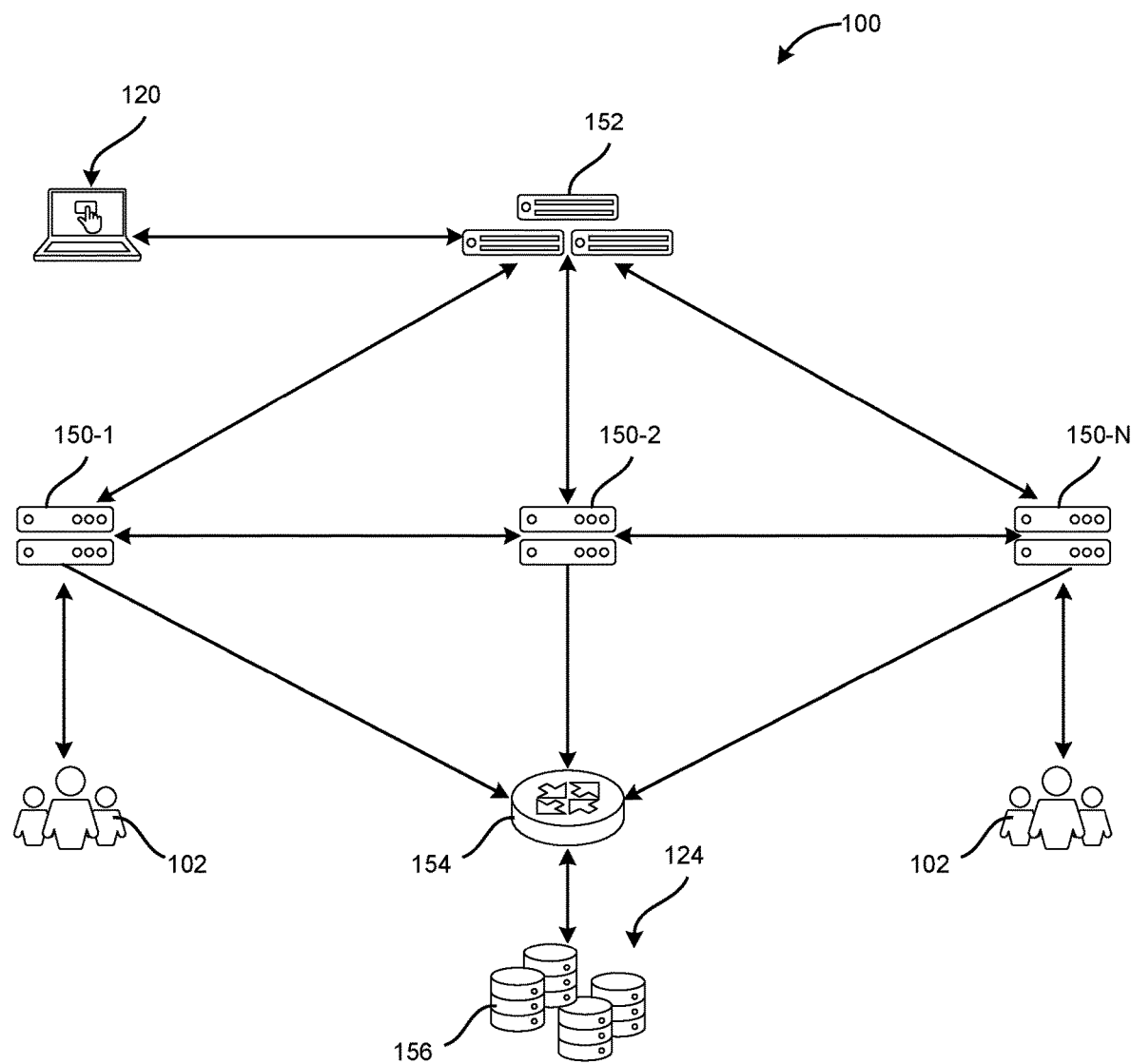
FIG. 2 is a network diagram of an example implementation of the cloud-based system.
Figure 4:
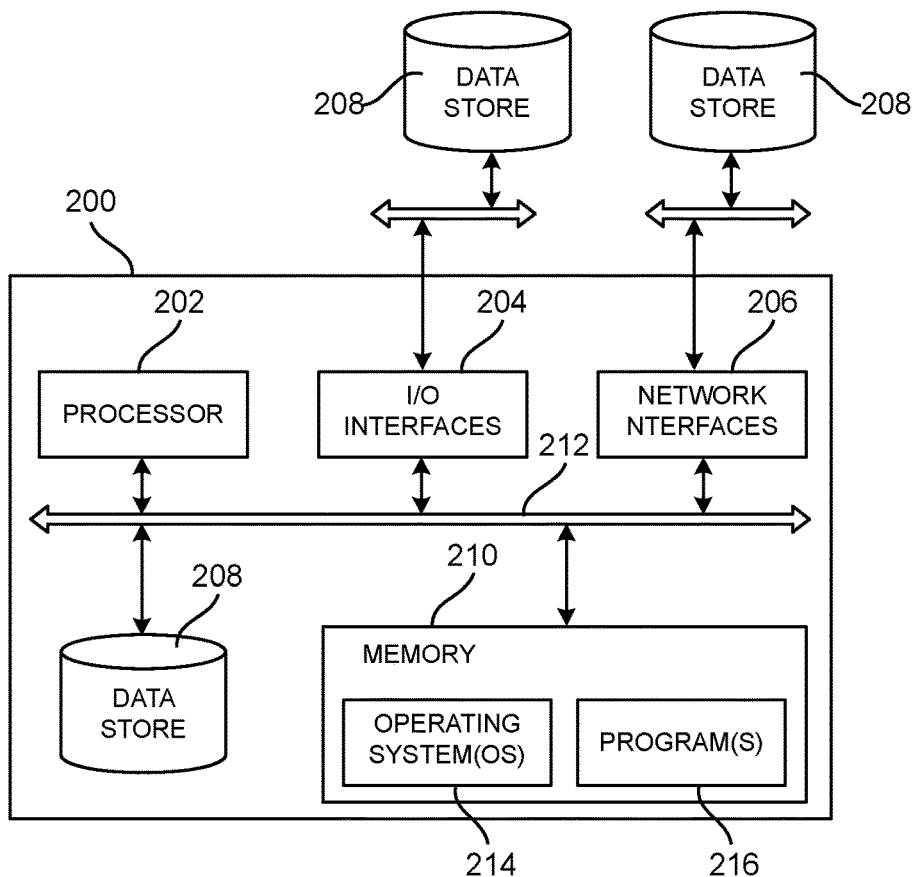
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

User Device Application for Traffic Forwarding and Monitoring

Figure 3:
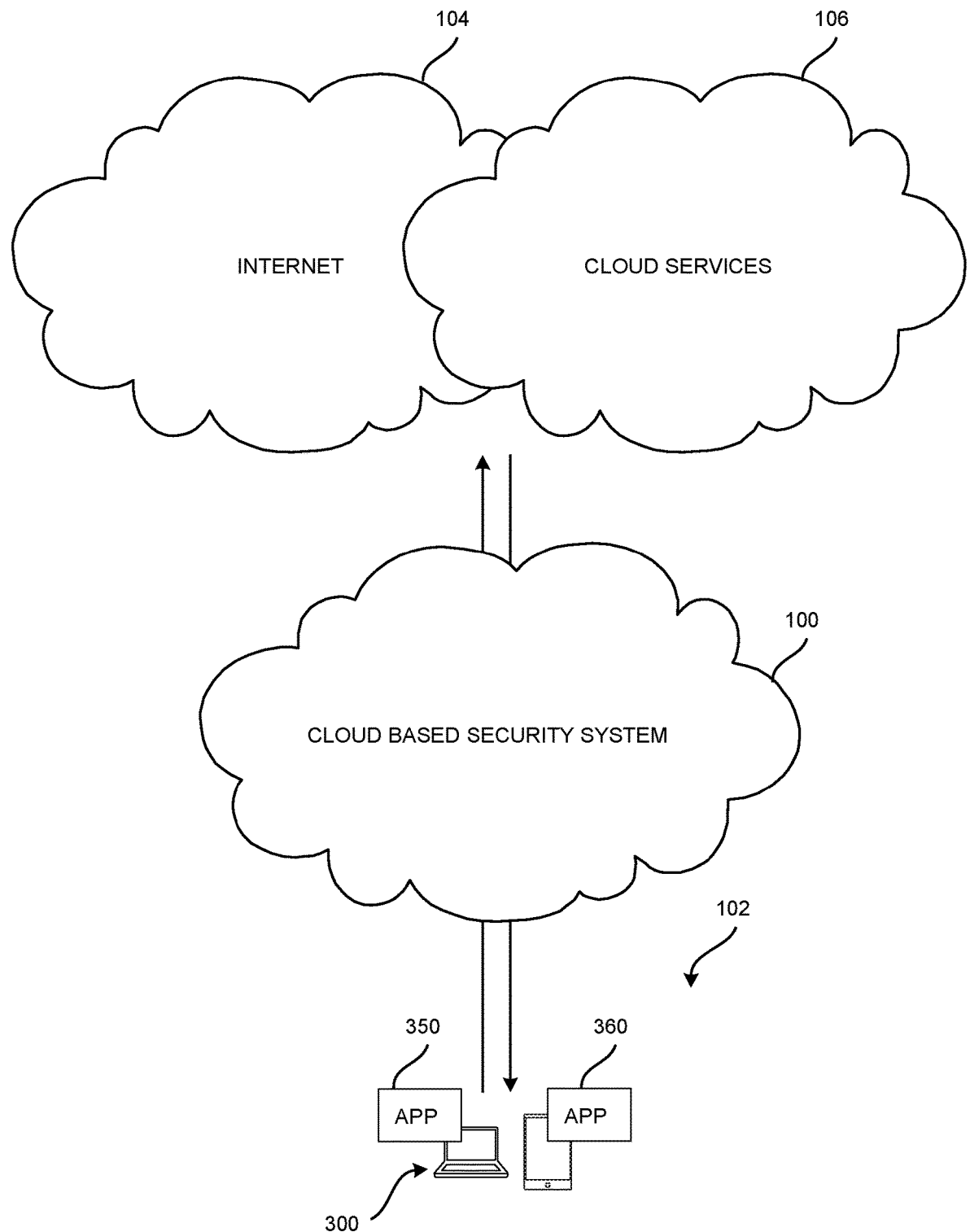
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or user 102 setup.

Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

Figure 6:
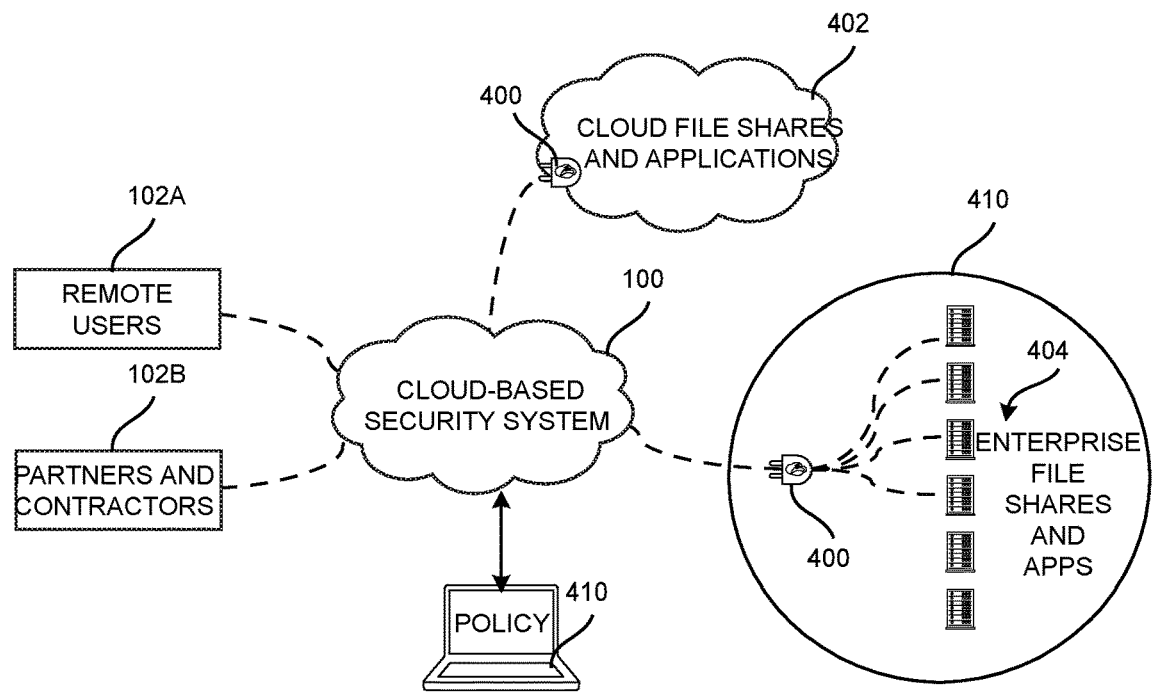
FIG. 6 is a network diagram of a Zero Trust Network Access (ZTNA) application utilizing the cloud-based system.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if it too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is that the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

Digital Experience Monitoring

Figure 7:
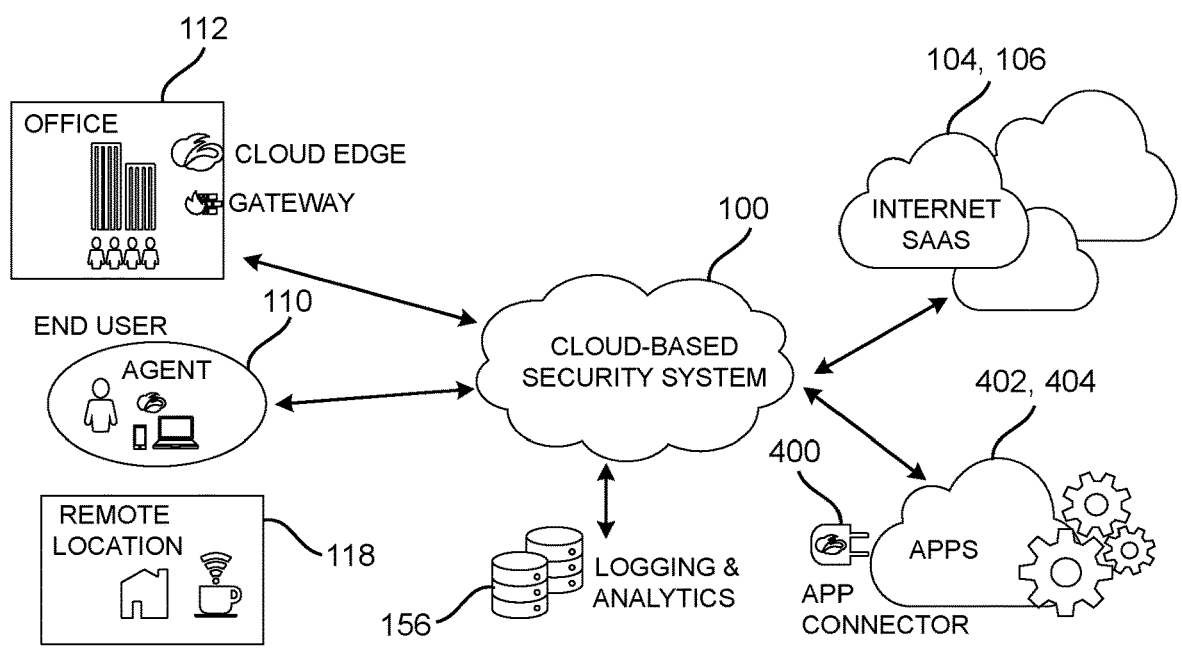
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance, and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-related data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Zero Trust Policy Engines

Figure 8:
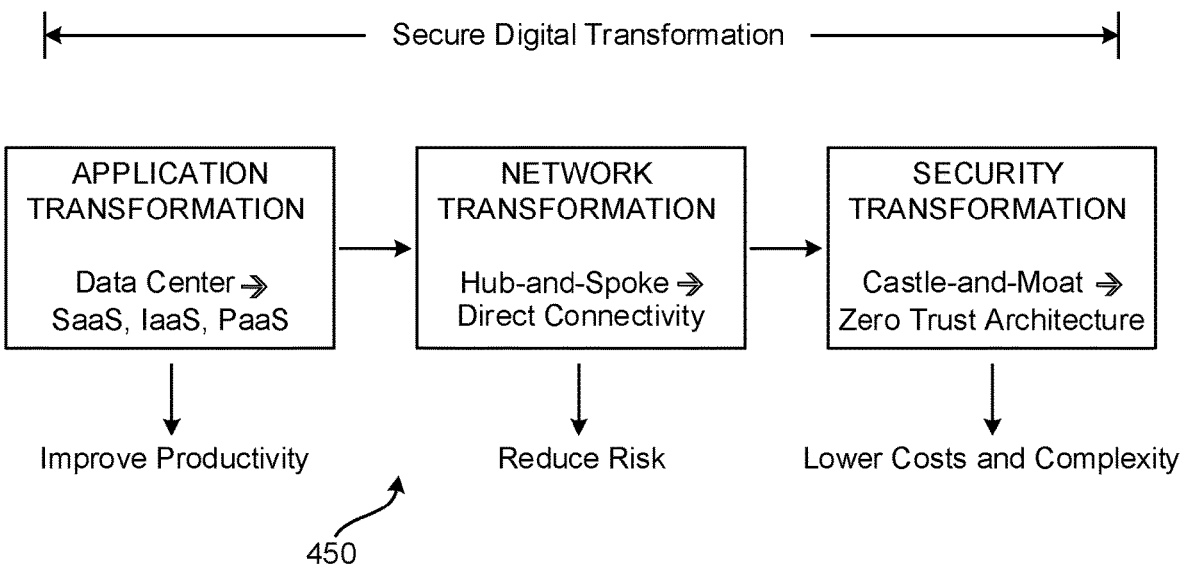
FIG. 8 is a block diagram illustrating components of a secure digital transformation involving a combination of application, network, and security transformations.

FIG. 8 is a block diagram illustrating components of a secure digital transformation 450 involving a combination of application, network, and security transformations. For the past three decades, organizations have been building and optimizing complex, wide-area, hub-and-spoke networks for connecting branches and factories to applications in the data center. The network was secured with a stack of security appliances and firewalls using an architecture known as castle-and-moat security. This was so named because the security stack created a network perimeter (or moat) around the data center (or castle). This architecture prevented access to anyone outside the network, but granted privileges to anyone within. This network and security architecture served the network community reasonably well when applications lived in the data center and users worked from the office.

However, organizations may need to modernize through such a secure digital transformation 450. Secure digital transformation can be achieved by modernizing the organization's applications, networks, workforce, and security. Transformation can make business more agile and more competitive, can improve decision-making as information is available more quickly, and can improve user productivity while security risk goes down. By properly using zero trust architectures, this transformation can also decrease overall cost and complexity.

Secure digital transformation is a journey, not a single project and not a single product. It is also a change of mindset and culture. Inertia is a powerful thing, and people throughout an organization like to continue doing what they've always done. This is why executive leadership (e.g., Chief Technology Officers (CTOs), Chief Information Officers (CIOs), Chief Information Security Offers (CISOs), heads of infrastructure, etc.) needs to drive this secure digital transformation 450 top-down.

While a deep understanding of a Zero Trust Architecture (ZTA) may be necessary for enterprise and security architects, it has become clear that Chief Experience Officers (CXOs) also have many questions about the seemingly vague nature of zero trust and how it enables secure digital transformation. The present disclosure may be configured to target IT and security executives for clarifying these questions. The present disclosure focuses on how zero trust enables secure digital transformation 450, the benefits of zero trust, obstacles to achieving zero trust, CXO best practices, and their journeys to achieve ideal outcomes from zero trust initiatives.

Understanding zero trust in a ZTA should not be limited to just those CXOs responsible for IT. Security breaches, data loss, and poor user experience do not discriminate and affect every level of an organization. Increasingly, anyone in the C-suite and the board are involved in these discussions (or are being quoted in the press following an incident), so an understanding of security posture and zero trust initiatives can be important.

The following description in the present disclosure is organized into seven broad questions and sub-questions that CXOs may ask about zero trust, including what it is, how it is beneficial, what others have done, how to deploy and operate, how to select a solution, and how to navigate obstacles. These questions are answered generally, along with examples of commentary from actual CXOs who have gone through such a transformation themselves.

The present disclosure may be related to other publications from the present Applicant, including, for example, "Seven Elements of Highly Successful Zero Trust Architecture," which focuses on Zero Trust Architecture (ZTA), and "The 7 Pitfalls to Avoid When Selecting an SSE Solution," concentrating on the security service edge (SSE). Both of these publications are targeted toward enterprise and security architects.

Digital transformation is a heavily used term for an all-encompassing undertaking that affects the CXO role more than any other initiative. Wikipedia defines it as "the adoption of digital technology by an organization to digitize non-digital products, services, or operations. The goal for its implementation is to increase value through innovation, invention, customer experience, or efficiency."

Accelerated during the COVID-19 pandemic as businesses were forced to transform, digital transformation is fundamental to an organization's ability to stay competitive. So, while "transformation" has become a buzzword, it is critical for organizations to stay competitive in a world where success is increasingly influenced by technology.

Transforming digitally must be done in a way that is secure, and this becomes problematic as cyber threats increase, workers become more mobile, and apps become distributed. It means that transformation needs to happen in a number of ways, including transforming application, network, and security architecture (as shown in FIG. 8) to cope with the modern trends in cloud and workforce mobility. This ultimately leads to improved productivity, reduced risk, and lower cost and complexity.

Specifically, the fundamental goal of network and security transformation is to address how data is secured and how information is accessed. This is where zero trust architecture comes into play.

Today, adequately providing data security and secure information access is highly challenging for organizations. Over the last 30 years, many companies have been building "hub-and-spoke networks" where every branch is connected to the data center over a private network. They then deployed numerous and disparate security appliances or networking appliances, like routers, switches, and firewalls, to protect the data center where all the applications sat. This was called a "castle-and-moat security" model. Hub—and—spoke networks and castle-and-moat security are legacy architectures that jeopardize data security and proper information access.

This model worked well when the data center was the center of gravity and employees mostly worked in an office. However, application transformation has moved most applications to the cloud where companies are embracing Software as a Service (SaaS) or moving/building applications in the public cloud like Microsoft Azure or Amazon Web Services (AWS). Sensitive data is now everywhere. Additionally, employees and contractors in the post-pandemic workplace are working from everywhere.

Figure 9:
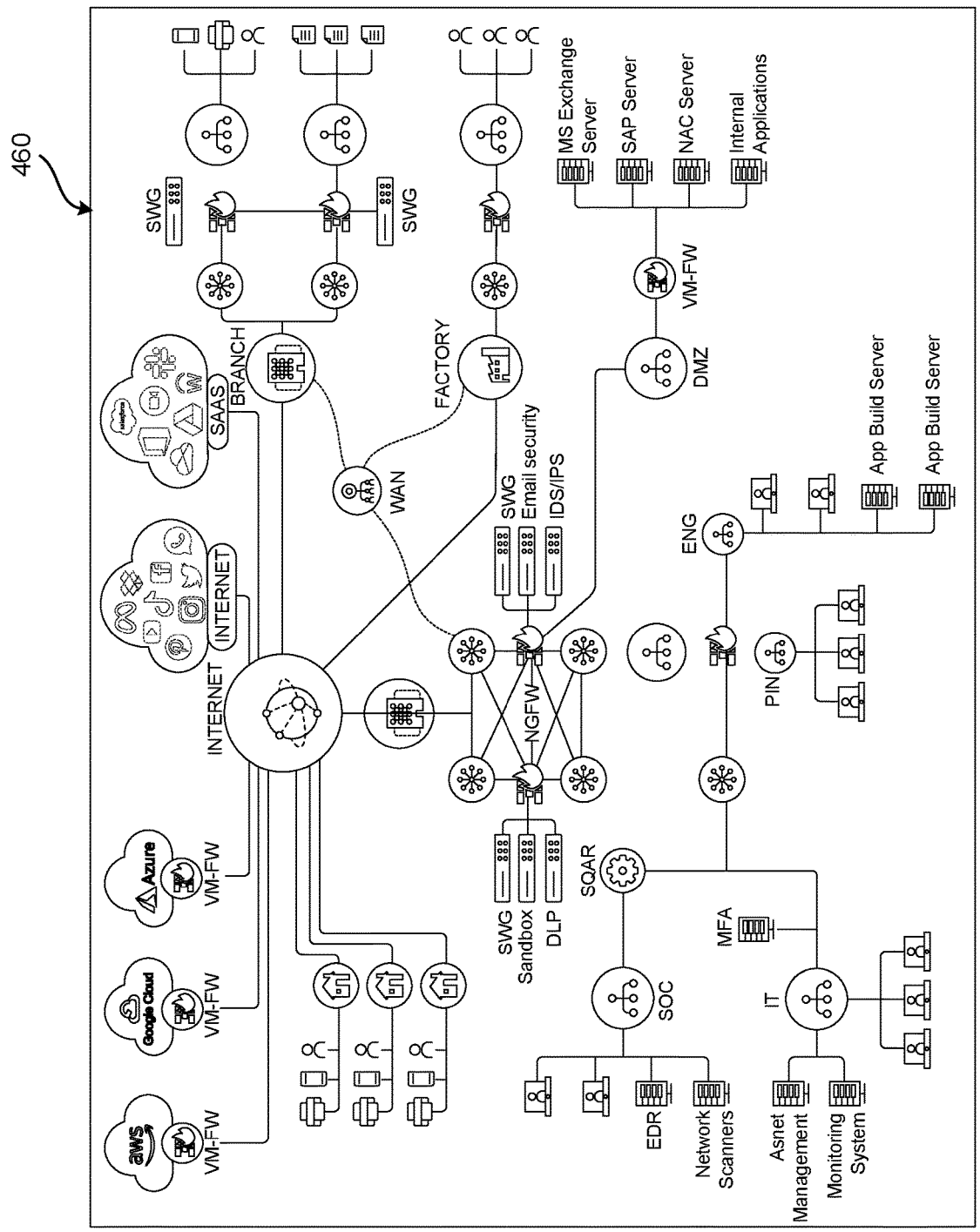
FIG. 9 is a system diagram illustrating an example of a network having a traditional or legacy hub-and-spoke and castle-and-moat security architecture.

FIG. 9 is a system diagram illustrating an example of a network 460 having a traditional or legacy hub—and—spoke and castle-and-moat security architecture. As described herein, the network 460 in its conventional state does not adequately secure business resources. Legacy architectures do not provide an optimal user experience because they introduce unneeded latency and complicated routing to reach wherever the application is hosted. Users should have direct access to applications for both efficiency of use and security, which requires a transition from a hub—and—spoke network to direct connectivity.

When the network transformation (FIG. 8) is completed, security might break down because it is sitting in the data center. This may then necessitate security transformation—a move away from the castle-and-moat model, which is based on firewalls and VPNs. Enter zero trust architecture (ZTA), which transforms both data security and information access.

The challenges caused by legacy network and security architectures are pervasive and long-standing and may require rethinking the way connectivity is granted in the modern world. This is where ZTA is leveraged—an architecture where no user or application is trusted by default. Zero trust is based on least-privileged access, which ensures that trust is only granted once identity and context are verified, and policy checks are enforced.

The National Institute of Standards and Technology (NIST) defines the underlying principle of a zero trust architecture as "no implicit trust granted to assets or user accounts based solely on their physical or network location (i.e., local area networks versus the internet) or based on asset ownership (enterprise or personally owned)" (NIST Publication 800-207). It's an overhaul of the old proverb "Never trust. Always verify."

This approach treats all network communications as hostile, where communications between users and workloads or among workloads themselves are blocked until validated by identity-based policies. It ensures that inappropriate access and lateral movement are prevented. This validation carries across any network environment, where the network location of an entity is no longer a factor and not reliant on rigid network segmentation.

More specifically, after spending millions of dollars on network and cybersecurity, organizations still have major security risks and breaches continuing to occur. One main problem is networking architecture designed in the late eighties and early nineties is centered on IP-based architecture, which companies standardized. Some networking companies build suitable routers and switches in order that enterprises can extend their data centers to every branch office and warehouse, factory, etc. In this networking model, if an employee was granted access to the network, he or she could move laterally and access these data center-hosted applications. This can happen because this is fundamentally a routable network. Users and applications were on the same network. It represented a big breakthrough for networking and distributed computing. Ultimately, this approach might be unable to adapt to the world we live in today.

As the need arose for workers to work remotely, the remote access of virtual private networks (VPNs) extended the network to every household. An employee working from home or on the road could access the network from anywhere and move laterally to access applications. The VPN makes it appear as if the employee is in the office while they are sitting at home or in Moscow or wherever they may be. If there are 50,000 users, the VPN extends the network to 50,000 households, which of course can be quite a security challenge.

Couple this predicament with the embrace of the public cloud. Because users and applications must be on the same network, there is now an extension of the network to every cloud region. To mitigate some of these challenges, and since physical security appliances don't work well in cloud environments, organizations began to spin up virtual firewalls and virtual VPNs in the cloud, deeming it "cloud security." However, in many cases, it is not adequately secure. A firewall is still an IP device, even in the cloud. A VPN is still an IP device, even in the cloud. Wherever those virtual instances are deployed, the network gets extended to those locations. As it starts growing, it turns into a big, flat network that can create headaches as it enables lateral movement for users as well as for attackers.

Basically, there are four key stages, or steps, attackers might take to breach organizations even after organizations have spent millions of dollars on next generation firewalls and VPNs.

1) The Bad Guys Find Your Open Attack Surface.

What is the attack surface? Every IP that resolves to the internet for the company is an attack surface. It may be applications. It may be the firewall and the VPN. All those systems with vulnerabilities, like servers with outdated encryption standards, can be compromised. "If you're reachable, you're breachable." A Zero Trust Architecture (ZTA), however, helps eliminate this attack surface.

2) The Bad Guys Compromise Your Network.

Every compromise comes from the internet and looks for weak links, like unsuspecting users or unprotected devices, to compromise them and set up a beachhead. This beachhead is leveraged to launch further attacks. The goal should be to prevent this initial compromise.

3) The Bad Guys Get on Your Network and Move Laterally Across the Routable Network to Find High-Value Targets.

This is what happened with Uber and Colonial Pipeline, among many other examples, where a single machine becomes infected due to the VPN. Since it is on your corporate network, a hacker can use it to traverse laterally across the whole, flat network and bring every system or application down. Or, they can encrypt your data and ask for ransom. This is when companies try doing network microsegmentation, which is extremely difficult. It is like building a highway system of toll booths and toll roads to regulate access. A ZTA, on the other hand, eliminates lateral threat movement.

4) The Bad Guys Steal Your Data and the Stolen Data is Almost Always Sent to the Internet.

Data is the crown jewel of any organization, and the loss of data means a loss of intellectual property, loss of trust among customers, and a blow to brand reputation. Data loss must be prevented.

In order to minimize the risk of cyber breaches, it would behoove organizations to embrace zero trust architecture (ZTA) for protection from cyber breaches and data loss, and this architecture can't be bolted on firewalls and VPNs. However, doing nothing puts organizations at increased risk of attack, while sacrificing user experience.

Of the four stages of breach, stage 1 (attack surface) and stage 3 (lateral movement) are the least understood by IT and security professionals. This is because traditional network security using firewalls was never designed to tackle these issues. To illustrate, consider two analogies that describe and contrast the zero trust and firewall-based architectures.

How to Prevent Lateral Threat Movement on Your Network

The first step to preventing lateral movement is to not put users on the network, but instead connecting them directly to applications. How does one reach an application without being on the network? It sounds a little complicated, so the following is a simple analogy.

Figure 10A:
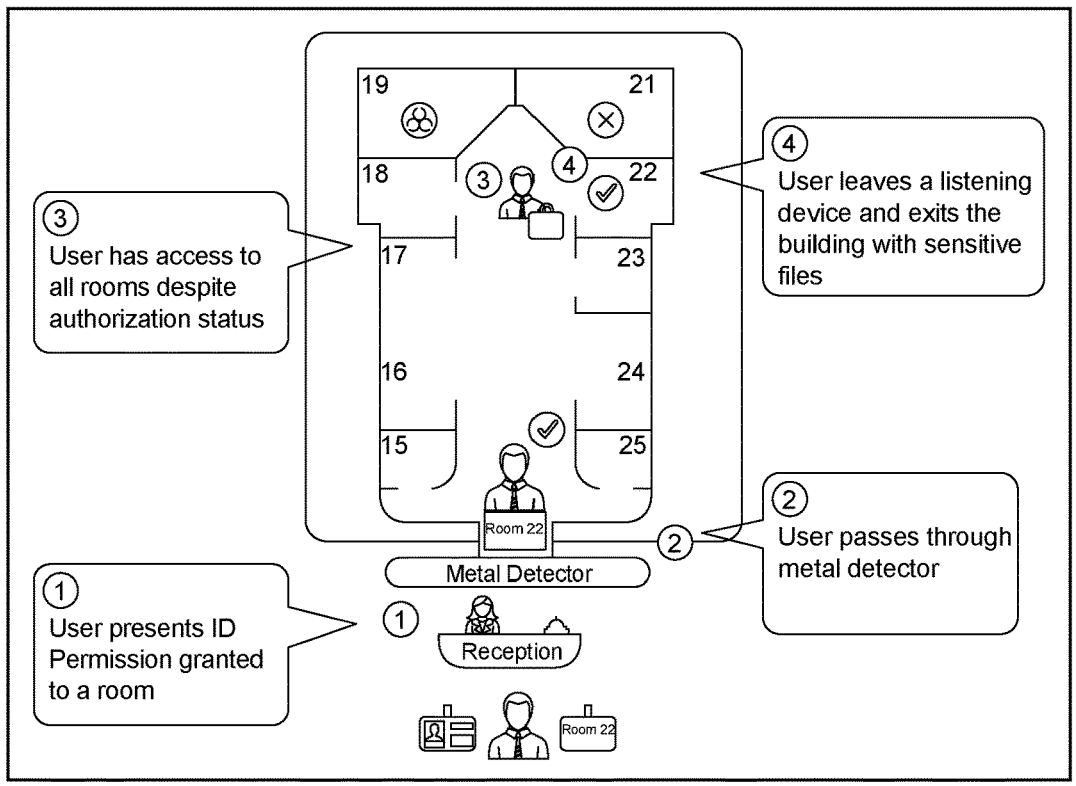
FIGS. 10A and 10B show an example of an analogy for describing a Zero Trust Architecture (ZTA).

As shown in FIG. 10A, if a guest comes to the company headquarters and enters through the front entrance, they're going to be greeted by the receptionist who will check their ID. If the identity of the visitor is verified, they receive a badge. And then, if they are told to go to a specific meeting room without an escort, the visitor may decide to wander around, and go to any room that is unlocked. They may go to an adjacent building since everything is interconnected, then snoop around, steal data, leave behind dangerous material, and depart unnoticed. From a security standpoint, this is not a good scenario. That's why prudent companies do not allow unescorted visitors.

Applying this analogy to lateral threat movement, once the users get on the network (either by being in the office or by using a VPN), they can traverse laterally and find hundreds of applications and systems. How does a company avoid this? The answer is zero trust architecture. To continue with the visitor analogy from above, ZTA would:

a) Remove any identifying company logos and scrub its location from any internet and map sites so visitors can't even find the campus.

b) Remove the tunnels that connect the buildings on campus so each building is isolated, which prevents lateral movement.

c) Move the receptionist far away from the building, so outsiders can't determine which building the receptionist manages.

Figure 10B:
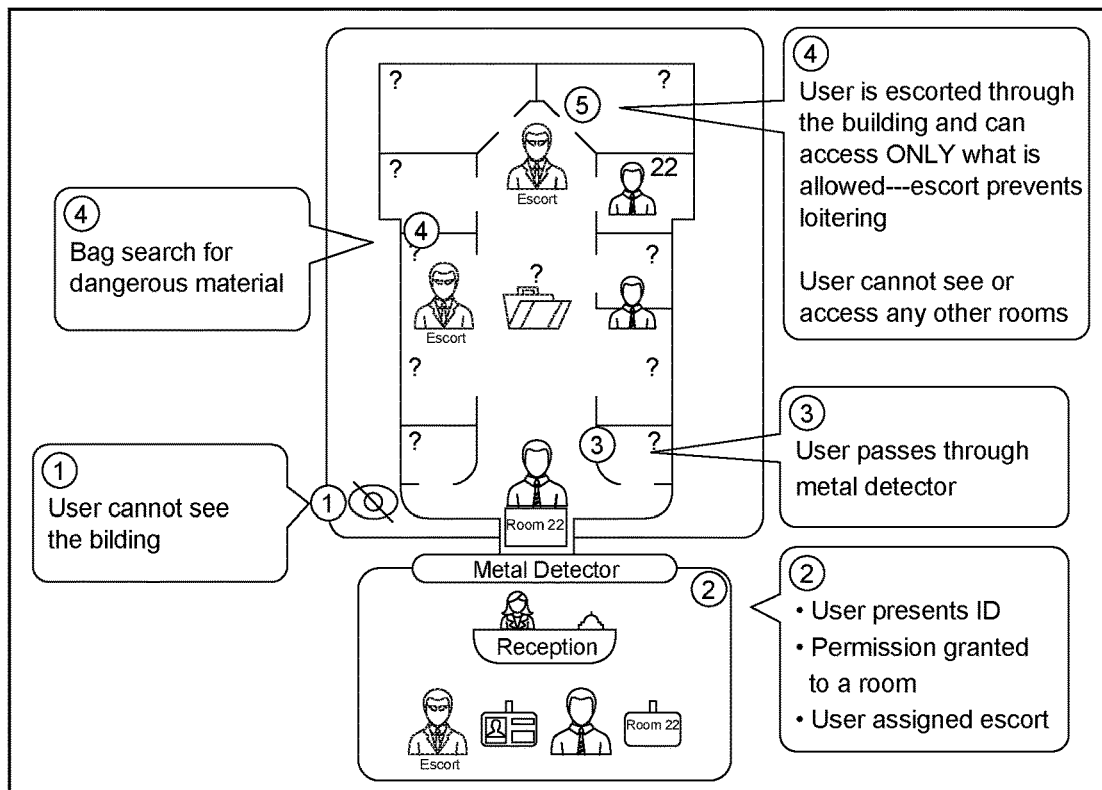

FIG. 10B shows an analogy with respect to ZTA. With ZTA, visitors still stop at the receptionist, have their ID verified, and receive a badge. This time, they'll be taken to a specific room by an escort. Before the visitor enters the room, their luggage is checked for dangerous material (malware, from a security standpoint), and if all is good, the visitor is escorted directly to the specific authorized meeting room, no loitering allowed. Once the meeting is over, the visitor is escorted out. Before the visitor exits, however, their suitcase is checked for any stolen goods; in ZTA, this translates to data loss prevention (DLP). The ZTA model ensures that the visitor can do no harm by limiting their access and checking for malicious behavior.

In these examples, the first building is like the data center, where the applications are hosted. A room is like an application. The buildings represent public clouds like Azure and Amazon Web Services (AWS). The ZTA, by design, acts as a switchboard that connects the user to a particular application within a particular data center or cloud (or a visitor to a meeting room, to extend the analogy).

If a user needs to access a specific file share, that is all that the user connects to, not the company network. The user can't move laterally to access or try to access SAP or other applications. This is how lateral movement is eliminated. It is a core principle of ZTA that traditional technology, like firewalls, is not designed for.

How to Prevent an Attack Surface

Another tenet of zero trust is removing the attack surface, as every breach starts by discovering vulnerable users, devices, or applications to attack.

Figure 11:
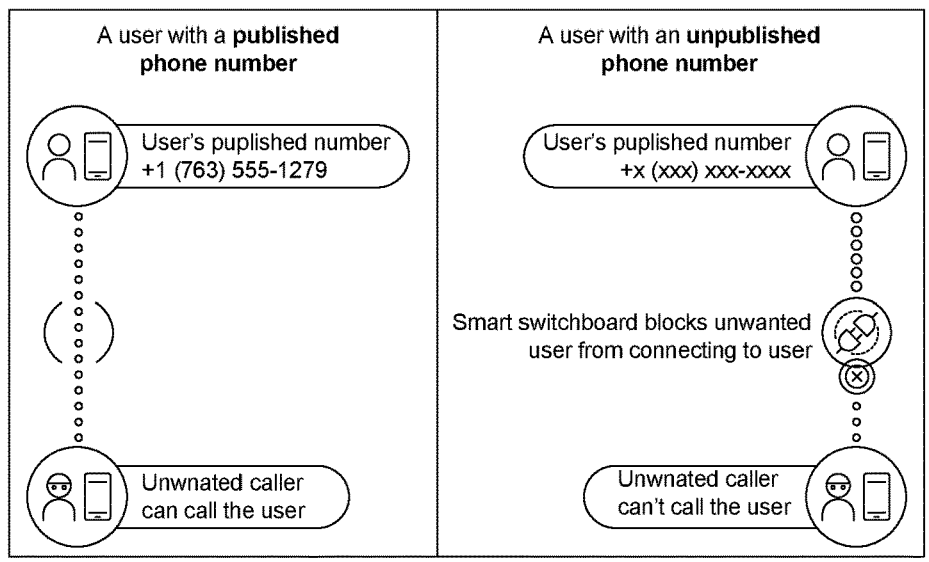
FIG. 11 is a diagram of another analogy of ZTA.

FIG. 11 is a diagram of another analogy of ZTA. In this case, the analogy shows the difference between a user having a published phone number versus having an unpublished phone number. Thus, to provide a parallel to reducing attack surfaces, using a traditional approach, Amy publishes her phone number in a phone book to make it easy for her friends to call her. Chris, a good friend, can find Amy's phone number, call her, and they can have a conversation. The problem is that a million other people can also find Amy's number and call her. Scam artists and spammers can take advantage of this public information. By exposing her phone number, good and bad people can call Amy.

This is similar to the way applications on the internet are published. Applications are published so employees can traverse the internet, discover them, use credentials to get in, and connect. However, this means that bad guys can also find them. They may access apps by using stolen credentials or exploiting their vulnerabilities. They can also create a Distributed Denial-of-Service (DDOS) attack on applications exposed to the internet. Hence, exposing apps has risks. Before zero trust architecture, companies tried to mitigate this risk by creating a DMZ (demilitarized zone) with DDOS prevention solutions and firewalls—again, by building a moat around the castle. As attackers became more sophisticated, old solutions no longer worked. How does one fix this problem?

In Amy's case, she would not publish her phone number. She'd hire a smart switchboard service and provide a list of people who are allowed to connect with her. Chris calls the switchboard, and since he's authorized, the switchboard connects Chris to Amy without sharing her whereabouts or phone number. Anyone else who tries to call Amy is simply dropped because they're not authorized by her to connect.

Applying these same principles is another pillar of ZTA—the user comes to a switchboard. They are validated and if they are allowed to access an application, they are connected. Otherwise, they simply get dropped. They don't even see where and what the applications are, and the attack surface is immediately minimized. Remember: if they can't find you, they can't attack you.

In the analogies described above to explain zero trust architecture, think of applications as the destination. These applications fall in two buckets:
1) Private Applications, which are applications managed internally by the IT department. These are often hosted in a company's data centers, factories, or in IaaS/PaaS public clouds like Azure, AWS, GCP, etc.
2) Public applications, which are applications managed by others. These are SaaS applications hosted and secured by companies like Microsoft 365, Salesforce, ServiceNow, Workday, etc. This also includes destinations such as LinkedIn, BBC, Facebook, Google Search, etc. accessed on the open internet.

Both of these application types (or buckets) are simply destinations. Users, devices, things (IoT/OT), and workloads need to access them. By default, they're all untrusted. The biggest difference between a zero trust architecture and traditional network security architecture is that with ZTA there's no routable network between the user and the application. How do they connect? They go through a zero trust policy engine, which acts as a switchboard for various entities (users, devices, and applications) to communicate with each other over any network.

When entity A tries to reach entity B, the connection is directed through the zero trust policy engine. The first thing that happens is that the connection is stopped.

The ZTA facilitates connections between users and devices, IoT devices, workloads, etc. with application resources, using specified business policies. The ZTA terminates the connection using a proxy architecture. The value of proxy architecture is its ability to shield users from direct access from bad actors. A proxy architecture allows an enterprise to inspect all traffic, identify and isolate threats, prevent data loss, and prevent the execution of malicious code. It also verifies identity using an integrated identity and access management (IAM) system.

Since an identity can be stolen, this alone is not enough. The ZTA also considers the properties of the device in use. Is it managed? Is it unmanaged? Is it BYOD? Where is its geographic location? What is the user trying to do? This context is very important. The proper policy is determined and applied based on all of these factors.

Figure 12:
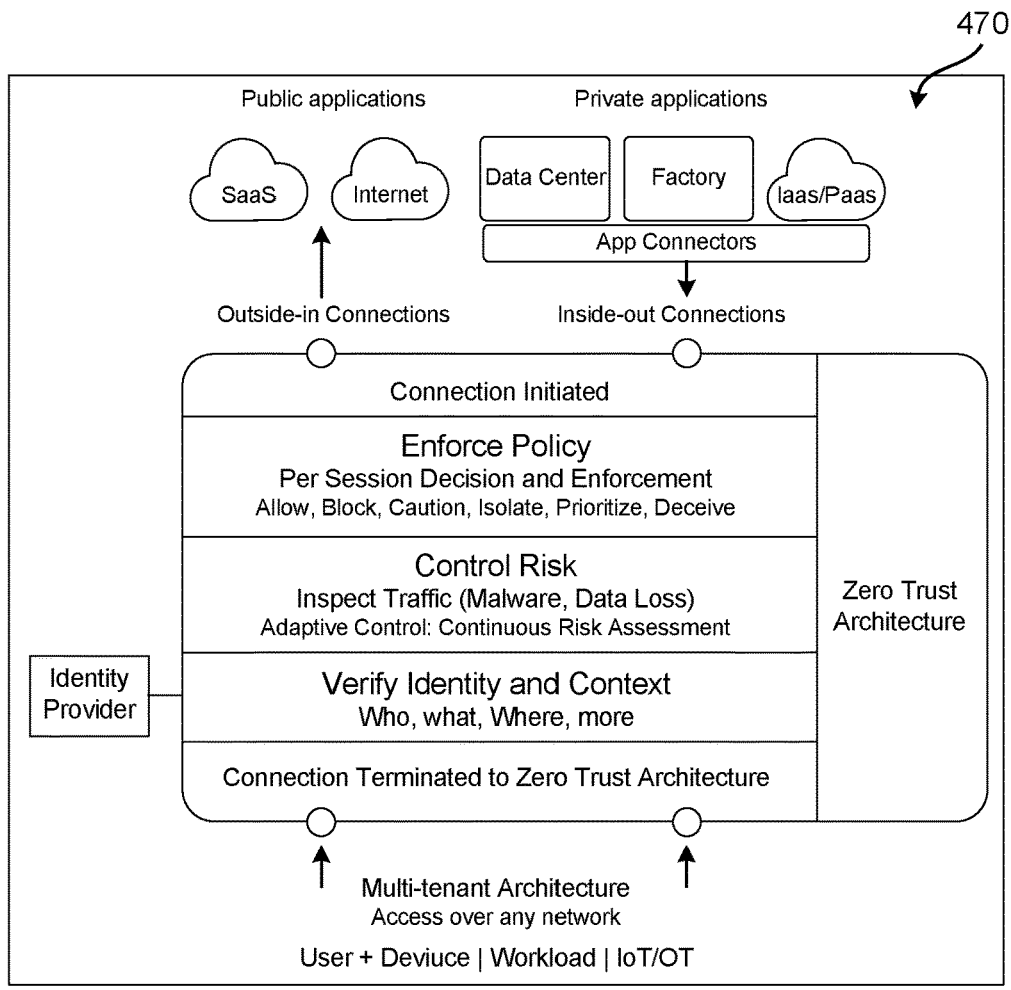
FIG. 12 is a diagram illustrating an embodiment of a ZTA system that provides multiple layers of protection before initiating a connection.

FIG. 12 is a diagram illustrating an embodiment of a ZTA system 470 that provides multiple layers of protection before initiating a connection. If a connection looks valid, the ZTA system 470 takes steps to measure and control risk and prevent compromise and data loss. To do so, the ZTA system 470 inspects all inbound and outbound traffic for malware and data loss.

Beyond this, the ZTA system 470 leverages adaptive control, continuously assessing changes in the user's risk. If it sees anomalous behavior in the traffic or user, it can terminate these connections if anything seems malicious.

Next, the ZTA system 470 is configured to enforce one or more access policies, which may be done per user-initiated session. The enforced access policies may include Allow, Block, Caution, Isolate and Stream Pixels, Prioritize, and/or Deceive. The ZTA system 470 grants users access only to certain applications and hence prevents lateral movement.

Finally, if all checks are in good standing, the ZTA system 470 takes the final step to connect the user to the authorized application. For external applications, this is a simple connection. For internal applications, the ZTA system 470 establishes an inside-out connection using a lightweight software component on the server side. This way, internal applications only resolve to the ZTA cloud and not to the internet; that's how the ZTA system 470 hides the attack surface.

Figure 13:
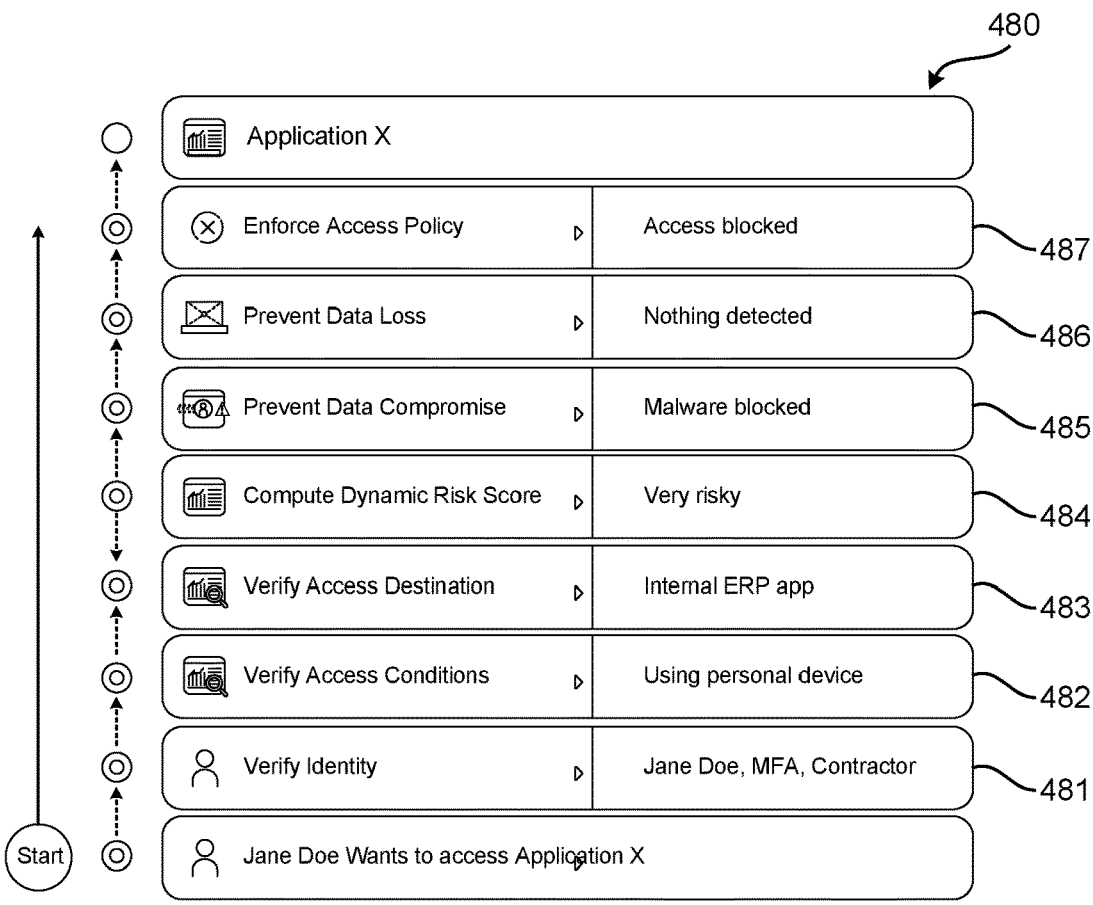
FIG. 13 is a diagram illustrating an embodiment of a ZTA procedure for demonstrating how the ZTA may work in practice to connect a user to an application.

FIG. 13 is a diagram illustrating an embodiment of a ZTA procedure 480 for demonstrating how the ZTA (e.g., ZTA system 470) may work in practice to connect a user to an application. Consider, for example, a scenario where Jane Doe is requesting to access Application X. The ZTA procedure 480 first verifies identity (step 481) to learn, for example, that Jane is a contractor. Next, the ZTA procedure 480 looks into access conditions (step 482) to see how Jane is attempting to connect and learns, for example, that she is on a personal device. The ZTA procedure 480 includes verifying the user's access destination (step 483) to see that Jane, for instance, is attempting to access a sensitive, internal ERP app.

Based on the verified information from steps 481-483, the ZTA procedure 480 is configured to compute a dynamic risk score (step 484) and may determine that these conditions deem her to be "very risky." Next, the ZTA procedure 480 performs an analysis to prevent data compromise (step 485) and to prevent data loss (step 486). While there might be no record of data loss (step 486) in this example, there might be a history of malware downloads (detected in step 485) that had to be blocked. Based on these factors in steps 485 and 486, the ZTA procedure 480 enforces the access policy (step 487) and decides, in this case, to block access.

Now, contrast this method with the traditional architecture of firewalls and VPNs. This is important because many of these legacy architectures may falsely claim to be zero trust architecture. Fundamentally, a firewall is not a proxy architecture. It is categorized solely as pass-through architecture because it can only perform limited inspection and it connects users to the network. By doing this, it enables lateral threat movement. A firewall is facing the internet and basically announces, "I am here, connect with (and attack)

me." In some cases, complexity may be considered to be the enemy of security or reliability. ZTA can provide such a clean and simple design as opposed to the complexities of traditional firewalls and VPNs. Again, as described with respect to FIG. 1C, zero trust provides many advantages over the firewall/VPN architecture (i.e., eliminating the attack surface, preventing lateral movement, preventing compromise, and preventing data loss).

Holistically, zero trust is often described as a strategy or a framework that is not a product, per se, sold by specific vendors. While this is true, in that zero trust is a new way of thinking that permeates across a number of areas and that it is not just architecture or technology, there are practical implementations from vendors, like Zscaler, that have built their solutions with zero trust at their core, as described in the present disclosure. Once deployed, this technology forms the basis of providing secure access for users, things, and workloads to public or private destinations, based on zero trust principles.

When considering solutions based on a zero trust architecture, it is important to understand how this market is described and categorized. The most common taxonomy is called Security Service Edge or SSE (defined by Gartner), which is an umbrella description for solutions offering zero trust architecture, among other functions.

Figure 14:
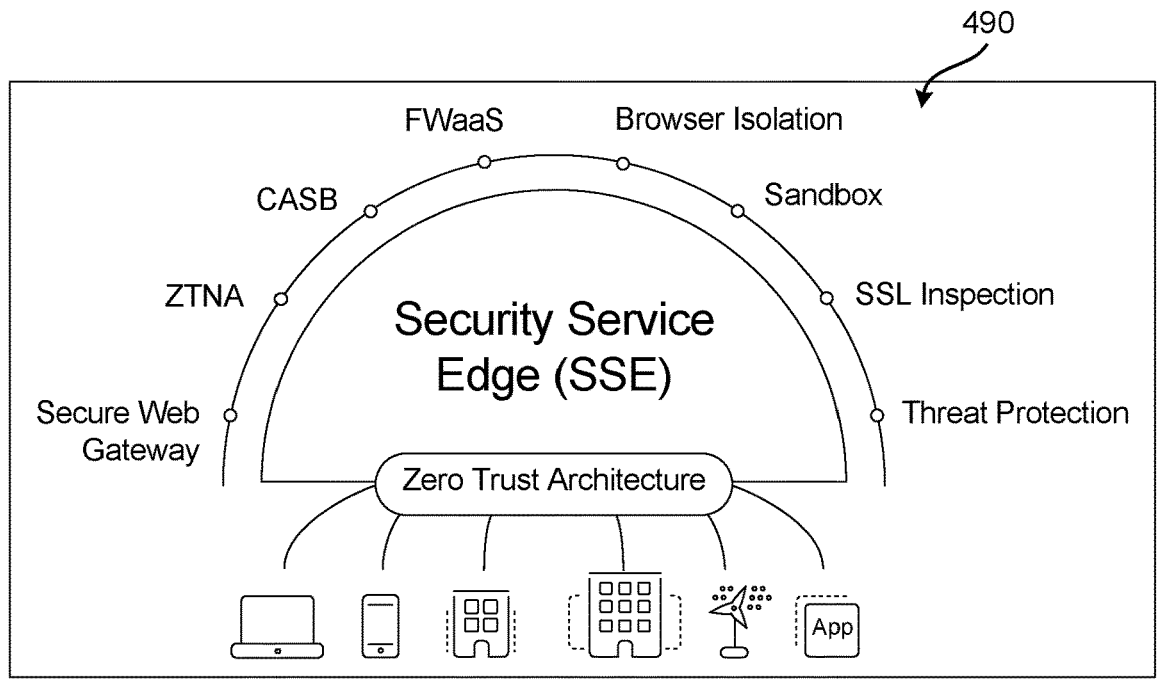
FIG. 14 is a diagram of a framework showing how the concepts of ZTA may relate to the broader concepts of Security Service Edge (SSE).

FIG. 14 is a diagram of a framework 490 showing how the concepts of ZTA may relate to the broader concepts of Gartner's SSE. The framework 490 combines the main elements of network security, which may include a Secure Web Gateway (SWG), Zero Trust Network Access (ZTNA), a Cloud Access Security Broker (CASB), firewall as a service (FWaaS), browser isolation, sandboxing, SSL inspection, threat protection, among other components. These can be provided from the cloud at a location near the end user. ZTNA, in this context, may relate to user-to-private application access. The security stack, once hosted on-premises, may be configured to move to the cloud or the "security edge." This affords all the benefits of cloud-hosted solutions, from the perspective of complexity, scale, maintenance, architecture, etc.

As described with respect to the framework 490 of FIG. 14, ZTA may be closely intertwined with the broader concepts of SSE. Think of SSE as a practical implementation of zero trust architecture, along with other ecosystem components like identity, EDR, or a SIEM/SOAR. The remainder of the present disclosure may refer both to zero trust architecture and SSE as practical methodologies for the implementation of zero trust.

Zero trust, as delivered by an SSE vendor, can have an enormous impact on a number of organizations. It has been proved especially valuable as the pandemic moved workers home, expanded the network, taxed VPN resources, and opened the door to attack. Organizations that transitioned to ZTA were able to send workers home seamlessly, while avoiding the common bottlenecks and security concerns that would normally accompany such a massive workforce shift. That being said, many organizations are still in various stages of their transformation journey.

According to survey results, it was found that, at present, more than 90% of organizations migrating to the cloud have a zero trust security strategy in place, or plan to in the next 12 months. Respondents indicated that zero trust network access (ZTNA) is their #1 priority, based on the need to provide a secure hybrid work environment. They cite their employees' inconsistent access experiences for on-premises and cloud-based applications and data as a top reason to implement a zero trust-based hybrid work infrastructure. In addition, 68% of IT leaders also admit that cloud migration requires a rethinking of traditional security models.

In the survey, the reasons to move to zero trust security were ranked by respondents in this order: (1) improve detection of advanced threats, (2) improve detection of web application attacks, and (3) broaden security to protect sensitive data.

Gartner published "Magic Quadrant for Security Service Edge," John Watts, Craig Lawson, Charlie Winckless, Aaron McQuaid, Feb. 15, 2022. The Magic Quadrant and Critical Capabilities research on the Security Service Edge is currently working on a 2023 version. They made the following prediction about ZTA and SSE, highlighting movement toward a consolidated SSE approach over point solutions:

"By 2025, 80% of organizations seeking to procure SSE-related security services will purchase a consolidated SSE solution, rather than stand-alone cloud access security broker, secure web gateway and ZTNA offerings, up from 15% in 2021."

What the data shows is that traditional network and security architectures are not equipped to provide adequate security and connectivity for the rapidly evolving hybrid workplace. Globally, IT and security leaders have or are actively planning to replace their legacy architectures with a zero trust solution based on an SSE platform.

Figure 15:
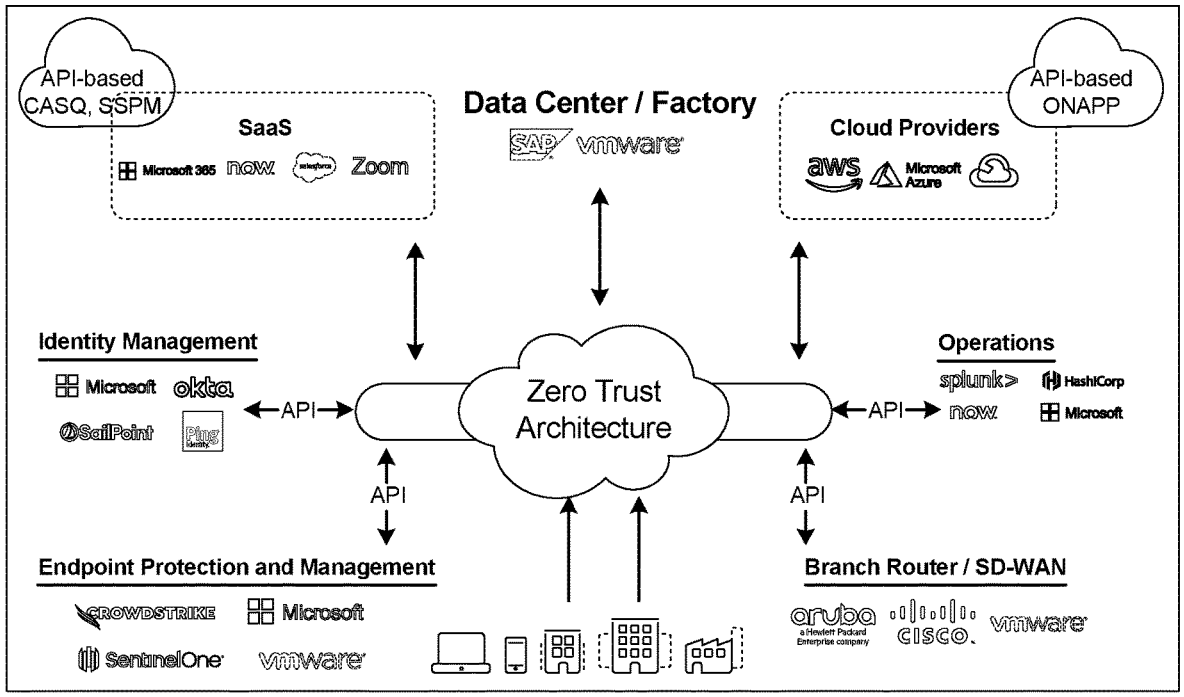
FIG. 15 is a diagram illustrating an embodiment of a network with ZTA, which is integrated with other ecosystem providers to offer comprehensive protection.

FIG. 15 is a diagram illustrating an embodiment of a network with ZTA, which is integrated with other ecosystem providers to offer comprehensive protection. While discussing how ZTA (delivered through an SSE vendor) reduces point products, it does not eliminate other solutions as it is still part of an ecosystem. SSE vendors, in order to ensure fast, easy, and secure deployment and integration, provide integrations with ecosystem partners in the following areas:

a) Cloud Providers/SaaS Vendors—applications that the ZTA provides secure connectivity to, or protection of, when considering workload connectivity b) Identity Management—provides user identity information from which the ZTA makes policy decisions c) Endpoint Protection and Management—protection for endpoint devices that provides context for the ZTA risk calculation and access decisions d) Branch Router/SD-WAN—provide branch network connectivity that works in conjunction with ZTA to create a software-defined network underlay that sends traffic to the SSE cloud e) Operations—ingests logs created by the SSE solution for analysis and threat hunting These integrations, as shown in FIG. 15, allow for orchestration between the ZTA and partner vendors to reduce complexity, total cost of ownership (TCO), and improve security posture. Given an understanding of ZTA, the embodiments of the present disclosure are configured to offer a ZTA-based SSE solution. The systems and methods of the present disclosure may include a zero trust product that securely connects authorized users, devices, and workloads with each other, users to applications, workloads to workloads and even IoT devices to a data lake, by using specified business policies.

What's a business policy? Unlike firewalls and network security, which work on IP addresses and access control lists, the embodiments of the zero trust product (or network with ZTA) are configured to connect a group of users to a group of applications. That's what makes it simple. Through this process, the zero trust product is configured to eliminate many point products and reduces operational overhead.

The Zero Trust Product has Four Broad Capabilities

1) Cyber Threat Protection

Cyber threat protection, holistically making sure this product is protecting users, workloads, and devices from being compromised.

2) Data Protection

Data protection, doing both inline and out-of-band protection and API based securing of SaaS data, as well as securing public cloud data with sophisticated data classification, techniques, and policy engines.

3) Zero Trust Connectivity

Zero trust connectivity, connecting users, branches, and workloads with internal resources connected through the zero trust product rather than a routable network. This accomplishes segmentation with zero trust without having to do network-based segmentation.

4) Optimized User Experience

Optimized user experience in today's world with users working from anywhere and everywhere. A positive user experience is a key consideration. The zero trust product may be configured to help identify and resolve performance issues through an integrated Digital Experience Management (DEM) solution.

These capabilities may be incorporated in or added to various security products. In some examples, various functionality may be included in Zscaler for Users products, which may be configured to monitor and control a user's access to any application from anywhere and provide a good user experience. Zscaler for Users may include various products, such as those described above (e.g., ZIA—to allow secure access to the Internet and SaaS, ZPA—to allow secure access to internal applications, ZDX—to provide digital experience monitoring, etc.). These products, by themselves or among others, may be configured to provide the technology for fully protecting users as described in the embodiments in the present disclosure.

With respect to workloads, for example, a product referred to as Workloads may be viewed as being very much like users since they talk to the Internet and other workloads. In some embodiments, the systems and methods of the present disclosure may further be configured to take the same core technology engine that was built for zero trust (e.g., the zero trust product) and applies it to workloads. The Workloads product can talk to the internet through ZIA (e.g., not through virtual firewalls) and not through squid proxies. They communicate over a zero trust switchboard without having to use a routable network. Another piece in this process may include a Posture Control product, which Gartner calls CNAPP (Cloud Native Application Protection Platform), to ensure workloads are properly configured and not overly exposed.

The systems and methods in this respect may be applied to IoT/OT as well. These IoT/OT devices may have the same lateral threat movement risk. OT systems are expensive today and they are mostly accessed using remote access. VPN is one of the most dangerous things out there, whether it is on-prem or it is through the cloud. Thus, the embodiments described in the present disclosure may also bring zero trust architecture to IoT/OT.

These products may have integration with ecosystem partners (e.g., Microsoft), where a number of touch points (e.g., security integrations, application integrations, and optimized connectivity) simplify the operation of ZTA.

Adoption of zero trust is not driven by new, cool technology—it is driven by business use cases. For most businesses, the three biggest drivers for embracing zero trust architecture are improving business productivity and agility, reducing cyber risk (including potential data loss), and minimizing cost and complexity of various point products and the legacy network.

Figure 16:
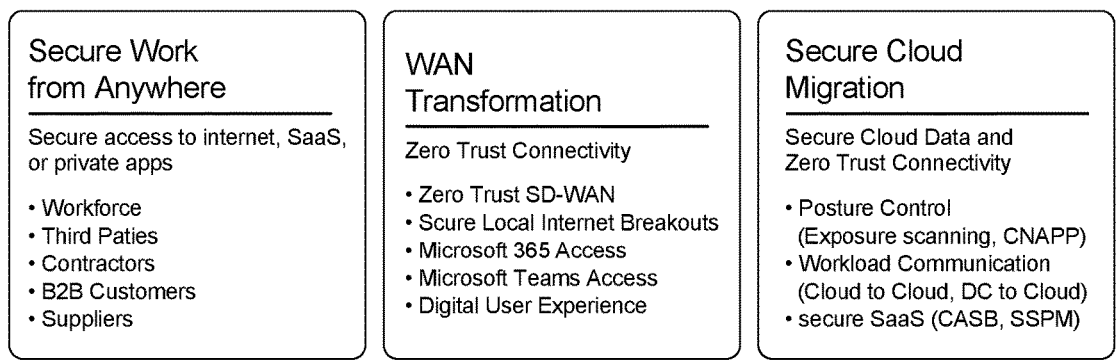
FIG. 16 is a diagram illustrating zero trust use cases.

FIG. 16 is a diagram illustrating zero trust use cases. Zero trust use cases can be broken down into three distinct categories of Work from Anywhere (WFA), WAN transformation, and Secure Cloud Migration. The secure WFA capabilities can provide secure and fast access to applications from any location, on any device (managed or BYOD), to protect employees, third parties/contractors, customers, and suppliers.

There are several key use cases regarding secure WFA:
a) Secure internet access, protecting against both cyberthreat and data loss
b) Zero trust application access, replacing traditional VPNs
c) Secure access for BYOD as a virtual desktop replacement
d) Merger and Acquisition (M&A) integration
e) Zero trust for IoT/OT Secure Internet and Saas Access Zero trust architecture protects access to the internet and Software as a Service (Saas) applications in several ways. Initiator traffic (users, things, or workloads) may not be passed directly to a destination service. First, enterprise controls may be applied. These controls can be applied wherever the initiator is located, thus allowing for optimized consumption of the service. In some embodiments, these controls can protect the initiator and the enterprise, wherever they may be.

Every single access request can be checked for its identity (step 481) and the context of the destination (step 483). Then the content and behavior of the session may be assessed through AI/ML (using decryption for encrypted traffic) to find and block malware (step 485) and prevent data loss (step 486).

One goal of this process is to ensure that the enterprise is protected against bad things "coming in" and good things "going out," thus delivering security and granular protection for each service. Granular protection includes serving just a pixelated version of the application using browser isolation. This granular policy follows the initiator, so that the same protection is provided uniformly.

Figure 17:
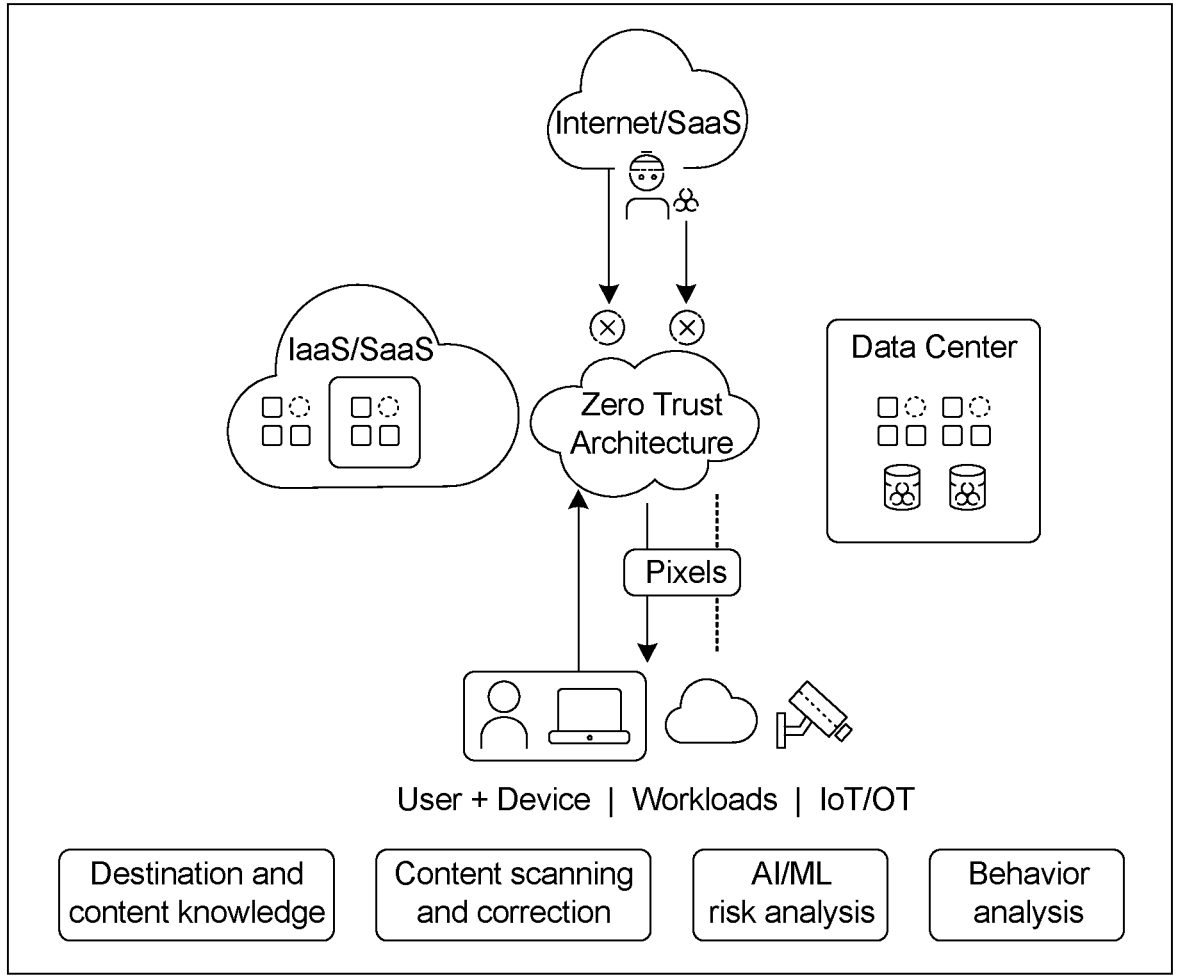
FIG. 17 is a diagram illustrating another embodiment of a system with a ZTA, which can provide secure access to internal and external resources through a variety of means, including browser isolation, pixel streaming, etc.

FIG. 17 is a diagram illustrating another embodiment of a system with a Zero Trust Architecture (ZTA), which can provide secure access to internal and external resources through a variety of means, including browser isolation, pixel streaming, etc. ZTA not only can provide superior cyber protection, but also it can allow the replacement of various hardware appliances, including secure web gateways, proxies, and certain firewalls.

The same controls used to protect against cyber threats may then be used to protect enterprise data from being lost. The ZTA performs both inline and out-of-band data protection, allowing the inspection and control of data in motion and files at rest. Its ability to read encrypted traffic allows it to find and block sensitive data in transit, and perform other advanced DLP functions.

Figure 18:
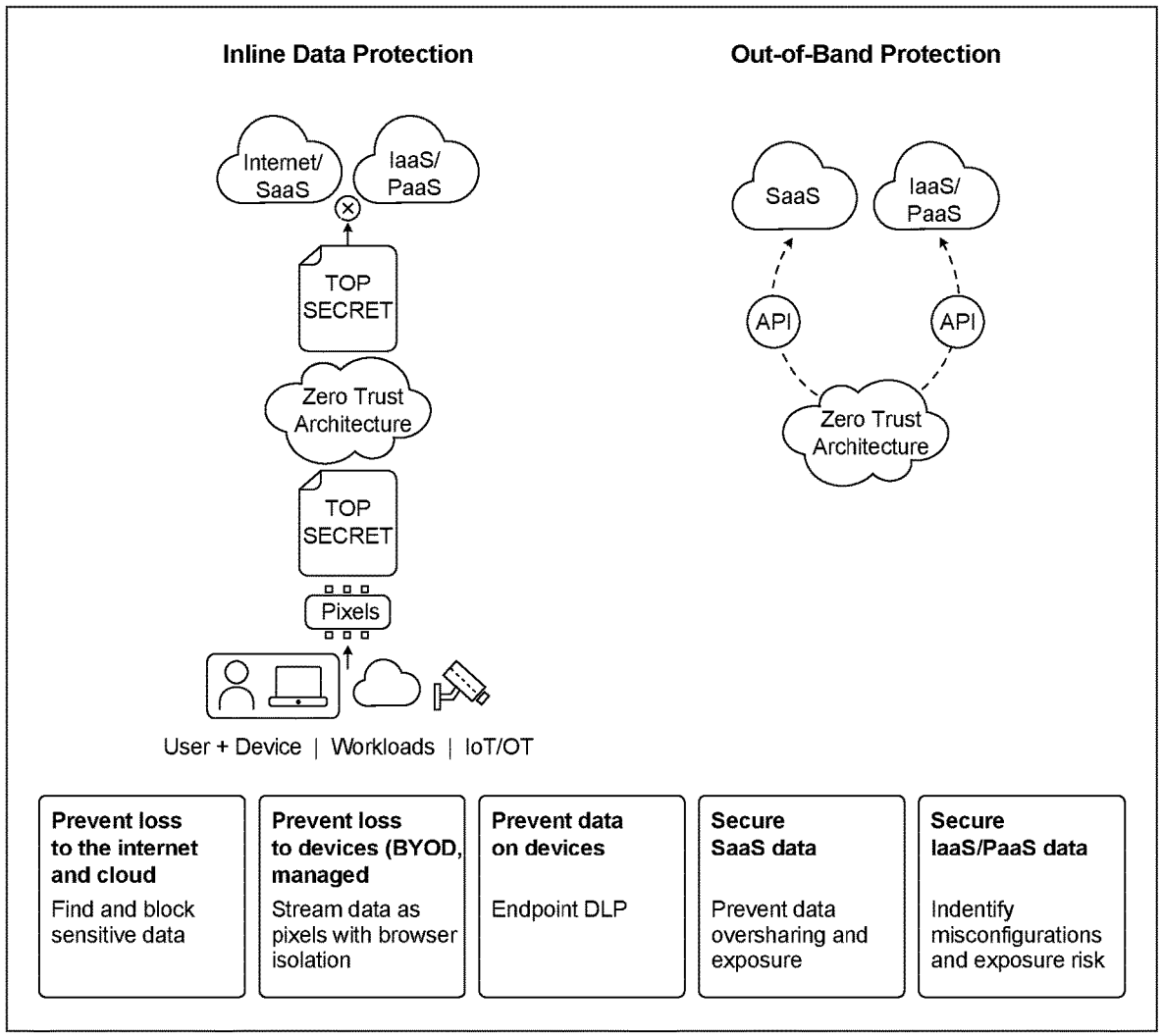
FIG. 18 is a diagram illustrating an embodiment of ZTA for providing inline and out-of-band security to protect data, apps, users, devices, workloads, etc.

FIG. 18 is a diagram illustrating an embodiment of ZTA for providing inline and out-of-band security to protect data, apps, users, devices, workloads, etc. Inline prevention controls may be configured to leverage isolation techniques to block sensitive data being downloaded to BYOD or managed devices by streaming the data as pixels. Endpoint data loss prevention may go further by protecting the data on devices from being downloaded to a USB drive, for example. Out-of-band data protection technology is configured to protect data living in the cloud by preventing oversharing and exposure as well as identifying misconfiguration with popular cloud platforms where sensitive data may reside. Both of these techniques utilize advanced ways to classify data, including AI/ML, optical character recognition, and integration with Microsoft information protection standards.

Zero trust architecture is deployed for secure access to private apps hosted in the IaaS/PaaS cloud or in a data center. By allowing authorized initiators policy-enforced access to destinations, it fundamentally removes the need for legacy network-based access, like VPNs.

Secure Private Application Access

Figure 19:
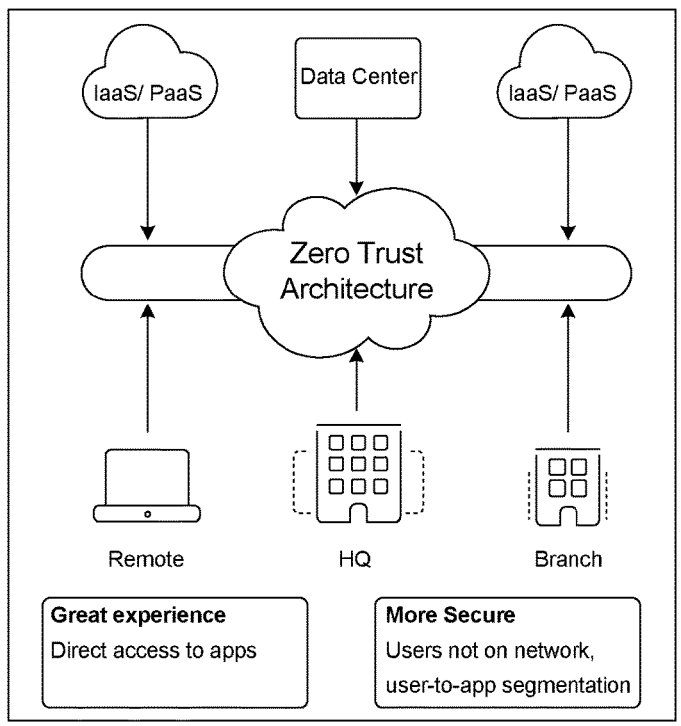
FIG. 19 is a diagram illustrating a case of using ZTA for application access to private applications.

FIG. 19 is a diagram illustrating a case of using ZTA for application access to private applications. These private applications can be hosted in a data center (e.g., enterprise) or cloud and may be configured to minimize the attack surface by preventing inbound connections. By never exposing services to unauthorized users, IT leaders eliminate much of an organization's attack surface (exposed destinations and services). Removing the legacy routable network greatly simplifies the technology estate and allows IT leaders to deliver services to any initiators that require access to internal resources. This can be extended to on-premises users with what is commonly known as Universal ZTNA.

Figure 20:
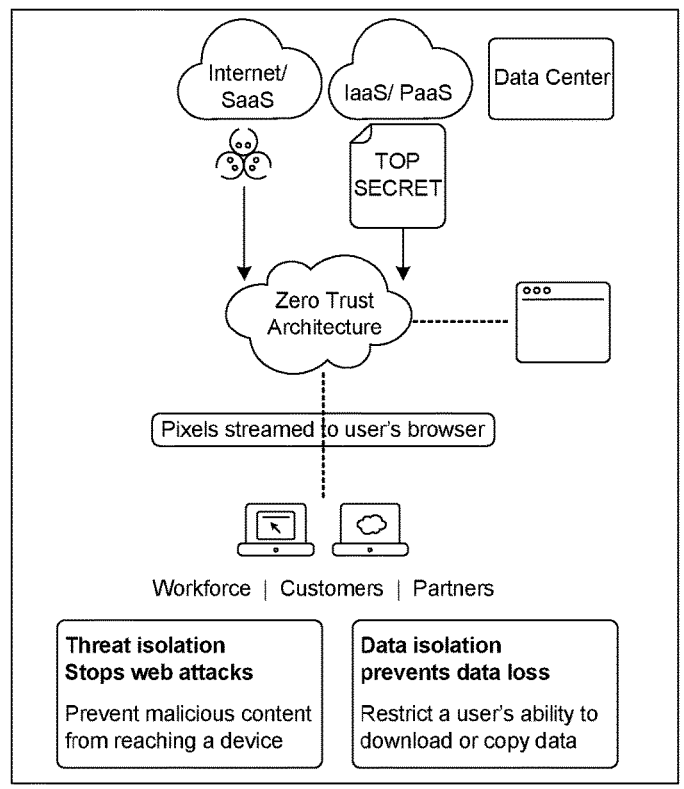
FIG. 20 is a diagram illustrating how ZTA can secure Bring Your Own Device (BYOD) technology and eliminate Virtual Desktop Infrastructure (VDI) by using cloud browser isolation.

This granular element of ZTA delivers the app-level segmentation that has historically been difficult to achieve at the network level, allowing the creation of three types of segmentations based on business policy:
 a) User-to-application segmentation
 b) Workload segmentation in hybrid and multi-cloud environments
 c) Identity-based micro-segmentation for apps/processes Secure Bring Your Own Device (Byod) Access and Virtual Desktop Infrastructure (Vdi) Replacement FIG. 20 is a diagram illustrating how ZTA can secure Bring Your Own Device (BYOD) technology and eliminate VDI by using cloud browser isolation. Every IT leader battles with the need to allow external, third parties access to their internal resources. This coupled with the rise of BYOD, even among employees, has left few options for uniformly secure access paths from initiators to destinations.

Whereas historically virtual desktop infrastructure (VDI) instances were the only option to secure these users, ZTA threat and data protection can be extended to BYOD using cloud browser isolation. This renders content in an air-gapped browser, and streams pixels to the user's browser rather than the full HTML. For example, partners could view the contents of an inventory app but not download, copy, or print anything.

For internal employees accessing sensitive applications, a company's policy can use browser isolation for granting view-only access to untrusted devices. Virtual desktops hosted in on-prem server farms were often the only way to achieve this secure access, but browser isolation (integrated as part of ZTA hosted in the cloud) offers a powerful alternative.

Merger and Aquisition (M&a) Integration

Figure 21:
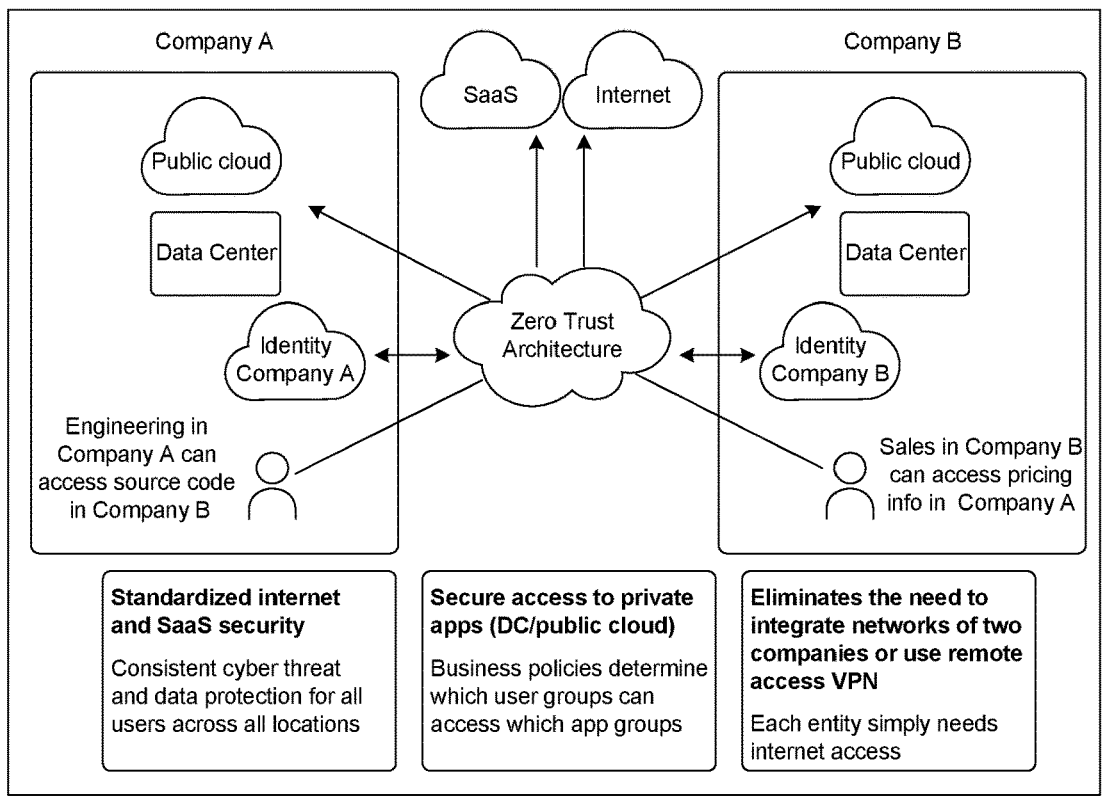
FIG. 21 is a ZTA network that is configured to enable seamless Merger and Acquisition (M&A) integration by removing the network and introducing app-based and connection-based segmentation.

FIG. 21 is a ZTA network that is configured to enable seamless M&A integration by removing the network and introducing app-based and connection-based segmentation. Many enterprise leaders deal with the demands of M&A and divestitures. Managing the complexities of the users, processes, resources, and infrastructure involved has historically been costly and challenging. ZTA inherently delivers seamless integration between two entities by solving the underlying challenges of segmentation.

Zero trust architecture may not require two heterogeneous networks to be merged. Company A and Company B can provide standardized internet/SaaS security and secure access to apps in the data center or the public cloud by determining which users can access which destinations. Users at both companies connect to the zero trust architecture, which coordinates connections, manages access policies, and provides consistent protection. Zero trust eliminates the need to integrate networks of two companies or the use of remote access VPN. Each entity simply needs access to the internet.

Zero Trust for IoT/OT

Figure 22:
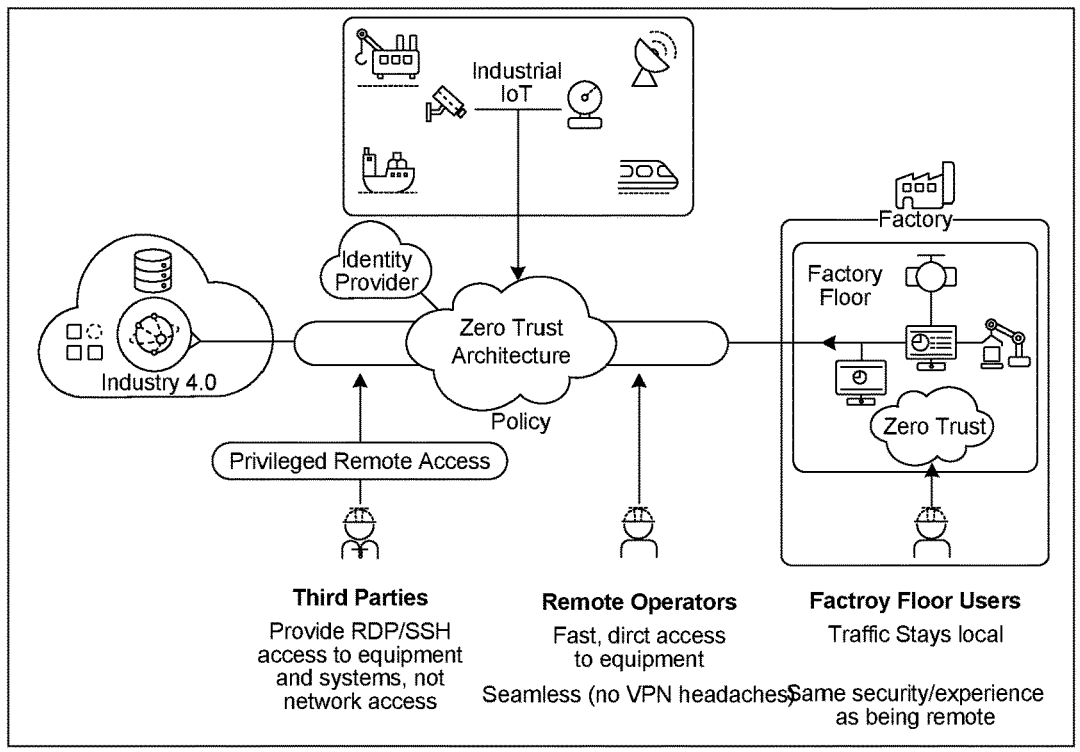
FIG. 22 is an embodiment of a network with ZTA for IoT/OT systems.

FIG. 22 is an embodiment of a network with ZTA for IoT/OT systems. Secure remote access for IoT/OT systems is a service that takes a user- and application-centric approach to security. Whether a user is an employee, contractor, or third-party partner, the ZTA ensures only authorized users have access to specific IoT/OT systems or applications. This granular segmentation eliminates visibility of the network and prevents lateral movement.

Rather than relying on physical or virtual appliances, ZTA uses lightweight, infrastructure-agnostic software like Docker containers or virtual machines, paired with browser access capabilities, to seamlessly connect all types of users to IoT/OT systems and applications, via inside-out connections.

In addition, third-party partners and users gain secure access to IoT/OT systems without the need for a client agent. The zero trust cloud architecture provides policy-enforced, third-party connectivity to IoT/OT systems from any device, any location, at any time.

WAN Transformation

This transformation is often led by the head of infrastructure and networking. WAN transformation allows organizations to convert unsecured, routable, hub—and—spoke networks to true zero trust connectivity, while also improving the user experience. Zero trust architecture (hosted as part of the Security Service Edge in POPs close to population centers) allows direct access to cloud applications via the internet, without the need for MPLS circuits back to the data center. This replaces much of the hardware-based security stack and eliminates the "hairpinning" of traffic that adds unnecessary latency.

Figure 23:
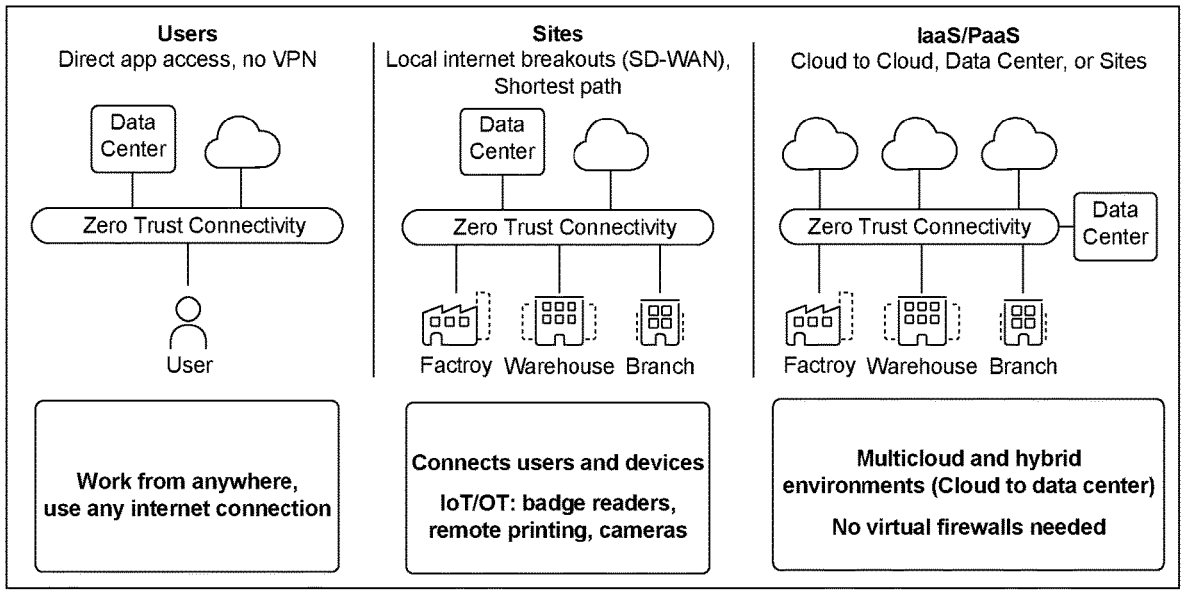
FIG. 23 is an embodiment of a network with ZTA, where enforcement nodes act as a switchboard, creating connection based on business policies.

FIG. 23 is an embodiment of a network with ZTA, where enforcement nodes act as a switchboard, creating connection based on business policies. Apps may be destinations, not network resources, and the users and applications are not on the same network. In addition to direct application access and local internet breakouts, WAN transformation also includes zero trust software-defined wide area networks (SD-WAN) and digital experience monitoring (DEM).

Zero Trust Sd-Wan

Figure 24:
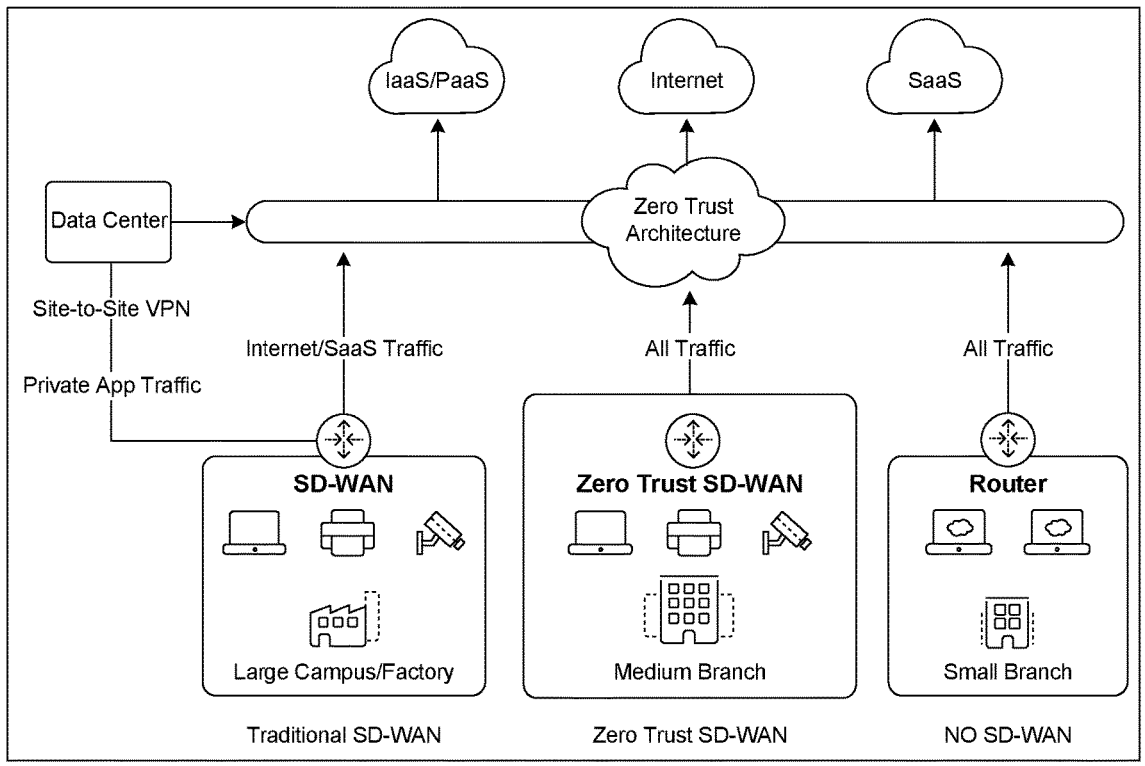
FIG. 24 is a diagram illustrating an embodiment of a zero trust SD-WAN, which may be configured to provide secure access for users and services in branches.

FIG. 24 is a diagram illustrating an embodiment of a zero trust SD-WAN, which may be configured to provide secure access for users and services in branches. SD-WAN has emerged as a technology that aids in WAN transformation by bringing software-defined edge networking and part selection that reduces the reliance on MPLS networks.

While SD-WAN and zero trust can coexist, SD-WAN is not in itself zero trust as it still relies on an underlying WAN. By definition, ZTA should be network-agnostic and not exclusively tied with any network underlay solution. In fact, many of the benefits of SD-WAN are from its "software-defined" capabilities, but not necessarily the WAN, which inherently extends the corporate network and allows for lateral movement of threats. Decision makers should carefully evaluate extending the corporate network to the branch and consider alternate approaches.

To secure connectivity for large branches or campuses, an SD-WAN solution can forward internet/SaaS traffic through the zero trust service edge to establish secure local internet breakouts. This can be accomplished through API integration, so that SD-WAN vendors automatically create tunnels to the zero trust service edge. If SD-WAN is required for path selection or centralized management, it should only be considered for large branches, campuses, or factories. In some cases, for traditional applications, some private application traffic may still need to be sent via a site-to-site VPN.

In some cases, site-to-site VPNs may be used for traditional applications. There are alternatives that better conform to zero trust standards for small and medium-sized branches. For example, zero trust SD-WAN replaces traditional WAN connectivity solutions in-branch by applying zero trust principles to user, server, and IoT/OT device connectivity. Zero trust SD-WAN provides branches and data centers fast and reliable access to the internet and private applications with a direct-to-cloud architecture, which provides high security and operational simplicity. It eliminates the network attack surface by establishing direct branch-to-internet and branch-to-private app connections using a full proxy architecture.

For small branches where there are fewer users, going fully zero trust with no SD-WAN and no routable network is the preferred approach. This basically treats everyone in that small branch as a remote user. An agent installed on the user's endpoint forwards traffic to the zero trust service edge for secure connectivity to public and private applications.

Digital Experience Monitoring

Figure 25:
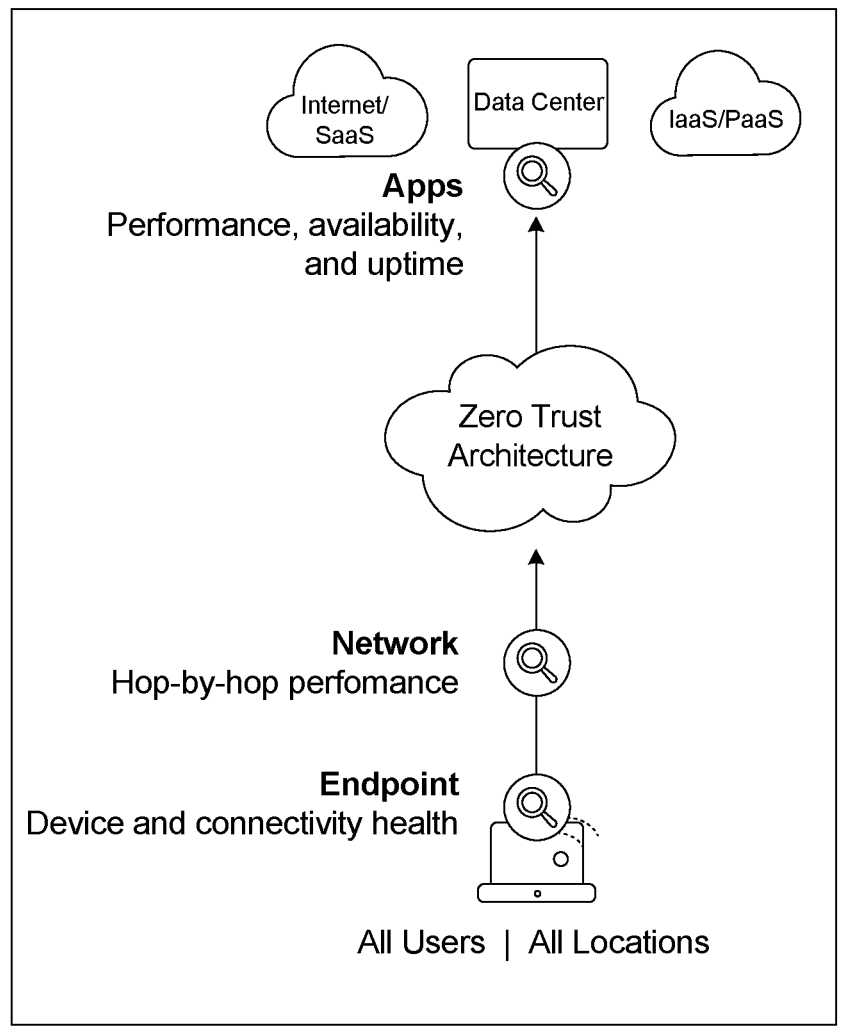
FIG. 25 is a diagram showing an embodiment of a network where visibility from an endpoint to an application can be used to troubleshoot and resolve performance issues.

FIG. 25 is a diagram showing an embodiment of a network where visibility from an endpoint to an application can be used to troubleshoot and resolve performance issues. An important element of zero trust architecture is the integration of digital experience monitoring (DEM) capability. DEM uses telemetry data, collected from the zero trust architecture, to monitor and diagnose end user experience and application performance issues. DEM uses machine learning to identify performance anomalies and send actionable alerts based on application, endpoint, and network analytics. This includes hop-by-hop network analysis that identifies network issues between the user endpoint and their Wi-Fi, ISP, backbone, and the zero trust service edge; resource issues on an endpoint; or problems with the application provider itself.

Figure 26:
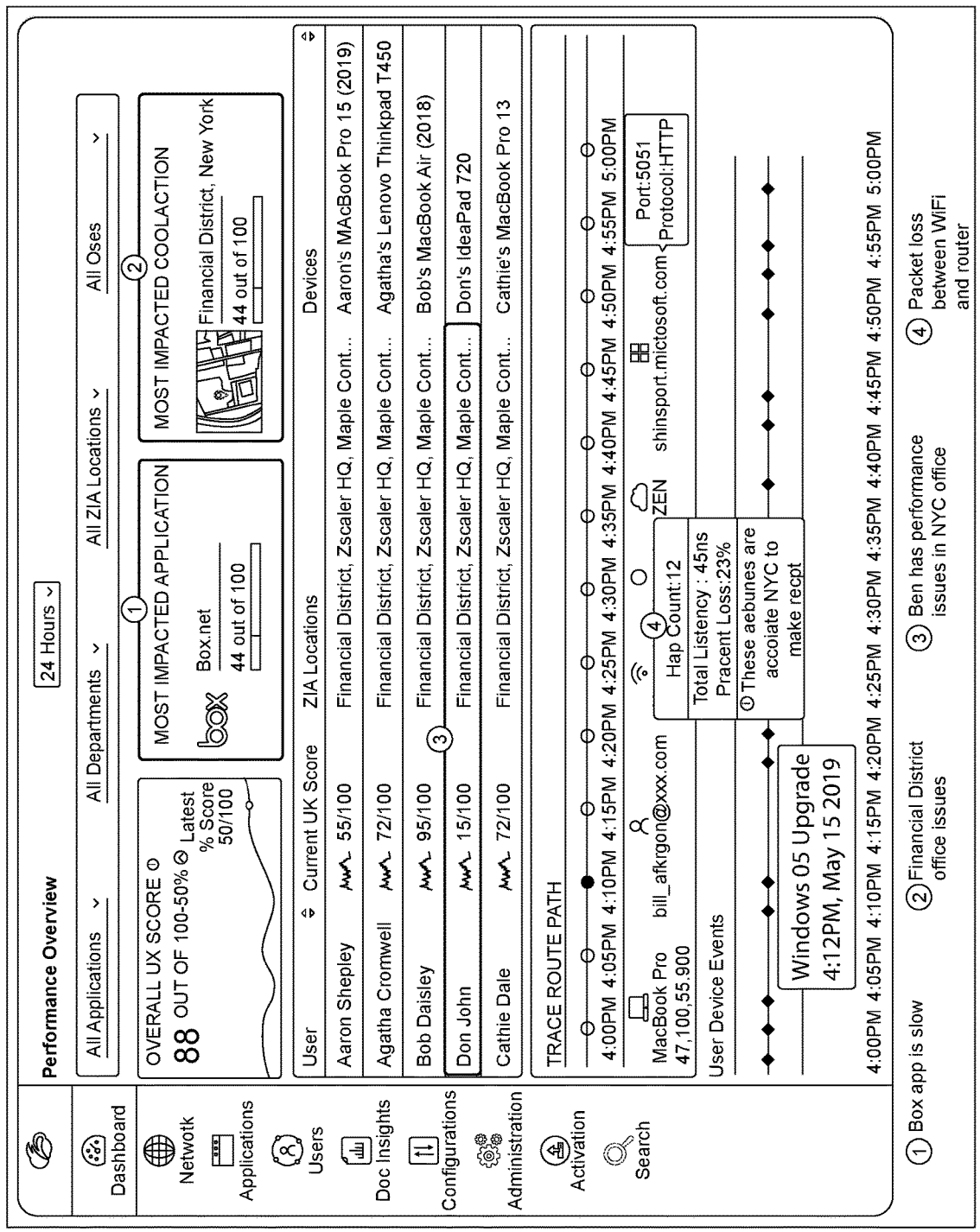
FIG. 26 is a view of a screenshot of a Performance Overview UI.

FIG. 26 is a view of a screenshot of a Performance Overview UI. The screenshot includes sample workflow of using DEM telemetry in a ZTA to identify and diagnose a performance issue.

Secure Cloud Migration

As applications are migrated to the cloud or built as cloud-native applications, there is protection for how workloads of those applications communicate with other workloads and the internet, and how those workloads are entitled and configured. Providing strong posture control, secure workload configuration, and safe workload communications is an important aspect of a holistic ZTA.

Posture Control

Figure 27:
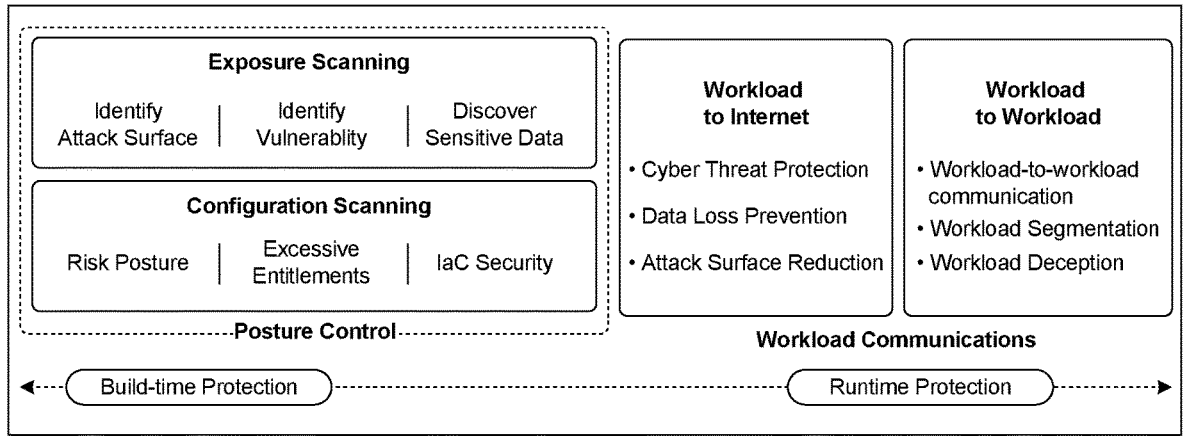
FIG. 27 is a diagram illustrating secure cloud migration, which may include both posture control and securing workload communications.

FIG. 27 is a diagram illustrating secure cloud migration, which may include both posture control and securing workload communications. Posture control for cloud applications may fall into two categories: 1) exposure scanning and 2) configuration scanning. First, exposure scanning, leveraged through API integration with common IaaS and SaaS vendors, can identify an attack surface, find identity vulnerabilities, and discover sensitive data. Second, configuration scanning may use similar API integration to identify the risk posture of a cloud application, excessive entitlements, and the security of infrastructure-as-code scripts. This capability is commonly called CNAPP (Cloud Native Application Protection Platform).

CNAPP is agentless and uses ML to correlate hidden risks caused by misconfigurations, threats, and vulnerabilities across the cloud stack. Security, development, and DevOps teams should prioritize and remediate risks in cloud-native and VM-based apps as early as possible in the software development life cycle (SDLC), both at build-time and runtime. CNAPP gives professionals the visibility they need to "shift left" security practices during the SDLC and fix small problems before they become costly disasters.

Workload Communications

The preceding sections discussed private application access and cyberthreat and data protection from users accessing internal and external applications. Secure workload communication extends these same protections to workloads talking to other workloads or to the internet by using zero trust cloud connectivity. Customer-defined policies specify which workload can communicate with another regardless of region, cloud provider, or network path, in hybrid and multi-cloud environments alike.

Figure 28:
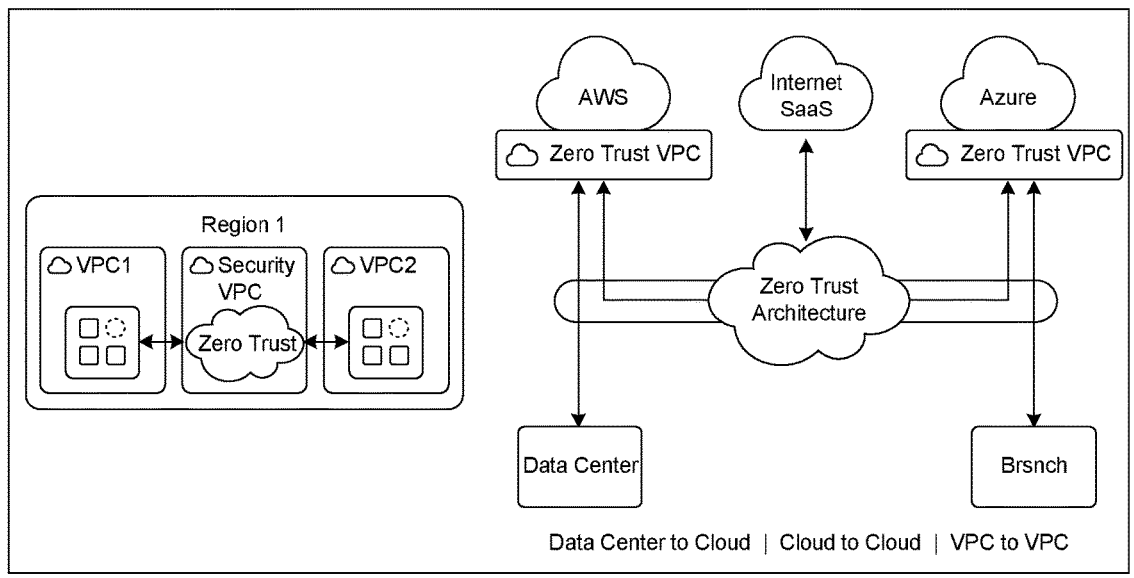
FIG. 28 is a diagram illustrating a zero trust connectivity for cloud workloads. ZTA can provide a scalable, secure solution that allows cloud applications to access any internet or SaaS destination, such as third-party APIs and software updates.

FIG. 28 is a diagram illustrating a zero trust connectivity for cloud workloads. ZTA can provide a scalable, secure solution that allows cloud applications to access any internet or SaaS destination, such as third-party APIs and software updates. It inspects all transactions while applying advanced threat protection and data loss prevention controls. Workloads in one public cloud can securely communicate with any cloud, public or private, with support for communications across VPCs, zones, and regions on the same cloud. ZTA eliminates lateral movement, internet attack surface, VPNs, and the complexities of bespoke cloud routing.

Benefits of Moving to a ZTA

Figure 29:
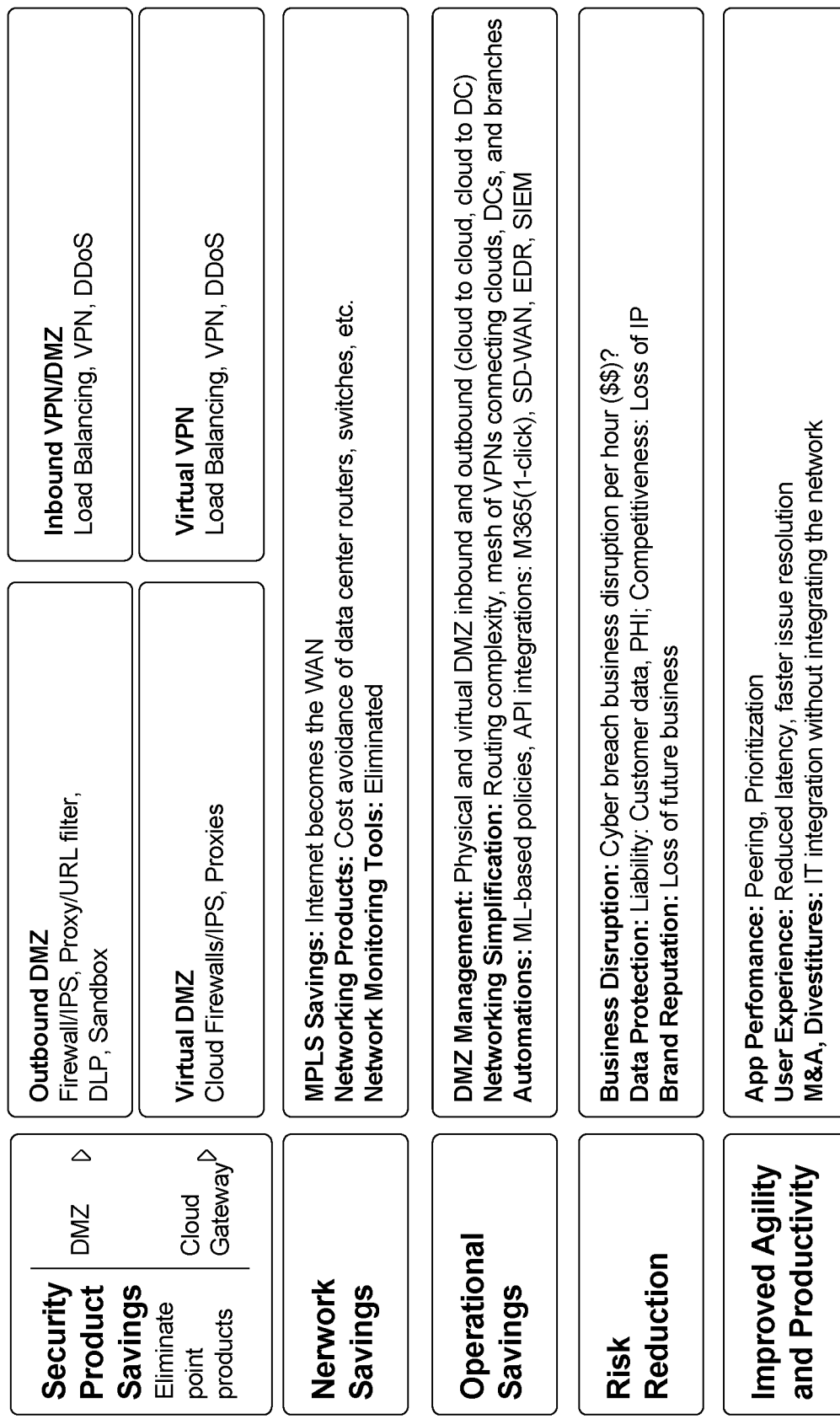
FIG. 29 is a table showing a number of business benefits of moving to a zero trust architecture.

FIG. 29 is a table showing a number of business benefits of moving to a zero trust architecture. As a company moves forward with a zero trust transformation, valuable benefits can be positioned as technology-led business initiatives. These can be used to sway the organizational culture into accepting the proposed solution. There are a number of specific business benefits:

Traditional investments made in security technologies such as firewalls and VPNs only increase cost and are justified based on risk reduction. Zero trust transformation done right can reduce cost, complexity, and cyber risk, all at the same time. The figure below shows typical ZTA benefits by area. This is based upon actual case studies of customers. The rest of this chapter explains each benefit area in detail.

Moving to ZTA may a) reduce technology costs by 64% by reducing or avoiding future spending due to growth, b) reduce risk by 79% by addressing current security gaps and mitigate attack techniques, c) increase operational efficiency gains by 41% by reallocating IT time spent maintaining traditional VPN solutions, d) improve agility by 55% with faster integration times during M&A activities and new branch openings, and e) reduce end-user impact by 73% by significantly reducing end-user wait time related to VPN.

ZTA Security Tool

A zero trust architecture offers technology leaders a unique opportunity to deliver business functionality while ensuring cost optimization. Short term returns manifest by removing the technical infrastructure that ZTA will replace, such as stacks of hardware once used to protect the ingress and egress traffic to data centers or various offices or factories. Once a technology leader is able to financially demonstrate benefits to the business, it becomes infinitely easier to justify the move to ZTA.

When calculating the cost savings from technology, include hardware infrastructure and bandwidth cost reductions. The cost of hardware-based solutions is typically an upfront sunk cost for the hardware itself, plus yearly maintenance and upgrade costs. Much of the security hardware equipment that would normally sit in the data center can move to the ZTA cloud and be consumed on a subscription basis.

Figure 30:
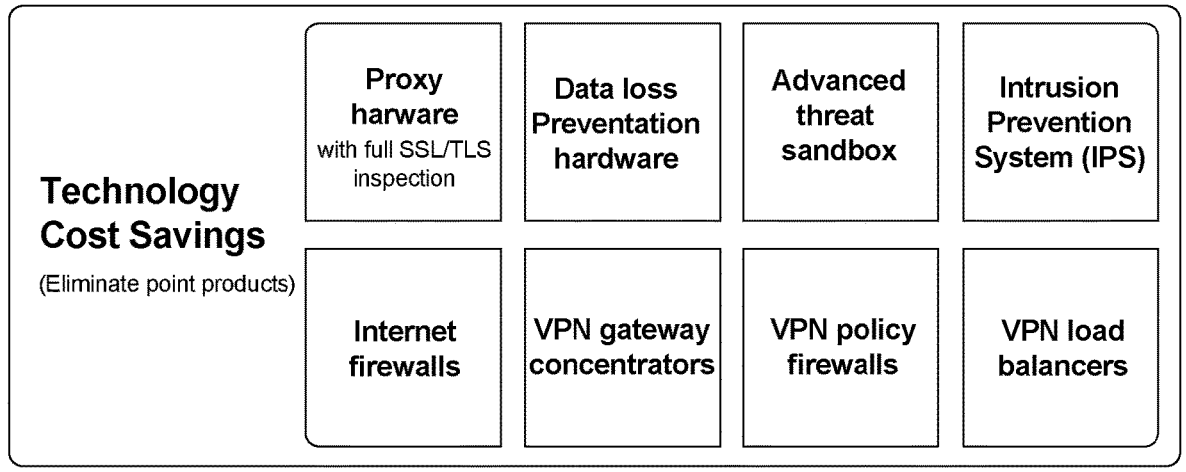
FIG. 30 shows a table indicating how ZTA can eliminate many point products, resulting in significant technology cost savings.

FIG. 30 shows a table indicating how ZTA can eliminate many point products, resulting in significant technology cost savings. For example, capabilities that are hosted in the cloud can also be subsumed by the zero trust cloud, leading to vendor consolidation and subsequent cost reduction. Examples include cloud firewalls, virtual load balancers, transit gateways, virtual VPNs, etc.

MPLS subscription costs are another candidate for savings, based on the bandwidth and service requirements from each branch location. It is likely that MPLS costs will not go away entirely, as certain locations may still require MPLS circuits back to the data center(s), but many organizations can achieve a 50-70% reduction in MPLS costs.

Note that all of these cost savings won't come at once, as different use cases may take priority. Take the example of an enterprise that wants to deliver ZTA for secure internet access. ZTA offers granular controlled access from any initiator to any destination, but without using a network for control. Its implementation allows an organization a chance to streamline its access control processes.

These controls, normally hosted in an outbound DMZ within a centralized network hub, contain a set of solutions to protect the enterprise traffic going to the internet, such as firewalls, IPS, proxy, and DLP. The cost of these services is not simply measured in the physical boxes, their interconnections, or even power consumption, all of which are valid costs. They also waste resources (through management expenses and support costs) by performing redundant operations. This amount is then multiplied by the total number of control hubs that an enterprise must operate across various geolocations.

With a ZTA deployment, an enterprise can simply remove all of these services. The ZTA would offer all of these controls concurrently, around the world and always available. The enterprise can exchange multiple, redundant, cascading expenses for the single cost of maintaining a more secure and accessible ZTA platform.

Operational Savings (Reduced Complexity)

Figure 31:
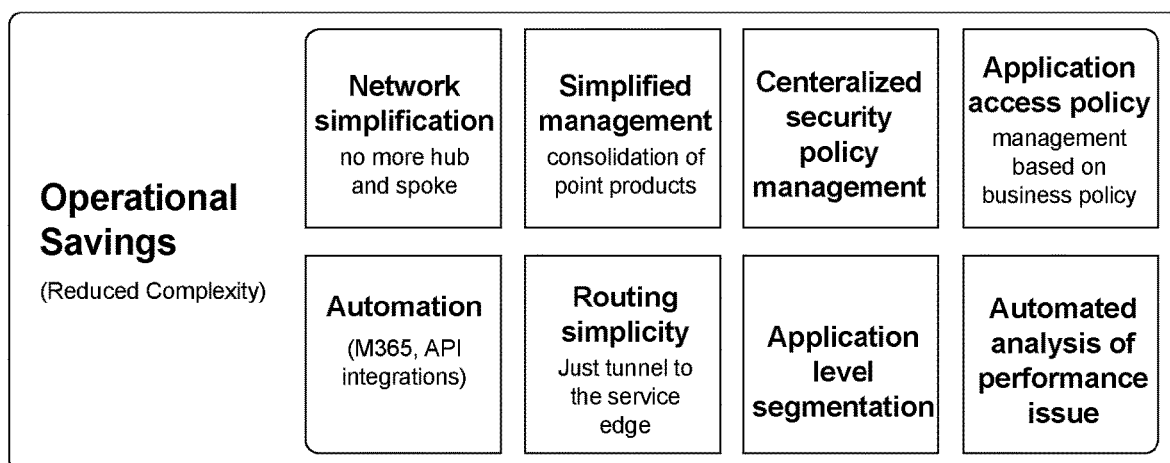
FIG. 31 is a table showing how ZTA enables several operational efficiencies for IT.

FIG. 31 is a table showing how ZTA enables several operational efficiencies for IT. That is, moving to a cloud-based zero trust architecture provides a number of operational advantages meant to reduce complexity. Delivering highly optimized business functions is invaluable to a technology leader. Zero trust architecture allows enterprise technology to move from being a bottleneck that the business will bypass to being the reason the business is competitive and able to execute at a high level.

The lack of optimized business functions comes from the complexity within many organizations' network and security infrastructure, caused by a number of factors:
  a) Point products
  b) Disparate policy management
  c) Routing complexity
  d) Network-based segmentation
  e) Limited visibility and inability to troubleshoot issues To quantify the business benefits, compute the full time equivalent (FTE) time required to perform these tasks on a traditional network and security architecture and compare when the benefits above are realized. This should be done in FTE hours saved multiplied by the typical hourly rate of an FTE, which will yield the overall cost savings. There is also the added benefit of freeing up FTE time for strategic projects.

Many of these operational savings are enabled from the insights and visibility provided by zero trust architecture. Zero trust gives the clarity and visibility into the structure of the IT ecosystem, traffic patterns, and outliers.

For example, application access policy management can be based on the traffic flowing through the zero trust platform and understanding the access needs of the enterprise. In the following example for the finance team, zero trust can map the requirements for one team within an organization. Consider the following line of questioning:
  Question: What part of the enterprise needs access?
  Answer: The members of the account and finance teams
  Question: What needs to be accessed?
  Answer: SAP accounting process
  Question: What controls need to be applied?
  Answer: Only read access for some users. Write for others. No download of financial information to desktop FIG. 32 is a screenshot showing an Applications UI. As shown, zero trust is able to provide visibility into user-to-app access requirements and makes segmentation recommendations to reduce the attack surface.

In a zero trust journey, creating this knowledge baseline is critical for the creation of application segmentation policies. Additionally, the insights provided by zero trust into data classification and cloud application usage greatly simplify the creation of security policies.

Operational efficiency also applies to end users, in that zero trust provides an "always on" and "it just works" experience. A zero trust architecture makes the decision on the best path to connect each and every session. The experience of each session is optimized and controlled dynamically at each access, ensuring the best performance for the end user.

Figure 33:
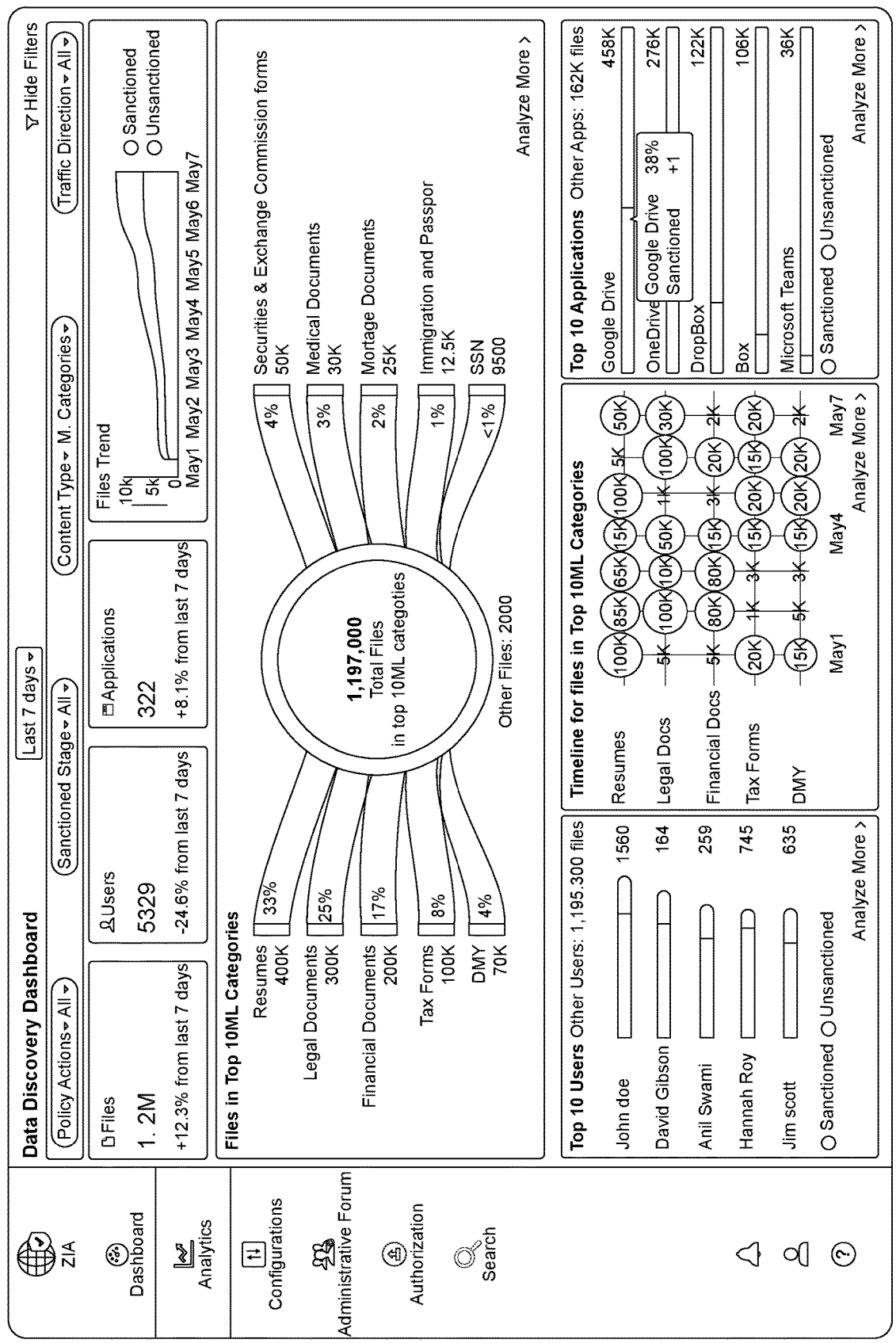
FIG. 33 is a screenshot of a Data Discovery Dashboard showing how zero trust increases visibility into the environment through automated data classification.

FIG. 33 is a screenshot of a Data Discovery Dashboard showing how zero trust increases visibility into the environment through automated data classification. This is most evident when compared to network-based control solutions (e.g., firewalls, VPNs, and routers), which require the initiator and destination to share a routable network with the control device. This is the historic castle-and-moat design, where all services and controls are centralized. To access services (through the controls), users had to either be onsite and connected to the network, or they needed to remotely connect via VPN. This design at a network level chokes and restricts the efficiency of enterprise services.

Risk Reduction

Enterprises are particularly concerned about security breaches where intellectual property or sensitive data is lost. This fear becomes exacerbated when controls are minimized, as any employee can visit the web at high speed; anyone could upload and download content from clouds without regard for the personal or professional protection of data. With data, the drive for accessibility and functionality is often prioritized over its security. Yet, easy and open access to data can be a detriment to an enterprise.

Figure 34:
FIG. 34 is a table showing how zero trust can reduce many risks by improving security and preventing data loss.

FIG. 34 is a table showing how zero trust can reduce many risks by improving security and preventing data loss. Risk reduction can be difficult to quantify with a single monetary figure. Suffice to say, the data protection capabilities of ZTA are immense. ZTA is able to block cyberthreats, apply inline controls for data in motion and out-of-band controls for data at rest, and do so for each and every request from an enterprise. This gives organizations unprecedented visibility, and ultimately control, of the enterprise data. The power of cloud computing far exceeds the capabilities of legacy hardware and traditional data center security, which simply cannot scale.

Zero trust provides efficient access to an allowed application, while offering the ability to view, validate, control, and protect company information. This is true regardless of the location of the assets and requestors. By being an overlay function (that being "overlayed" over any network), the beauty of ZTA is that it will work over other networks, all while ensuring the enterprise users, workloads, IoT/OT, and content are protected.

This control protects against the loss of intellectual property. The same techniques used to look at traffic and content can assess and control the loss of critical information. Businesses cannot only define the types of files or content that they do not want to lose, but also leverage intelligence to ensure their critical content does not go to the internet.

Figure 35:
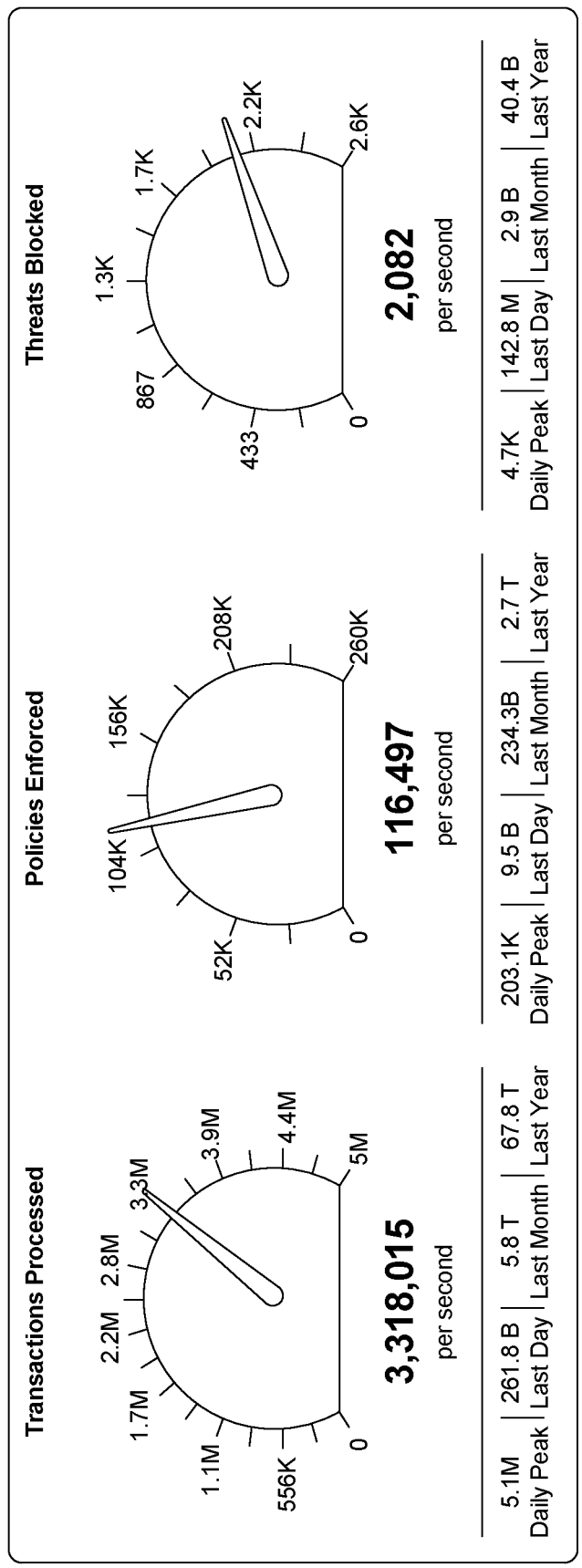
FIG. 35 is a screenshot of a dashboard showing how ZTA is configured to enforce policies and block threats at scale.

FIG. 35 is a screenshot of a dashboard showing how ZTA is configured to enforce policies and block threats at scale. Out-of-band control is important as it addresses risks that are stored "at rest" within SaaS, PaaS, IaaS, or other cloud solutions. This provides enterprises with a full view of inbound threat paths and actively identifies threats before malware is downloaded, shared, or launched.

It also can apply advanced threat prevention like sending thousands of files to a sandbox, or scanning encrypted traffic to prevent malware and data loss. Additionally, increased visibility into shadow IT blocks malicious content within minutes rather than days for breach prevention and a reduced risk of business disruption.

FIG. 36 is a screenshot of an SaaS Security Report showing how ZTA can identify sanctioned and unsanctioned SaaS usage. To quantify the business benefit, consider factors like the disruption cost per hour, loss of future business, loss of competitive advantage, or customer churn. Calculate the total of a loss event with traditional security and compare against the cost of a zero trust solution.

Improved Agility and Productivity

Looking beyond the operational efficiencies, there are also productivity gains that will benefit the workforce as well as the agility gains that will benefit the business. In terms of productivity benefits, zero trust reduces complexities and simplifies how users connect, all through a scalable and resilient cloud security platform. This architecture can lead to four key gains:

1) Improved application performance
2) Fewer outages and maintenance windows
3) Fewer VPN-related support tickets
4) Faster resolution of support tickets More importantly, however, is the innovation that zero trust allows due to its agile nature. Deploying zero trust allows for faster branch deployment, quicker M&A integration, or adoption of next generation business-enabling technology, for example.

To demonstrate, consider a global company's point of sale (POS) operation across thousands of stores. Without ZTA, to deploy a point of sale device at a retail location, the company would need to deploy multiple levels of hardware and configuration per store:

1) The security team had mandated, rightfully, that all financial transaction data must exist, run, and communicate on a dedicated "secure network." It may be noted that store networks may vary depending on the store type. Some may have cameras, doors, guest Wi-Fi networks, etc., but the PoS network and protection may be mandatory.
2) This network required connectivity, which was deployed with an SD-WAN service for both internet and MPLS connectivity. In addition, there needed to be a firewall function to isolate the PoS service from the rest of the network.
3) There was no global/unified protection for internet consumption.
4) Lead time, architecture, infrastructure installation, management, etc., not to mention the supply chain restrictions, put lots of store deployments at the whim of providers.

With ZTA, the company, convinced by the integrity and efficiency of zero trust over any network, rebuilt their store solutions. Gone was the complex infrastructure. This was replaced by Android-, iOS-, and Windows-based PoS solutions, all of which had 4G, 5G, and Wi-Fi connectivity built directly therein. While the network functions become "direct," the security challenge of ensuring PoS transactions happen across the dedicated network wasn't possible. That is, until the security team realized that zero trust ensured each PoS transaction would not only pass over its own unique and encrypted session, but could also steer that PoS exactly to where it needed to go.

Once security observed the greatly improved security function, protection of the data, and the enablement of the business, they signed off on the new store POS system. When properly executed, a zero trust journey will lower the end cost impact to a business. This cost benefit will not only deliver on improved efficiencies and optimizations, but will drive innovation for future projects. All this, while also delivering protection to the enterprise's users, data, and intellectual property.

End-User Impact

While zero trust improves the operational efficiency of IT, as discussed above, there are numerous gains for employees as well. By providing seamless access to private applications without the need for insecure VPN connections, many hours of unproductive time can be eliminated. Taking the case of VPN usage, any employee working remotely would spend several minutes of their day logging into their VPN client.

Figure 37:
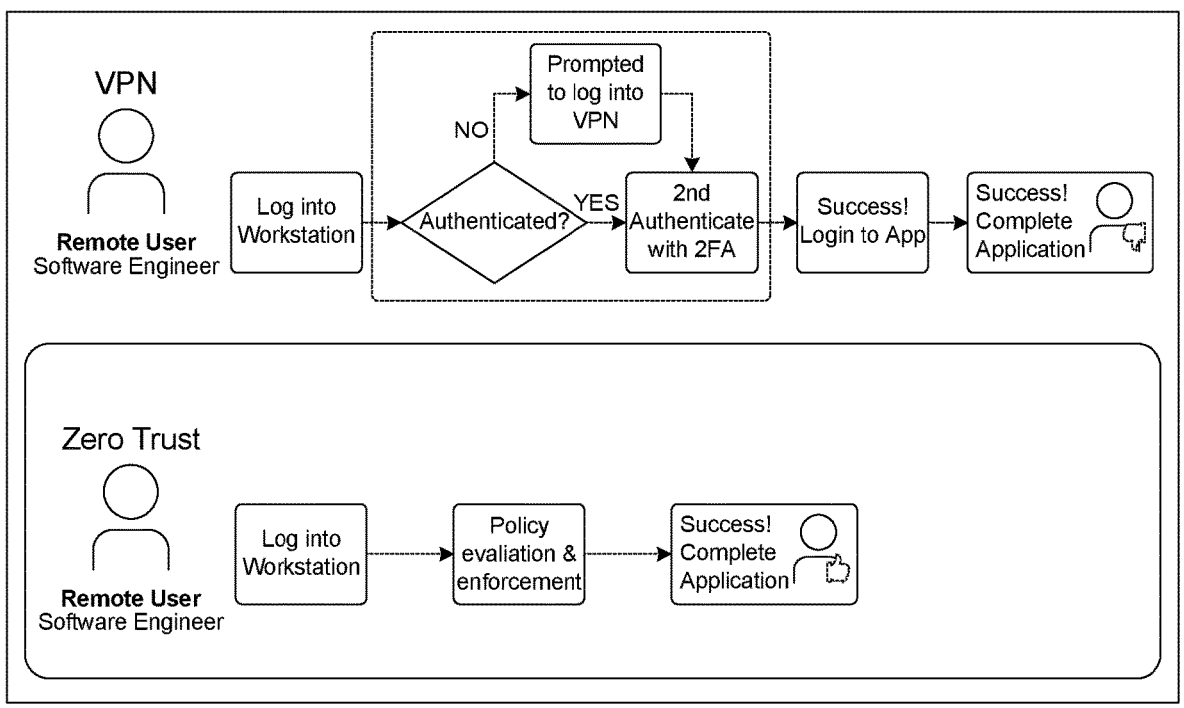
FIG. 37 is a diagram illustrating how zero trust can reduce the inefficiencies that end users may experience when using VPNs.

FIG. 37 is a diagram illustrating how zero trust can reduce the inefficiencies that end users may experience when using VPNs. While this may seem insignificant for an individual, when added up, this can result in many, many thousands of lost hours of work. Zero trust can make application connectivity seamless. For example, assuming 23K remote users experiencing six minutes of unproductivity per working day (e.g., 50% improvement), a cost saving of $9.1M may be realized with labor expense improvements over the unproductive systems. Also, this may result in 138 annual Full-Time Equivalent (FTE) hours that are saved with respect to unproductivity improvements over VPN high labor expenses.

For third parties like contractors and customers, gaining access to private applications also presented difficulties, since installing VPN agents on unmanaged devices was a challenge and there were risks associated with exposing these applications on the public internet. With zero trust, secure access can be granted to these third parties without the risks of exposure.

Figure 38:
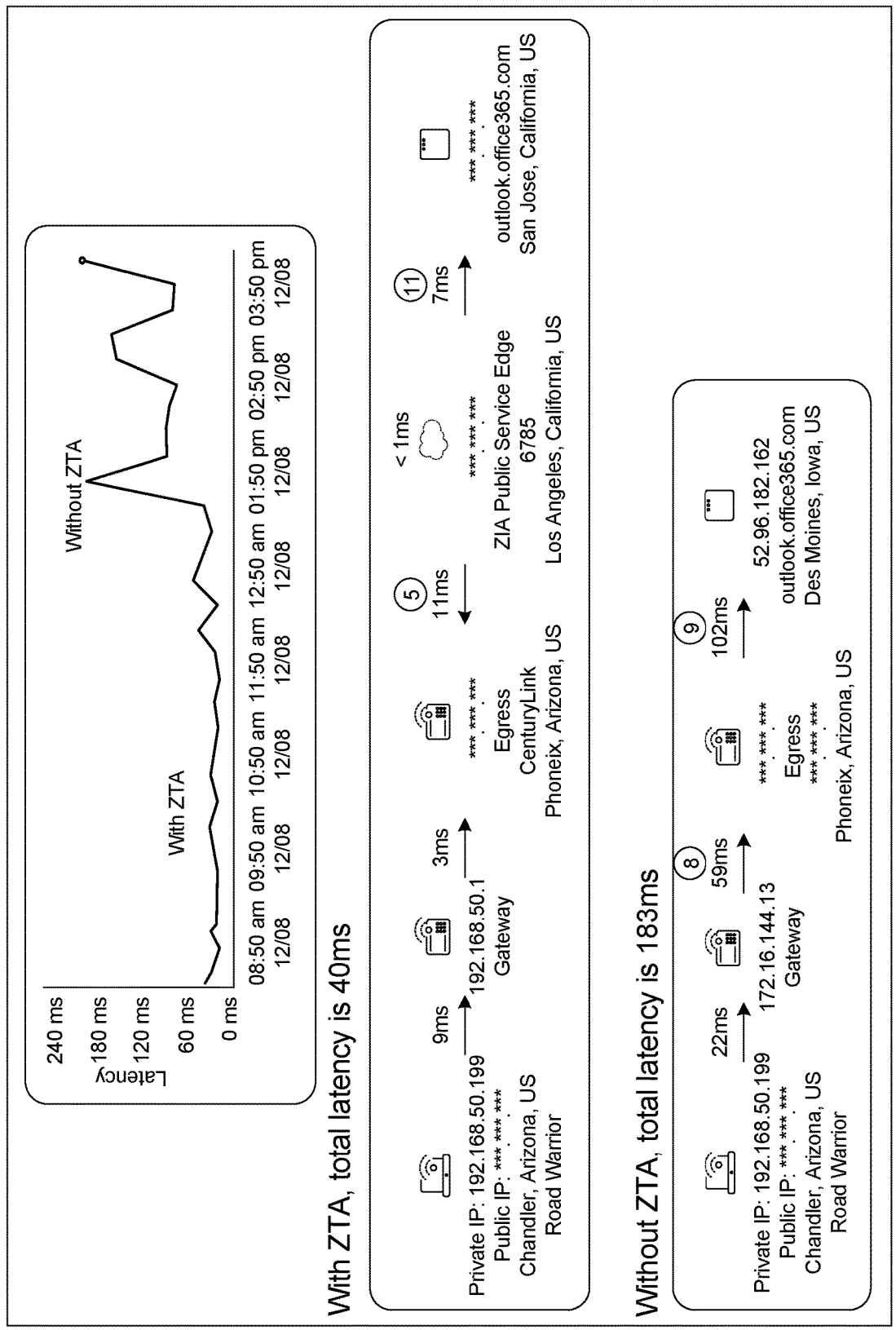
FIG. 38 is a diagram and graph showing a comparison of end-to-end latency with and without ZTA for a remote worker.

FIG. 38 is a diagram and graph showing a comparison of end-to-end latency with and without ZTA for a remote worker. Without ZTA, excess latency is incurred by hairpinning traffic to the data center where the VPN concentrator is hosted. The graph shows the improvement in response times for employees accessing applications. Traditional routing would often hairpin internet-bound traffic from a remote location or branch office through the data center because that is where the security stack was. ZTA provides local internet breakouts for branches, eliminating the "hairpin" with a direct path (through the distributed ZTA cloud) to the application, cutting the response time significantly. For the remote worker, elimination of the VPN also allows a more direct path to the application, again over the distributed ZTA cloud.

Quantifying the Business Benefits

Figure 39:
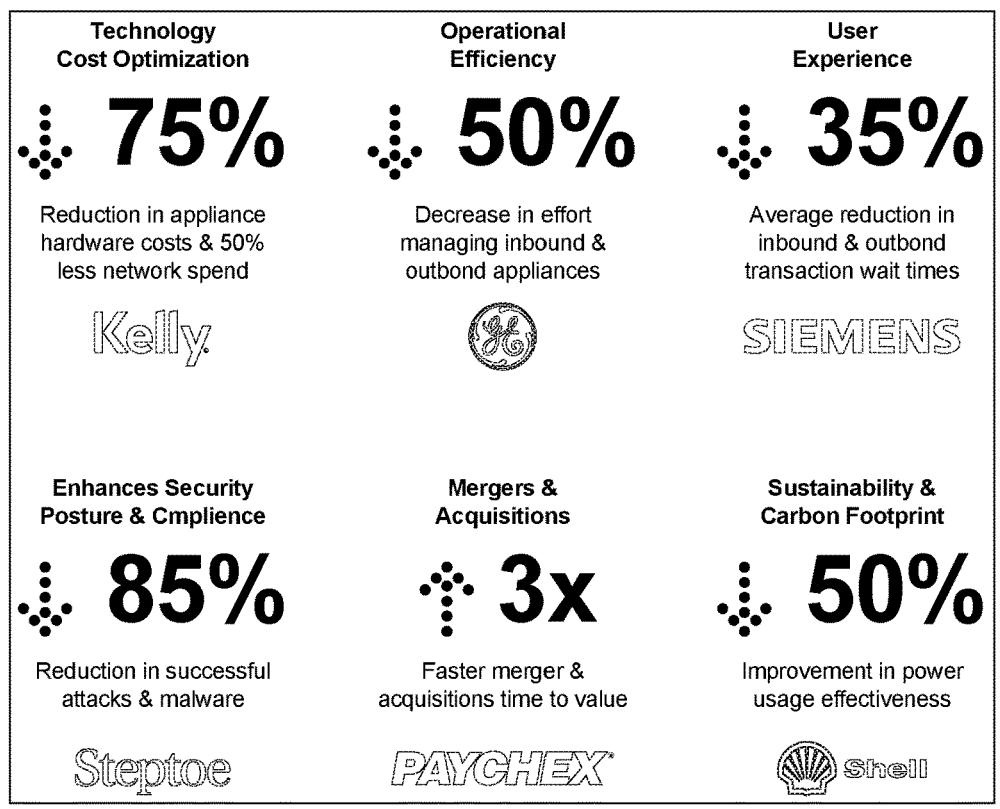
FIG. 39 shows an example of verified business benefit quantifications for some organizations, based on use of the embodiments of the zero trust product as described in the present disclosure.

FIG. 39 shows an example of verified business benefit quantifications for some organizations, based on use of the embodiments of the zero trust product as described in the present disclosure. Also, with zero trust functionality incorporated in ZIA, for example, one company (e.g., Siemens) was able to obtain 1) a 70% reduction in MPLS costs with 80% reduction of MPLS connections, 2) 19M threats blocked and 41K files sent to Sandbox in one quarter, 3) 4.83 out of 5 in an Incident Satisfaction Score, and 4) less than 10 milliseconds of proxy latency in 99.9% of Internet transactions. With zero trust functionality in ZPA, this company was able to obtain 1) a 65% reduction in licensing costs in projects for third-party access solutions, 2) three weeks to deploy ZPA, ensuring full business continuity in a month, 3) two months to enable Divesture Day 1 Readiness, and 4) increased network separation speed with black-listing and white-listing.

Phased Transformation Journey

A successful digital transformation may be a journey that doesn't happen all at once. Progress may come in increments with each experience influencing successive phases. The following is an example of a phased security transformation:

Phase 1—Collaboration

During Phase One, collaboration and sharing of large datasets may be enacted when a system has been outgrown. A company may migrate hundreds of terabytes of emails, files, SharePoint data, etc. This delivered immediate productivity value and business flexibility, even with a legacy network and security appliances still in place.

Phase 2—Secure Access to Internet and SaaS from Anywhere

Phase two may have three steps. First, enable secure access to the Internet and SaaS applications through the zero trust product described throughout the present disclosure. This may be deployed on an existing legacy MPLS Global Network during a period of time (e.g., 60 days) for an entire company. This may be done simultaneously while Phase One was being executed. This may provide immediate resiliency and increased security posture.

Phase 3—VPN Replacement with Zero Trust Security

In Phase Three, a company may replace multiple remote access VPN solutions and provide fast and secure zero trust network access (ZTNA) to private apps using ZPA (e.g., with the zero trust functionality incorporated therein). This may allow employees and third-party contractors to access multiple applications in multiple data centers and public cloud regions directly over the Internet. This may prepare a company to support users' needs to enable work from home without any interruption.

Phase 4—Move Private Apps to the Cloud and Consolidate Data Centers

Phase Four may involve two steps. First, a company transforming to zero trust can move its critical customer-facing applications into a suitable web service (e.g., AWS). Then, the company may move its regional data centers, which might lack the scale needed to operate efficiently, to a cloud computing platform (e.g., Azure).

Phase 5—Zero Trust Connectivity for Offices

Phase Five of the security transformation may result in a completion of the transformation to offer quality security services for the company. This may also bring up some questions that many companies may ask, especially as the world evolves from a brick and mortar type working environment to a remote working environment. That is, if employees can work remotely under a ZTA in a safe and secure manner, why can't the entire company allow remote working at all of its facilities? Also, do we even need a network? How can we provide ZTNA to devices without identity such as printers, barcode scanner guns, time clocks, IoT, and OT systems? Why should we hold on to old legacy networks that might be a security risk due to a lack of identity when they can be replaced with zero trust access? With zero trust connectivity, offices can become like Internet cafes, and companies will no longer extend their corporate network to every office. As mentioned above, this step may be important for eliminating lateral threat movement.

Zero Trust Driving Success for an Organization

Now that the basics of zero trust architecture and its accompanying benefits are understood, how can organizations successfully adopt the framework? Many organizations have a multilayer security stack that represents years of reactive security thinking. Security leaders know it is far easier to justify buying new technology than attempting to replace existing solutions. Finding a security offering that addresses a specific risk gives stakeholders a quick and easy way to solve one problem. Making the case for doing security a new way, to address several problems, is a heavier lift.

One foreseeable objection is that the current system works well enough, so why make any changes? Other organization members, for example those currently tasked with operating and maintaining the current security stack, have a vested interest in the status quo. It is also possible that the CIO or CISO is not entirely sure which aspects of the security posture are providing the most value. Inheriting years' worth of security solutions that are layered on top of each other can be similar to assessing a large Jenga@ tower. Which pieces can safely be removed without the entire structure collapsing?

Many reputable organizations successfully overcame several technical, cultural, and financial obstacles in their zero trust journey. While no two organizations are exactly alike, many share similar challenges when migrating from traditional security postures to a zero trust framework. Understanding how others navigated their way to a zero trust environment can help you successfully guide your organization's transformation journey.

Another Phased Journey to Zero Trust

Implementing a zero trust architecture (ZTA) should not be a daunting experience. Yes, it does challenge the status quo of existing infrastructure and IT functions. Yet, undertaking a zero trust journey should not be so large and all-encompassing that it stops your organization like a deer in headlights.

Ask any enterprise undergoing its zero trust journey where to start and the answer will be, "Start somewhere, anywhere, but just start." Each transition to ZTA must be tailored to the specific enterprise, and success measured by its delivery on critical use cases (see Question 2).

The pandemic's separation of users from the network is a perfect instance of delivering a zero trust outcome with large gains but minimal impact. The result of this separation is a prime example of how ZTA satisfies urgent use cases (e.g., end users having the same experience and protections on and off the network). Older network-based solutions require the users to change their behavior when off-net versus on-net.

Older network solutions are anchored in a vulnerable topography and unable to adapt gracefully to remote and mobile work. True adoption of ZTA means that initiators are moved off the network, but have an identical user experience whether in or out of the office.

Adopting zero trust architecture is a journey and should be broken into manageable phases that demonstrate incremental business value. For many organizations, it has helped to break this transformation process into four distinct phases:

Phase 1—Empower and Secure the Workforce

Focus on the employees and how they are accessing public and private applications. This is often where the greatest risks lie, and where ZTA can have the most immediate impact. Route Internet-bound traffic through the security service edge, so that cyberthreats are stopped and data loss is prevented. Private application traffic also traverses the service edge for zero trust protection, to eliminate the attack surface, and prevent lateral movement.

Phase 2—Protect Data in the Cloud

Once employee traffic is secured, it is time to secure the data that lives in the cloud. The growth of SaaS applications like M365 and Google Workspace has made it imperative for organizations to ensure that only sanctioned data with the correct entitlements lives in the cloud. This phase should also address and regulate shadow applications, like an unofficial Box.com account, which may host sensitive data.

Phase 3—Enable Customers and Suppliers

While the initial focus is on employees, phase three extends zero trust protection to customers and suppliers who may also need to access internal resources. Since these users are coming from unmanaged devices, ZTA requires them to be redirected to the security service edge, where their access can be vetted. Based upon a number of factors, their connection requests may be allowed, blocked, or isolated (by sharing a pixel-streamed version of the application).

Phase 4—Modernize IoT/OT Security

The final step along the zero trust journey is protecting IoT/OT resources. This entails providing zero trust access to these endpoints for employees and third parties without using a VPN. These systems should also be removed from public view, making them invisible to attackers by removing the attack surface.

A zero trust journey can be achieved in a multitude of ways. To demonstrate the possibilities, here are a few practical examples of how to start today and receive direct business benefit.

Protect Strategic Core Business Functions

ZTA is anchored in only allowing a verified entity access to a verified and allowed destination. As such, one of the simplest deployment scenarios for zero trust architecture is by first enabling granular access control for a specific set of individuals.

Figure 40:
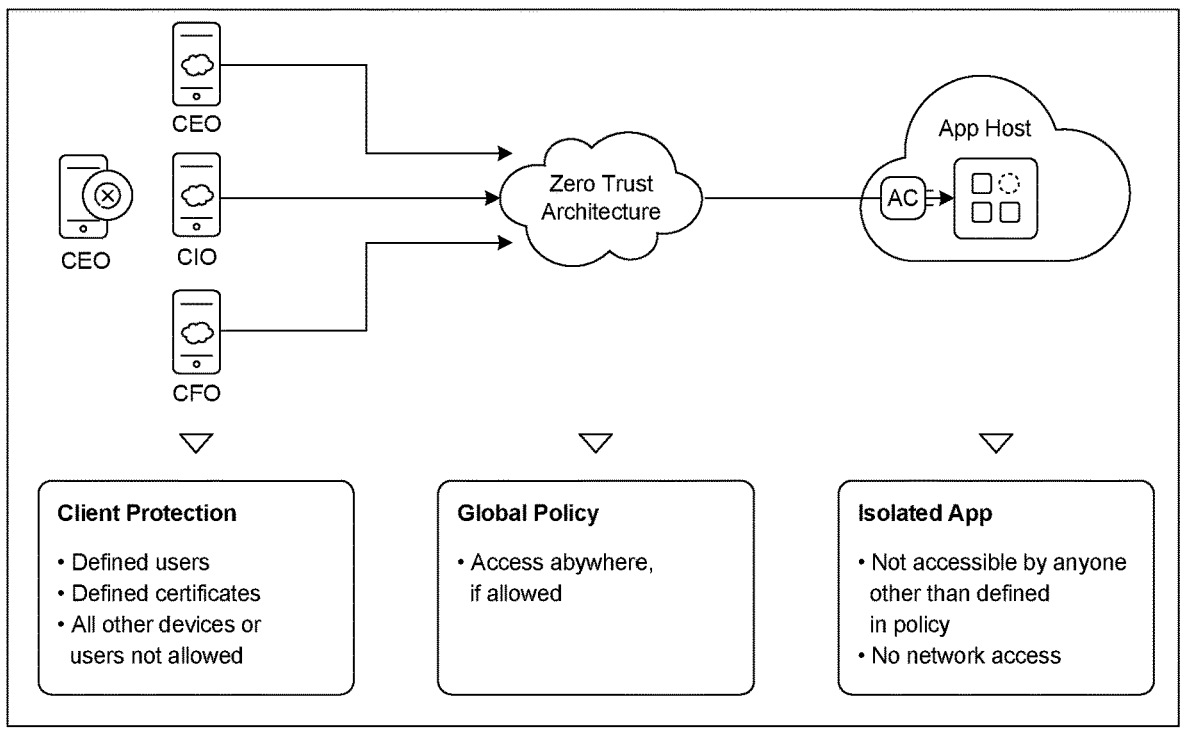
FIG. 40 is a diagram illustrating an embodiment of how zero trust is able to protect core strategic business functions by enforcing security measures throughout the connection chain.

In this case, imagine a set of executives who need access to highly restricted and classified applications. The deployment is very simple:

1) Define which users (initiators) need access
2) Identify trusted devices (in this case, it was mobile iOS devices running a specific MDM with certificate validation in place)
3) Define which application (destination) is to be accessed
4) Configure the zero trust controls via application segmentation policy
5) Deploy to the user devices
6) Enable access FIG. 40 is a diagram illustrating an embodiment of how zero trust is able to protect core strategic business functions by enforcing security measures throughout the connection chain. In some cases, a CEO may access the application through a managed device, but perhaps not with an unmanaged device.

The power here is that a simple access policy to a destination application reduces the attack surface of that application immensely. In fact, by leveraging a ZTA for specific uses, one can deploy this exact scenario over any network, regardless of how hostile that network may be.

Connecting over any network, including cellular or Wi-Fi, means that the executives do not need to worry about the phone's underlying connection: it just works. This simplicity will drive consumption and use of various services, rather than creating technological challenges.

This network-agnostic versatility has also been used to deploy zero trust architecture within breached ecosystems, allowing business to continue while IT remediates compromised platforms.

There are specific business benefits of ZTA:
a) Operational: The organization experiences speedy and granular enablement of access to specific business applications.
b) Risk Reduction: Access is only granted to users/devices whose posture value is allowed, ensuring no access for non-compliant requests. The attack surface is greatly reduced, and lateral movement is limited.
c) Agility: Securely deliver access over any network while protecting the assets and intellectual property of the business.

Simplify Mergers and Acquisitions

Mergers and acquisitions ask a lot of IT teams. In a short period, an untrusted and complex technological ecosystem must be connected to an enterprise's trusted environment. Often, the technological challenges compel both parties to blindly allow access. They enable business functionality by sacrificing security.

Figure 41:
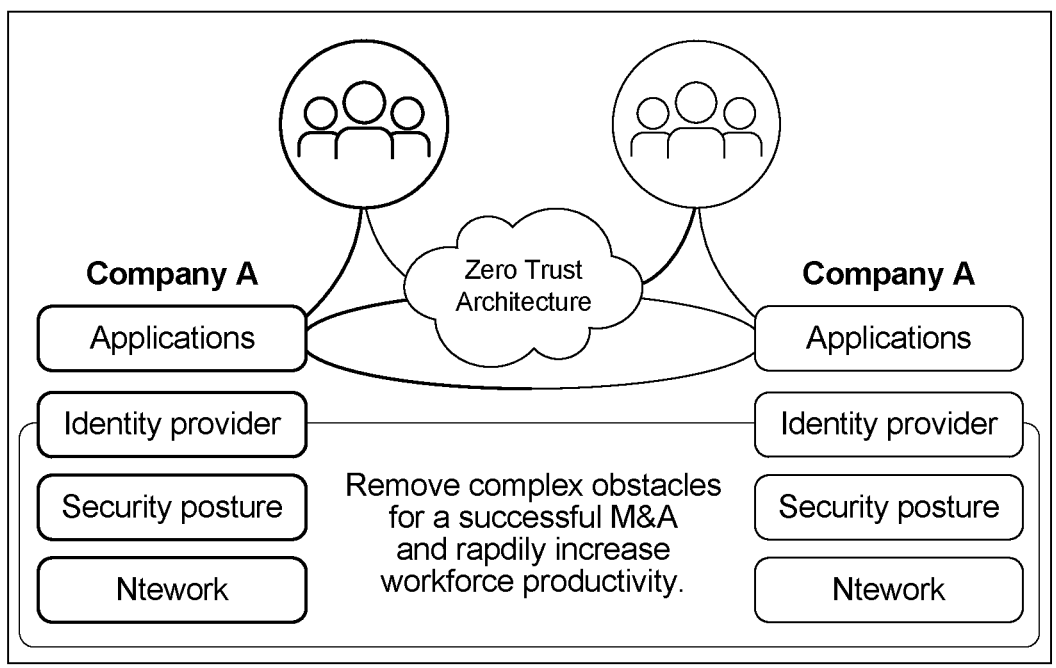
FIG. 41 is a diagram illustrating an architecture that allows granular access at the application or user level.

FIG. 41 is a diagram illustrating an architecture that allows granular access at the application or user level. With ZTA, vetted and verified identities are allowed access to specific resources on a per-connection basis. This approach is a godsend to an M&A team. Not only does ZTA alter the design of a merger and acquisition process, but it actually enables greater speed (approximately 50% faster) to deliver on the integration.

The complexity of merging networks is greatly reduced when users no longer authenticate to a network, but instead to specific applications. When acquiring a new enterprise, zero trust architecture deployment and enablement is simple:

1) Deploy client software or set up clientless access
2) Integrate an identity platform into the zero trust architecture
3) Configure the controls of who gets access to what—this can be broad at first, until more granular controls are understood
4) Deploy the application paths (via software-based application connectors)
5) Enable access This enables authorized users to access whatever they need without ever connecting separate networks or businesses. ZTA provides specific benefits to mergers and acquisitions:
- a) Operational: There are no duplicate policies, hardware, configurations, or networks-they simply interconnect.
- b) Risk Reduction: The company has full control of who gets access to what and ensures data classification and controls can be followed.
- c) Agility: Deliver a high-speed, business-focused acquisition process, removing the overhead and challenge of technology.

Protect the Enterprise

Deployment, management, and control of access for a global workforce is a challenge every organization faces. Initiators, not just users, need protection when accessing internet services. This was most evident during the SolarWinds security issues of 2021. During this attack, the initial breach came via a trusted application path, the SolarWinds service. If the internet traffic generated by a server, IoT, or OT workload was not controlled, attackers were able to impact more than the SolarWinds solution.

True zero trust deployment means granular controls, even for workloads. There should never be a reason for servers to call an unsanctioned destination. To that point, ZTA deploys granular internet controls that can simply be deployed to any and all users, IoT/OT solutions and workloads. A ZTA deployment to protect the enterprise is simple:
1) Define categories of access initiators-they could be as basic as Users, Locations, Sites, etc.
2) Set up connections from these initiators to the zero trust solutions
3) For users, roll out the client software
4) For workloads, forward the network traffic to the zero trust platform
5) Build access policy, initially at a wide level and then define specifics as needed
6) Enable access
7) Observe and fine-tune access policy There are several business benefits:
- a) Operational: Visibility over the entirety of the enterprise landscape, access requirements, and not just over users. This allows for optimization, control enhancements, and ultimately enables best access requirements.
- b) Risk Reduction: Deliver protected services to all initiators ensuring that "bad things" are blocked, and they enjoy a secure experience.
- c) Agility: Knowing which assets exist and what they request will allow an enterprise to build "fit for purpose" controls in the future. This enables enterprises to adapt new solutions to protect them "out of the box."

Common Obstacles

Given all the benefits associated with zero trust architecture, there still exist several obstacles that can either slow down or derail the journey. Three potential obstacles that a technology leader may face are outlined below, with suggestions on how to turn these obstacles into enablers.

Complexity can Hinder the Journey

Issue: As a technology leader, complexity or technical debt is part of day-to-day operations. Servicing this technical debt and addressing complexity can stop an innovative transformation in its tracks. It is important to leverage complexity as a catalyst for substantial change, using the prospect of ZTA to shine a spotlight on all things legacy.

Solution: Divide and conquer by picking the areas of business where zero trust can have the maximum benefit. For example, focus on enabling access to internal applications for third-party partners. Start with moving them from full network access to zero trust access. This will yield two benefits by providing visibility into
- who is connecting and from which firm and
- where they are connecting to This simple exercise will deliver great access protection, as the third parties aren't on the business network. It also provides two areas of immediate improvement: the ability to apply controls to different third parties based on role, company, etc., and allowing access only to known and authorized apps.

The end result is a zero trust, hygienic foundation of access for third parties. Plus, being able to inventory users and workloads allows for iterative improvements, such as focusing on workloads the third parties are accessing and preventing access from these apps to additional services.

Fragility of the Business

Issue: Change can often induce fear, especially in a business environment. Moreso, when talking about the IT services that underlie the fragile ecosystem of core business functions, maintaining the function and stability of the business is key. Thus, anything new must be incremental and not disruptive.

Solution: Deliver enablement. Zero trust architecture still delivers services, but in a more resilient way. This factor is key to businesses adopting the architecture. Through ZTA, businesses achieve better enablement. Through proper planning, a business can facilitate its entire workforce with a new way of working in days. To demonstrate this appropriately, IT leaders need to showcase the multiple, valuable incentives of zero trust architecture. Good examples of high level value outcomes are:
- Visibility of connections between initiators and destinations
- Intellectual property protection as well as highlighting areas where corporate secrets are vulnerable
- Reduced infrastructure costs by removing superfluous equipment, licenses, etc.
- Accelerated business deployments—not relying on hardware removes the need for lead times, deployments, etc.
- One architecture that addresses many use cases eliminates the headache of building and maintaining piecemeal solutions Legacy Systems Hold Back Innovation Issue: Enterprises attempting to deliver innovative solutions are often held back by their legacy platforms. Thus, they are forced to split their technology stack over two (or more) areas, one for innovation and the other for "keeping the lights on." This division breeds challenges with administration and requires different sets of knowledge and services to address. It also asks enterprises to work in a hybrid manner, with various solutions for each set of ecosystems it manages.

Solution: Empower innovation. A zero trust architecture allows an enterprise to execute anywhere, regardless of worker or application location. It allows any initiator to connect to a destination, regardless of the technical scenarios of either (e.g., cloud-based, on-premises, etc.). With ZTA, an enterprise only needs to consider what will be an initiator and what will be a destination. Networks no longer matter. In many cases, destination workloads will also be initiators. A true ZTA allows these types of flows to be securely built and enabled.

Continuous Access Management

Access management must happen across an employee's tenure, not just the endpoints. To illustrate the first point, consider the process that occurs when a new employee is hired. They are assigned a PC. This workstation is connected to the domain, configured properly for official duties, patched up, and ready to go. Likewise, the user account is properly provisioned with all the permissions necessary for the employee to complete their work. This onboarding process is generally optimized, as IT teams have repeated the steps hundreds or thousands of times. The same is true of offboarding. The PC is removed from the domain, the user account is terminated, and all access permissions are revoked. Unfortunately, onboarding and out processing are the only two times users and devices are likely to have their permissions properly configured.

Access rights tend to become bloated the longer a person stays at an organization. As people assume new positions and roles they accrue additional access and permissions. What about the old access users no longer need? These rights are often forgotten. Over time, this repeated process inevitably leads to an accumulation of excess access rights. My first piece of advice is to have a continuous process in place to remove unneeded access before it leads to far greater problems.

Consistent, Persistent Messaging Over Time

Another recommendation, maintaining consistent communication, is particularly important for leaders and drivers of change. I advise executives to communicate their message seven times in seven different ways. The messaging must be persistent and communicated through multiple venues such as PowerPoint, voicemail, text, email, etc. Throughout the transformation journey, leaders must be clear about why changes occur and keep employees updated on the current progress. Frequently repeating the transformation plan and goals will help combat several key points:

Confusion over key terms such as "zero trust" and ambiguity over expected outcomes Message distortion that naturally occurs as directives pass through multiple layers of management Loss of focus that occurs as people leave the project and new members come aboard For example, a change of leadership often starts at the governor's or CEO's office. The executive issues a mandate for change and sets goals for the organization. The order could be as brief as "you will adopt zero trust principles," or "you will adopt a zero trust philosophy in protecting our assets." Yet even simple messages can become mangled when projects drag on. Without continually specifying what zero trust ultimately looks like, or how the framework will be applied to business-critical resources, the end result could be disastrous. This is especially true when messaging is passed throughout the organization in piecemeal fashion.

Likewise, many workplaces are organized in a hierarchy. There may be multiple layers of management between those directing changes and those performing the work on the ground. Messaging must remain consistent as it passes through each layer of management. This can be achieved by forming an oversight committee that regularly meets to ensure all stakeholders are on the same page.

While CIO for Wisconsin, I met every Monday with the deputies of major cabinets to reiterate the message and the mission. For four solid years, each deputy returned to their home offices bearing an identical message about what we were doing, how, and why. Keeping everyone informed of the plan and working toward the same goal was critical for our success.

Stay Focused for Success

Organizational change happens at the employee level, but it requires strong change leaders to guide the effort. Changing technological processes and practices in a large organization is a daunting task and requires a multitude of skills to accomplish. However, in my experience, keeping a close eye on access permissions and providing consistent messaging are two key ingredients to achieving success.

Successful Adoption of ZTA

Digital transformation occurs not only in technology, but also in a number of non-technology areas. These include changes in culture and mindset, organizational structure, processes, and skill sets. While often not prioritized while undergoing secure digital transformation, these areas all play a critical role in its success.

If done correctly, non-technology transformations can have lasting positive effects on how the organization functions. They may improve an organization's abilities to cater to business requirements, become agile, and break down silos. However, these changes do not happen overnight. They rely on the fortitude of dedicated CXOs exercising effective top-down leadership.

Culture and Mindset

Culture and mindset are areas that are hard to define, measure, and influence, but are crucial to the adoption of zero trust technology. Persuading the business culture and mindset to embrace zero trust greatly affects the success of its deployment and operation. Organizations trapped in a legacy mindset may find pockets of resistance to change. Within every IT department there are people who love their network, have faith in their firewalls, and believe there's nothing wrong with VPNs.

Figure 42:
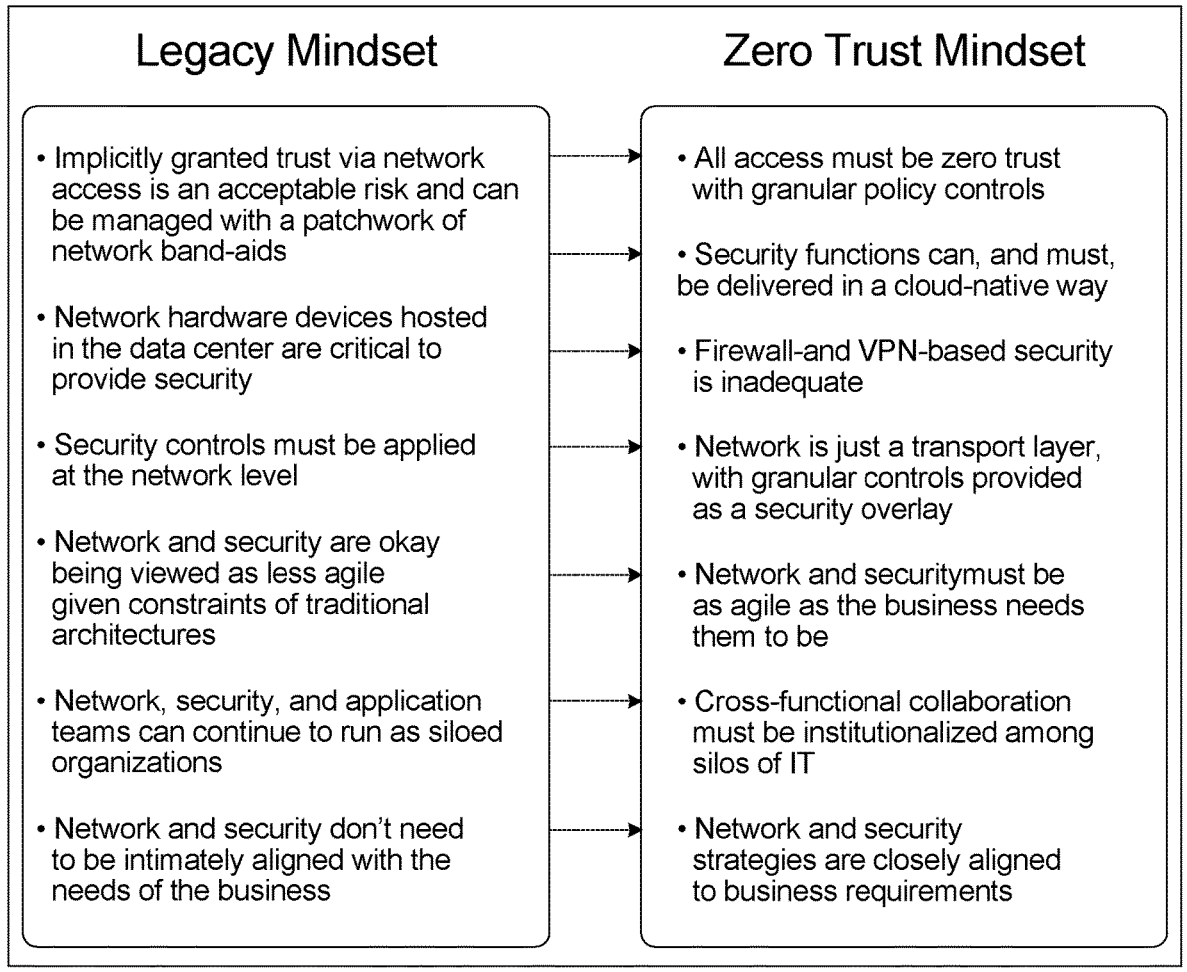
FIG. 42 is a chart showing the contrast between the legacy mindset and the zero trust mindset.

FIG. 42 is a chart showing the contrast between the legacy mindset and the zero trust mindset. Companies selling traditional solutions have no interest in disrupting the market because they can simply create another point product to address the next problem. Another product equals another sale, including fees for upgrades and maintenance- and the cycle is perpetuated.

Many companies have invested so much in point security and networking products that it's not easy for them to try something new, even if the benefits are measurable and significant. Zero trust represents a departure from long-standing norms, and a journey into unfamiliar territory.

When trying to change culture and mindset, it can be useful to use the analogy of embracing cloud-hosted applications. This usually begins with a lift-and-shift approach (moving data center apps into the public cloud), and ultimately ends with building cloud-native applications and adopting SaaS. This process was daunting at first, but it is now mainstream.

A similar shift in mindset is needed when transforming network and security. That which can be implemented in the cloud must be, for both operational and scale benefits. That which can remove the inherent security risks in legacy architectures, a pillar of zero trust, must be embraced as well.

While changing business culture and mindset is difficult, CXOs are leaders by nature and have the benefit of implementing a top-down approach. For example, changing KPIs and incentive structures may nudge their teams toward accepting a new way of thinking.

Organizational Structure

Traditionally, organizational structures within IT tend to be siloed in nature and aligned along functional responsibilities (e.g., network, security, and application). Daily operations among these groups are not particularly aligned:

a) The network team's remit is to provide fast and reliable connectivity to resources.

b) The security team's function is to provide security and controlled access to the same resources.
c) The application team's goal is to ensure employees' application usage is optimal for the business.

While each of these goals sometimes seems at odds with one another, the ultimate goal of all of these parties is the same: ensuring employees have fast, reliable, and secure use of business resources. Zero trust architecture is a key enabler of this unified goal.

Zero trust optimizes the efforts of various IT teams by allowing them to work together. A few examples of cross-functional collaboration include zero trust connectivity and application access policies:
a) While security often takes the lead in operating ZTA, network and security must work together on the architecture. Zero trust control is provided via a security cloud. Therefore, network teams working closely with security are critical to ensure the connectivity of users, branches, things, or workloads to the service edge.
b) Additionally, the ownership of the hardware-based security stack that typically fell to the network infrastructure team now becomes a joint effort when migrated into a cloud-based ZTA. Configuration of the service edge now falls to both network and security.
c) User access policy is set from a user-to-app perspective and no longer at the network level. This means application teams working closely with security are responsible for setting the granular access policy that ZTA allows.

Figure 43:
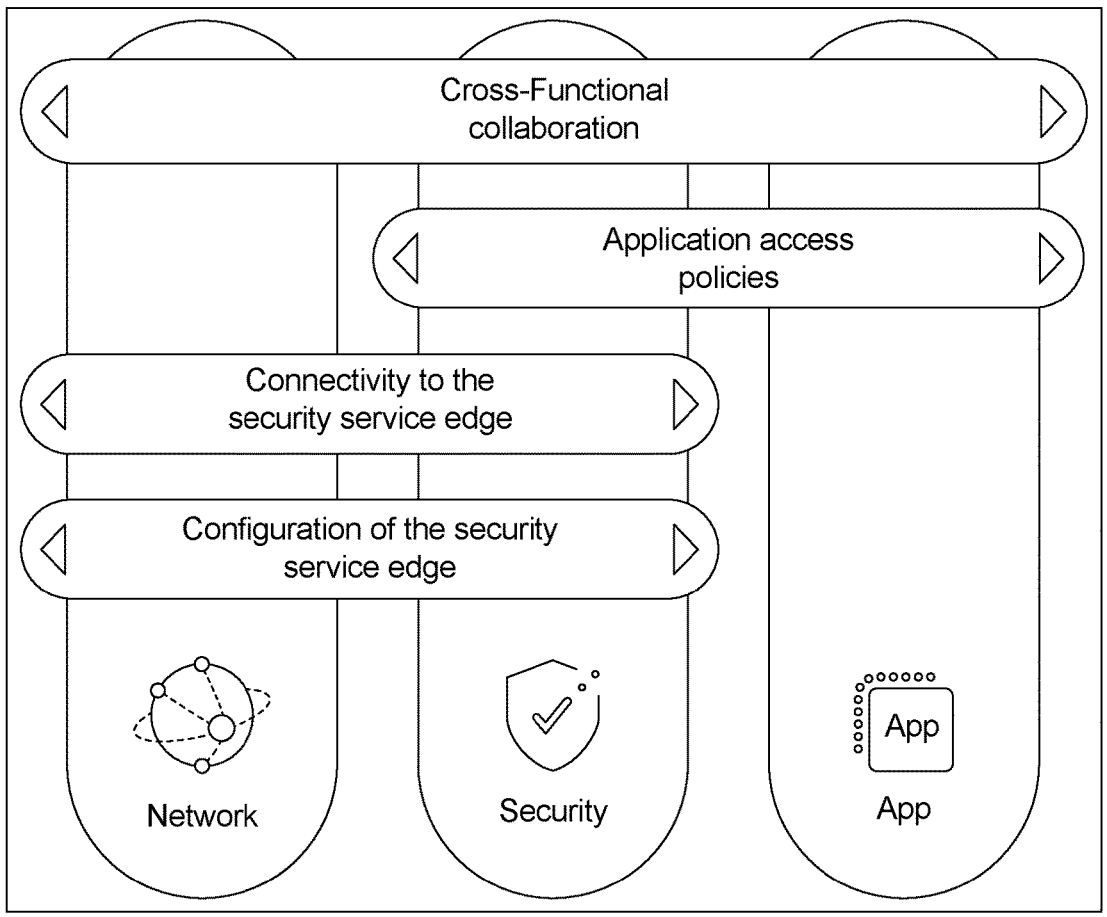
FIG. 43 is a diagram illustrating zero trust transformation that may include cross-functional collaboration between traditionally siloed disciplines.

FIG. 43 is a diagram illustrating zero trust transformation that may include cross-functional collaboration between traditionally siloed disciplines. CXOs can consider creating zero trust team structures (that have representatives across teams), and realigned KPIs or incentive structures. All of these techniques can encourage cross-functional collaboration.

Processes

Moving to zero trust architecture can greatly simplify cumbersome manual processes. As with any transformation, adopting zero trust technology requires processes to be rethought to ensure both the deployment and operationalization of zero trust technology take advantage of the desired security and network benefits.

Figure 44:
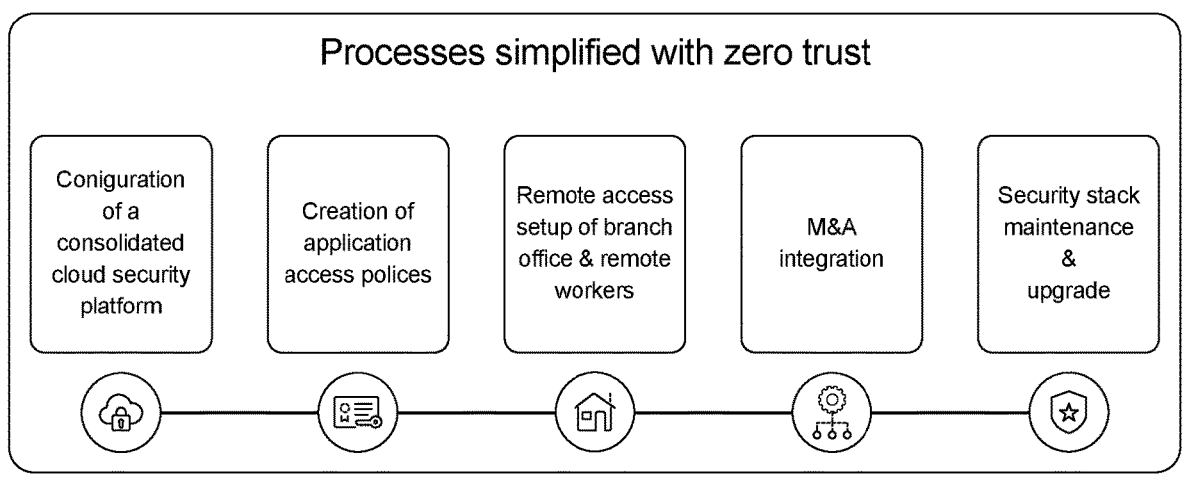
FIG. 44 shows how zero trust simplifies several critical business processes.

Under a ZTA, there are far fewer disparate systems to manage. This leads to reduced complexity, including the following:
Being able to segment apps by simple identity-based rules, not by manually intensive network-based configurations
Leveraging a cloud-based intelligence engine to simplify updating threat intelligence or data classification rules
Visibility into app access and usage leading to insights that can improve workflows and processes FIG. 44 shows how zero trust simplifies several critical business processes. Specifically, there may be five key areas where a ZTA can simplify existing processes:
1) Configuration of a Consolidated Cloud Security Platform ZTA removes much of the configuration required by network level controls. Network layer segmentation rules, done through VLANs and ACLs, are now done at the user-to-app level through logical policies (only Department X can access Application Y). Other configurations are greatly simplified. For example, DLP, firewalls, SWGs, etc., performed on hardware-based appliances procured from a variety of vendors (each with its own UI), are now centrally consolidated on a cloud security platform. A single UI from a single vendor yields significant advantages by removing the many processes required to maintain individual security point solutions.
2) Creation of Application Access Policies Zero trust eliminates many network layer processes while introducing the initial setting and upkeep of granular application segmentation policies. These policies govern which users can access specific resources. Shifting from network level to app-based requires some investigative work. Processes must be initiated to discover who needs to connect to what so that proper policies can be set. There will also need to be procedures to change these policies if they are too stringent or lenient, or when user requests come in.

Zero trust solutions simplify this process by revealing application flows and making policy recommendations. This process extends to understanding identity (as defined by the IdP), user context, and user risk. These factors will influence the type of access granted to a connection (e.g., allow, isolate, warn and allow, etc.).
3) Remote Access Setup of Branch Office and Remote Workers Processing the configuration of a branch or remote worker also changes in a zero trust architecture. A single agent sitting on the end user's device facilitates all secure connectivity (through the zero trust cloud). Any network-layer configuration, other than basic routing, goes away, as does the need for branch office firewalls or other security stacks. Under certain configurations, there may be a need to configure a GRE or IPSec tunnel to forward traffic to the zero trust edge, but all other functions are handled by the security cloud.

Setting up remote workers is also greatly simplified. The same always-on agent secures access for remote and mobile users (based on user-to-app policy). The agent intelligently forwards internal and external traffic through the appropriate controls. This eliminates the complex processes needed to deploy, maintain, and write configurations for VPNs.
4) M&a Integration The IT process that accompanies a merger and acquisition (or divestiture) can be daunting, given the complexities of integrating disparate network stacks, with their unique addressing and laden with technical debt. A ZTA greatly simplifies M&A integration, since the network is abstracted-all integration happens at the application level. This allows users to access applications without ever having to integrate at the network layer.
5) Security Stack Maintenance and Upgrade Processes to maintain and upgrade a hardware-based security stack can be cumbersome, especially given recent supply chain issues. A cloud-based zero trust provider can replicate the same security stack functions, infrastructure maintenance, and upgrades. Just the configuration and underlying network connectivity to the security cloud is required by the organization.

Skill Sets

While moving to zero trust architecture can greatly simplify the many manual tasks that IT personnel have to manage, it does require that such personnel have a different skill set from traditional network and security engineers, architects, etc. Essentially, network and security personnel are being asked to convert to a zero trust way of thinking, which will upend many of the skills they may have spent years or decades mastering.

The number of required vendor-specific skills diminishes as tasks are consolidated on a zero trust platform. Network and security personnel will need to refocus their training on the operational skills needed for a smaller set of ecosystem vendors.

As a result, some of the certifications championed by hardware-based vendors become less meaningful. In their place, professionals can pursue zero trust certifications offered by industry organizations, like the Cloud Security Alliance (CSA), or security vendors, like Zscaler's Zero Trust Certified Architect program.

A successful digital transformation cannot be achieved while using antiquated networking concepts, tiptoeing toward change, and avoiding risk. Thinking about enterprise security in terms of hub—and—spoke architecture and VPNs is taking a long journey down a dead-end path. There is only one network, the internet, and it is beyond the control of any business organization. In fact, maintaining secure access to cloud services via the internet is key to many organizations' survival. Legacy networks and the technologies that support them are simply incapable of providing the level of secure cloud access modern businesses need.

Figures 45, 46:
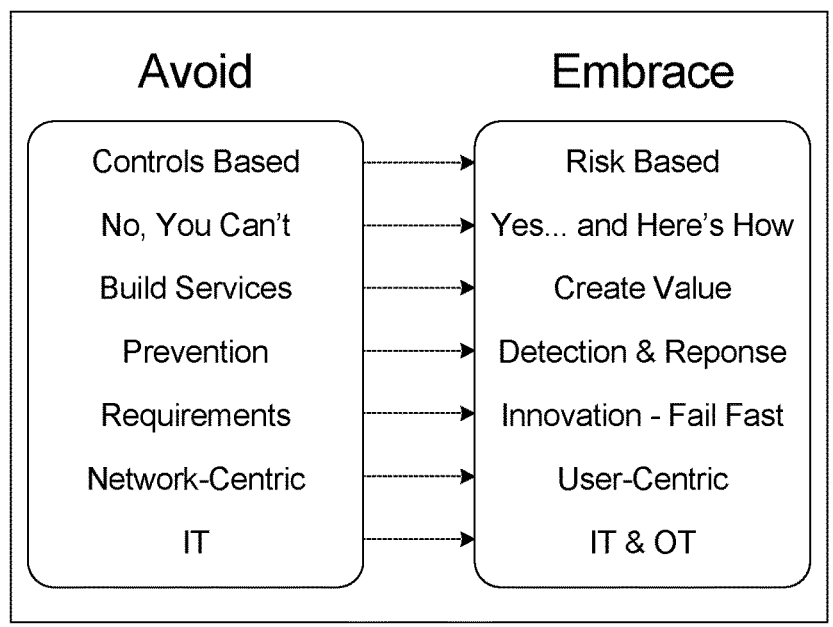
FIG. 45 is a table showing differences between yesterday's enterprise control framework and one facilitating secure cloud/mobile transactions today.
FIG. 46 is a chart showing some key ways IT leaders can reframe conversations on digital transformation to achieve better results.

FIG. 45 is a table showing differences between yesterday's enterprise control framework and one facilitating secure cloud/mobile transactions today. The differences between these two models should be evident to IT professionals, yet explaining them to other executives and the board can be tricky. Unfortunately, many security leaders are overly technical when having conversations on why their organization must digitally transform. They rely on doom-and-gloom scenarios and hypothetical attack costs to persuade their audience. Instead, IT leaders should ensure their message focuses on adding business value and highlights the immediate benefits of doing things a new way.

FIG. 46 is a chart showing some key ways IT leaders can reframe conversations on digital transformation to achieve better results. Successful CIOs, CTOs, and CISOs of tomorrow will approach technology problems much differently than those who currently think in terms of traditional networks. Specifically, forward-looking CIOs/CTOs may wish to:

focus on growth and move fast-speed is the new currency
move from being an IT shop to acting as a digital enabler
be honest with the board about technology debt
address the legacy environment head-on
embrace the cloud, but thoughtfully, for relevant applications
realize the internet is the new corporate network
transform traditional hub—and—spoke networks to a direct-to-cloud architecture Likewise, successful CISOs may wish to:
stop talking to the board in terms of security, but instead focus on risk
create a risk assessment and risk appetite that provides the business a means to make decisions
separate critical resources from the consumers of those assets (don't put users and servers on the same network)
get identity right—invest in identity and access management
realize securing the traditional network is no longer relevant and focus on providing trusted users access to authorized applications, irrespective of the network Business and technology are not slowing down. Today's executives face a simple choice: climb aboard the train to a cloud-based, zero trust world or be crushed by it. Technology leaders should be thinking, speaking, and acting in terms of business risk, not security. No combination of products can address the fundamental vulnerabilities endemic to the traditional network. Adding more security layers on top of an insecure foundation is pointless-those scrambling to protect everything wind up protecting nothing.

It is time to retire the network in favor of app-based and user-based connectivity. To accomplish this, an organization must know the identity of people, devices, machines, and APIs. Once an organization can securely connect a trusted user to an authorized resource, the network layer (and all of its vulnerabilities) becomes largely irrelevant.

What to Look for in a Zero Trust Solution

Zero trust architecture is part of a transformation journey that involves both technology and non-technology factors. The technology aspect of the zero trust journey requires the careful selection of a solution that accomplishes the goals of network and security transformation. When selecting a solution to embrace a zero trust architecture, there are several pitfalls to avoid.

Figure 47:
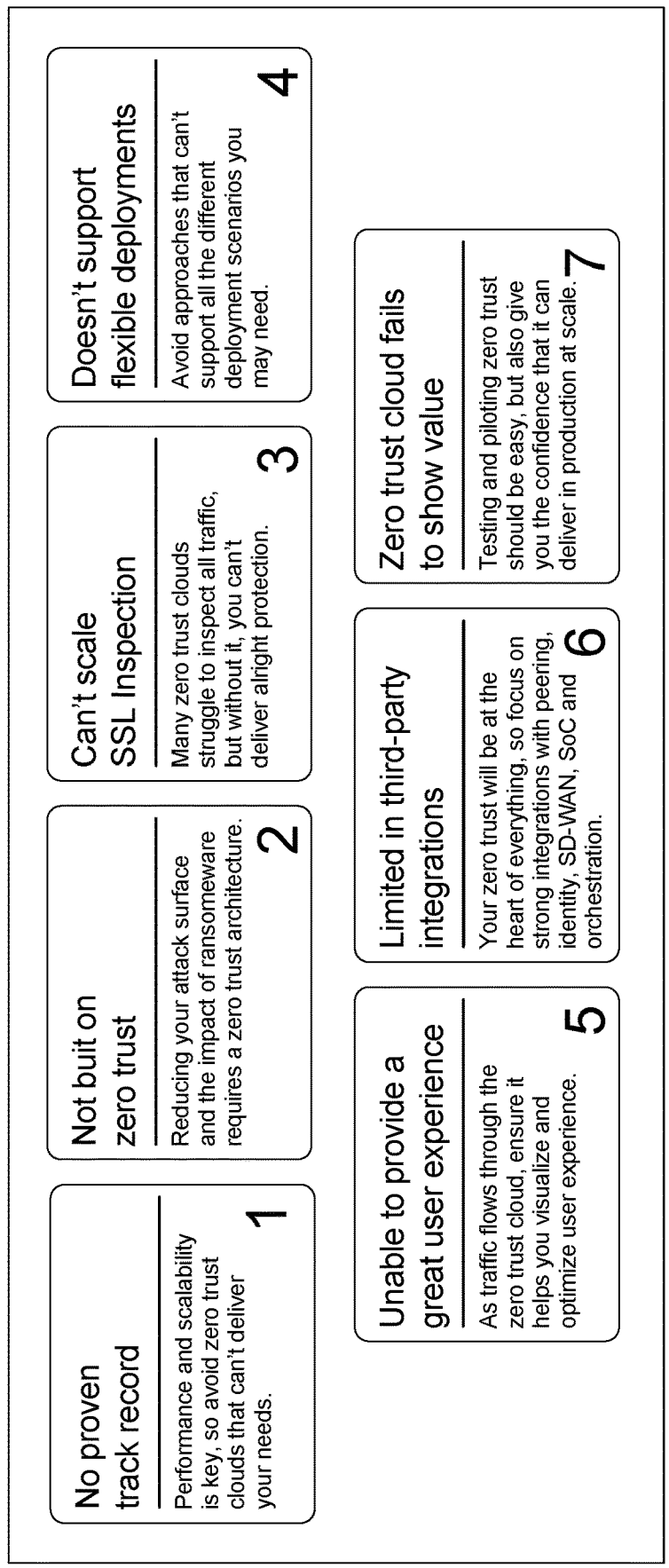
FIG. 47 is a chart showing some pitfalls that a network operator may want to avoid when choosing a zero trust solution for their network.

FIG. 47 is a chart showing some pitfalls that a network operator may want to avoid when choosing a zero trust solution for their network. When selecting a solution to embrace a zero trust architecture, there are several pitfalls to avoid. Instead, organizations should focus on vendors who excel in seven key areas of successful digital transformation. Each of these seven factors is described in its own section below.

Zero Trust Methodology

Figure 48:
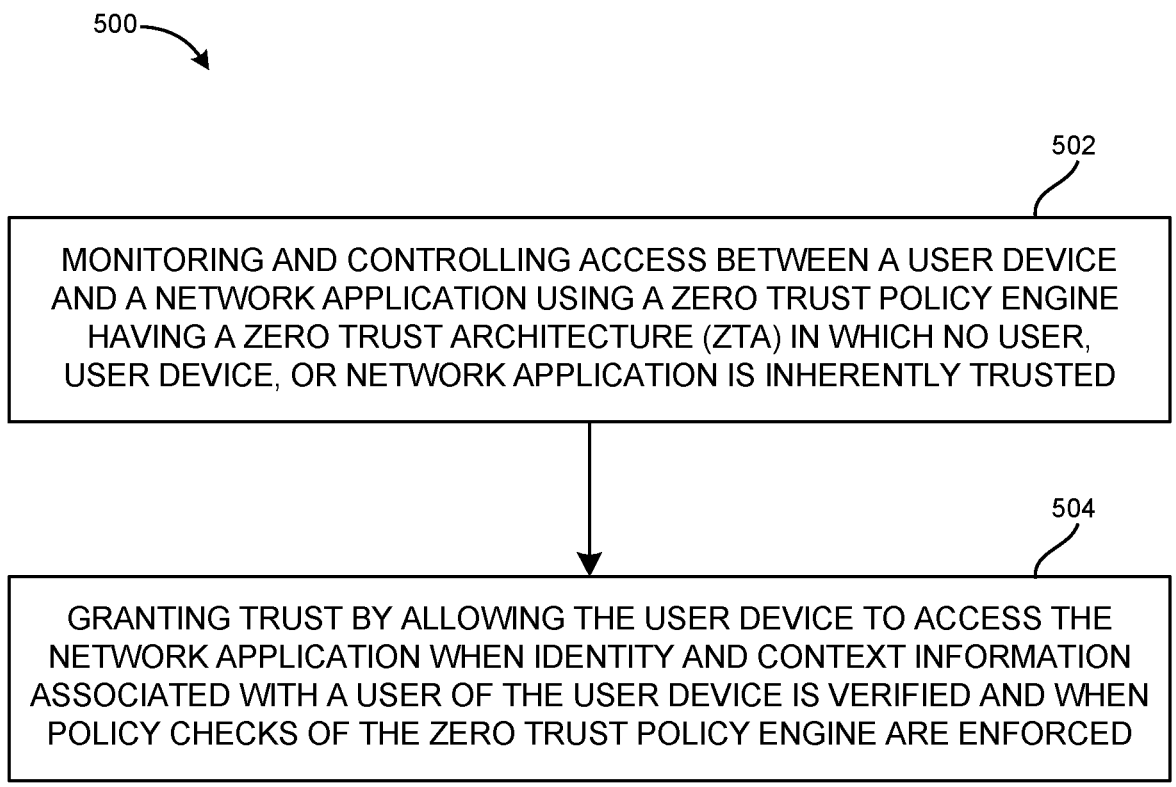
FIG. 48 is a flow diagram illustrating a method for implementing zero trust policies as described in the present disclosure.

FIG. 48 is a flow diagram illustrating a method 500 for implementing zero trust policies as described in the present disclosure. In some respects, the method 500 is a generalized procedure. The method 500 may be instantiated in any suitable manner in any network or system (e.g., cloud-based system 100), one or more of the enforcement nodes 150 shown in FIG. 2, the memory 210 of the server 200 shown in FIG. 4, any non-transitory computer-readable media, etc. The method 500 may be implemented in hardware, software, and/or firmware and distributed accordingly to monitor and control access between 1) any (or all) user devices and 2) any (or all) applications, databases, file sharing storage devices, etc. of a heterogeneous network, sub-network, or domain.

As shown in FIG. 48, the method 500 includes the step of monitoring and controlling access between a user device and a network application using a zero trust policy engine having a Zero Trust Architecture (ZTA) in which no user, user device, or network application is inherently trusted, as indicated in block 502. The method also includes the step of granting trust by allowing the user device to access the network application when identity and context information associated with a user of the user device is verified and when policy checks of the zero trust policy engine are enforced, as indicated in block 504.

In some embodiments, the zero trust policy engine may be configured to act as an inline switchboard controller (e.g., similar to the analogy shown in FIG. 11) for monitoring and controlling the access from an inline perspective communicatively positioned between the user device and the network application. The zero trust policy engine may be configured to control access of the user device by limiting visibility of the network. The zero trust policy engine may include multiple instantiations configured as enforcement nodes distributed through a network in which the user device and network application are operating. For example, each enforcement node may be configured to monitor and control access by one or more user devices.

The step of verifying the identity and context information associated with the user (block 504) may further include verifying identity information about both the user and the user device and also verifying context information about how the user device is being used to connect to the network application. The method 500 may further include the steps of a) measuring and controlling risk based on a dynamic risk score calculated in response to verifying the identity and context of the user and user device, and b) enforcing the policy checks of the zero trust policy engine policy based on the dynamic risk score to determine whether to block or allow the user device to access the network application.

According to some embodiments, the step of granting trust (block 504) may include allowing the user device to limited access to the network application or a network file sharing storage medium. The zero trust policy engine, for example, may be part of a security-as-a-service system or cybersecurity system. In some cases, the method may include the step of controlling risk by one or more of a) preventing data compromise, b) preventing data loss, c) detecting and preventing threat, and d) detecting and preventing intrusion. This step of controlling risk may include one or more of a) inspecting inbound and outbound traffic to prevent malware execution and data loss, and b) using adaptive controls based on changes in behavior or context.

The step of enforcing policy checks, as described with respect to block 504, may include one or more functions of Allow, Block, Caution, Isolate and Stream Pixels, Prioritize, and Deceive. The zero trust policy engine may include a proxy architecture that is independent of pass-through functionality, such as systems associated with firewalls and Virtual Private Networks (VPNs). The zero trust policy engine may be incorporated in a Security Service Edge (SSE) framework (e.g., as described with respect to FIG. 14), which may include one or more of Secure Web Gateway (SWG), ZTNA, CASB, FWaaS, browser isolation, sandboxing, SSL inspection, and threat protection. The zero trust policy engine may also be incorporated in one or more of a Work From Anywhere (WFA) system, WAN transformation system, and/or secure cloud migration system (e.g., as described with respect to FIG. 16).

Upon detection of a request by the user device to download sensitive data from a network resource (e.g., as described with respect to FIGS. 18 and 20), the method 500 may further include the steps of a) pixelating the sensitive data, and b) streaming the pixelated sensitive data from the network resource to the user device. In response to receiving a merge request related to the merging of two or more companies each having a heterogeneous network (e.g., as described with respect to FIG. 21), the method 500 may further include the step of seamlessly integrating the heterogeneous networks using application-based or connection-based segmentation to enable users associated with any of the two or more companies to access network applications from any of the heterogeneous networks of the merged companies. Furthermore, in some embodiments, the method 500 may further include the steps of 1) obtaining security-related information associated with one or more of a) operations and results of the zero trust policy engine, b) applicable networks, c) applicable users, d) applicable user devices, e) accessed network applications, and f) accessed data, and 2) displaying the security-related information on one or more dashboards or user interfaces associated with a network administrator.

Fully Addressing the Specific Needs of an Enterprise

A successful zero trust solution scales for business needs today and, more importantly, for its future goals. Scalability is not simply the mechanism to build out, but to address enterprise needs without sacrificing the function, stability, and protection of the business. The zero trust solution should preferably be configured to:
  provide evidence and transparency of its global cloud deployment
  have documented and validated SLAs for its zero trust services have a history of deploying several customer organizations of relevant size and complexity
  deliver all critical functions to all sites without backhauling or hairpinning traffic
  provide inline and out-of-band protection
  offer solutions designed for operational and functional resilience Core Zero Trust Tenants Protecting an enterprise and its users must be approached in a way that delivers access on a need-to-know, least-privileged basis. It is imperative to separate the jargon and marketing hype of "zero trust" from the core functionality that defines the term. To this end, a true zero trust foundation should preferably be configured to:
  protect all enterprise services by validating the identity of the entities before allowing conditional access; everything else must be blocked
  check various contexts such as device posture, user risk, etc.
  connect users to specific applications, not the network
  be network-agnostic and eliminate routable networks eliminate the attack surface for internal application Cloud-Native Infrastructure Recent industry reports indicate that 85% of cyberattacks come through encrypted channels. This makes the ability to inspect encrypted traffic critical for organizations. Inspecting this traffic at scale, with minimal latency, requires leveraging the power of the cloud. Only zero trust solutions with properly optimized cloud-native architecture can be configured for:
  inspection of all traffic at production scale with minimal impact on performance, based on a proxy architecture
  a single memory scan architecture for decryption at scale
  the experience to guide customers through the steps and challenges of performing SSL/TLS inspection Flexible, Diverse, and Scalable Flexible, diverse, and scalable zero trust deployment options provide organizations with all the benefits of zero trust, regardless of geographic location. In other words, security must extend to every user, app, and resource no matter where they are. Look for vendors offering solutions that are configured to:
  be managed from a central control plane with corporate policies applied evenly and dynamically across all users/devices or IoT/OT communications
  extend the same protections to managed and unmanaged/BYOD devices, facilitating third-party access for contractors and remote employees without increasing the attack surface
  provide workload-to-workload security that affords DevOps and CloudOps engineers the same zero trust protections for their applications when accessing other workloads, other clouds, or the internet Optimal End-User Experience The success of any transformation, be it digital, network, or security, is driven by the end-user experience. The ultimate goal of any zero trust project is to improve end-user experience while reducing threat exposure and increasing security. Therefore, a network operator may look for a zero trust solution that is configured to:

optimizes the user experience and uses a proactive approach to measure and diagnose problems collect metrics from applications, endpoints, and network layers to find anomalies and provide root cause analysis be provided by a zero trust vendor who provides minimal hops between their cloud and popular destinations (e.g., Microsoft 365) to minimize latency Strong Ecosystem Integrations Vendors that cobble together a zero trust solution portfolio through acquisitions tend to fall behind in product innovation and often lack interoperability with third parties. Look for zero trust vendors that integrate with leading ecosystem players (like CSPs, SD-WAN, IAM, SOAR/SIEM, EDR, etc.), future-proof their technology, and reduce technical debt. Zero trust vendors who offer rich, API-based, third-party integrations provide operational efficiencies by allowing organizations to orchestrate best-of-breed solutions and avoid vendor lock-in.

Easy to Pilot and Deploy

Performing a pilot will determine whether a zero trust solution is easy to deploy, performs well in the production environment, and achieves business objectives. A network operator may look for:

zero trust vendors that can demonstrate a low TCO, a single unified agent, access to a global set of service edges, and a centralized and easy-to-use UI, indicating that maintaining the solution will be straightforward and cost-efficient zero trust architecture and design that makes it easy to add on features with minimal additional deployment requirements (like adding more agents or VMs), allowing organizations to take a phased approach to zero trust knowing that moving between phases will not require heavy lifts zero trust vendors with a positive track record of being customer-focused, and demonstrate this quality during the pilot Seven Answers Every CXO Should Know About Zero Trust In summary, let's take a look at the seven questions every CXO needs to ask about zero trust and the key points in answering each of them.

Question 1—What is Zero Trust and why is it Critical for Secure Digital Transformation?

Cybersecurity must evolve to accommodate new technology and an increasingly distributed, remote, and mobile workforce. Securing employees using any device, working from anywhere, and accessing resources in data centers or the cloud requires a modern security framework. Traditional network topology and concepts do not work in a world where countless external actors, resources, and unmanaged devices regularly interact with business infrastructure.

Modern security requires removing the network from view and brokering a validated and enforced connection between participants—this is the basis of zero trust. When transactions only occur on a trusted, per-connection basis, the attack surface is minimized and potential damage from compromise is extremely limited. Additionally, using a cloud-based ZTA improves connection speeds, provides better visibility into operations, and saves businesses revenue by replacing outdated assets and processes.

Question 2—What are the Main Use Cases for Zero Trust?

Zero trust is a security architecture that is designed to protect businesses from cyber risks, improve productivity and agility, and minimize the cost and complexity of various security products. It has three main use cases: secure work from anywhere, WAN transformation, and secure cloud migration.

For secure work from anywhere, zero trust architecture provides secure and fast access to applications from any location and device, protecting employees, contractors, customers, and suppliers. It protects against cyber threats and data loss and can replace traditional VPNs and provide secure access for managed and unmanaged devices.

For WAN transformation, ZTA converts unsecured, routable, hub—and—spoke networks to true zero trust connectivity based on network overlays, while also improving the user experience by eliminating latency-inducing hairpinning. This WAN transformation works across different offices and branches, using connectivity mechanisms like zero trust SD-WAN.

For secure cloud migration, zero trust architecture ensures that workloads securely communicate with other workloads and the internet and ensures that those workloads are securely entitled and configured. A holistic ZTA environment can provide strong posture control, secure workload configuration, and safe workload communications.

Question 3—What are the Business Benefits of Moving to Zero Trust?

There are several business benefits to adopting zero trust architecture (ZTA), including technology cost savings, reduced risk, operational savings, and improved agility and productivity.

Technology cost savings can be achieved by consolidating vendor subscriptions and reducing the need for hardware infrastructure and bandwidth costs.

Risk reduction can be achieved by protecting against data breaches and insider threats, as well as improving compliance with regulatory requirements.

Operational savings can be achieved by streamlining processes, improving productivity, and reducing maintenance and support costs.

Improved agility and productivity can be achieved by enabling remote work, streamlined M&A integration, and allowing for innovative solutions. This includes improved end-user experiences by not requiring users to log into VPNs.

Question 4—how does Zero Trust Drive Success for Organizations?

Five case studies from various organizations highlighted how each used zero trust to drive success.

Embracing a zero trust cloud architecture let Coca-Cola Consolidated securely support their remote workforce without suffering productivity issues or exposing themselves to massive risks.

Sandvik found that ZTA worked seamlessly with their WFA policy, providing reliable and secure connections to their users and contractors around the globe.

Carlsberg Group achieved granular access control that improved visibility, enhancing several aspects of Carlsberg's business operations.

Cache Creek Casino Resort found that within three months, their zero trust provider inspected 1.7 TB of data, prevented 345,000 policy violations, and blocked 629 threats. The ability to easily work from anywhere has also improved the work environment for employees and allowed the company to broaden recruitment practices.

A US Federal civilian agency was able to retire a considerable amount of its legacy infrastructure by transitioning to a ZTA. Their improved connectivity in urban and rural areas has enhanced job performance and alleviated user frustration.

Question 5—how is Zero Trust Architecture Deployed and Adopted? What are Some Common Obstacles?

Implementing a zero trust architecture is a journey, so it is important to break the journey into manageable phases in order to show incremental business value. The journey can be divided into four phases:
1) Empowering and securing the workforce
2) Protecting data in the cloud
3) Enabling customers and suppliers
4) Modernizing IoT/OT security One way to start a zero trust journey is to protect strategic core business functions by allowing only verified entities access to verified and allowed destinations. Another approach is to protect data at rest by using ZTA to monitor and control access to data repositories. ZTA can also be used to secure remote access by redirecting this traffic through the security service edge. Finally, ZTA can be deployed to protect critical infrastructure by isolating and protecting sensitive systems from external threats.

Question 6—What are the Non-Technology Considerations for Successful Adoption of a Zero Trust Architecture?

Adopting zero trust architecture requires a transformation in both technology and non-technology areas:
Culture and mindset
Organizational structure
Processes
Skill sets These changes can be difficult to implement, particularly due to hardened cultural and mindset issues that may exist within the organization.

To successfully shift towards a zero trust culture and mindset, CXO leaders should adopt a top-down approach and consider changing KPIs and incentive structures. In addition, organizational structure and processes must be aligned with the zero trust philosophy, and the necessary skills must be developed within the organization. Finally, it is important to establish strong communication and collaboration among various teams and functions within the organization to ensure a successful transition to zero trust.

Question 7—What do I Look for (and not Look for) in a Zero Trust Solution?

A zero trust solution is an important part of a network and security transformation journey. When selecting a zero trust solution, it is important to consider the vendor's ability to address the specific needs of the enterprise, provide a true zero trust foundation, have a cloud-native infrastructure, offer flexible, diverse, and scalable deployment options, and optimize the end-user experience. It is also important to ensure the vendor has a global and diverse cloud deployment, documented and validated SLAs for their zero trust services, has deployed for customers of a similar size and complexity as the enterprise, and is designed for operational and functional resilience.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. Each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. As described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:
1. A method comprising the steps of:
monitoring and controlling access between a user device and a network application using a zero trust policy engine having a Zero Trust Architecture (ZTA) in which no user, user device, or network application is inherently trusted; and
granting trust by allowing the user device to access the network application when identity and context information associated with a user of the user device is verified and when policy checks of the zero trust policy engine are enforced,
wherein the zero trust policy engine is incorporated in a Security Service Edge (SSE) framework which includes one or more of Secure Web Gateway (SWG), Zero Trust Network Access (ZTNA), Cloud Access Security Broker (CASB), firewall as a service (FWaaS), browser isolation, sandboxing, Secure Sockets Layer (SSL) inspection, and threat protection.
2. The method of claim 1, wherein the zero trust policy engine is configured to act as an inline switchboard controller for monitoring and controlling the access from an inline perspective communicatively positioned between the user device and the network application.

3. The method of claim 2, wherein the zero trust policy engine is configured to control access of the user device by limiting visibility of a network in which the user device and network application are operating.

4. The method of claim 2, wherein the zero trust policy engine includes multiple instantiations configured as enforcement nodes distributed through a network in which the user device and network application are operating, each enforcement node configured to monitor and control access by one or more user devices.

5. The method of claim 1, wherein verifying the identity and context information associated with the user further includes verifying identity information about the user and the user device and verifying context information about how the user device is being used to connect to the network application.

6. The method of claim 5, further comprising the steps of:
measuring and controlling risk based on a dynamic risk score calculated in response to verifying the identity information and context information; and
enforcing the policy checks of the zero trust policy engine based on the dynamic risk score to determine whether to block or allow the user device to access the network application.

7. The method of claim 1, wherein the step of granting trust includes allowing the user device to access the network application or a network file sharing storage medium on a limited basis.

8. The method of claim 1, wherein the zero trust policy engine is part of a security-as-a-service system or cybersecurity system.

9. The method of claim 1, further comprising the step of controlling risk by one or more of a) preventing data compromise, b) preventing data loss, c) detecting and preventing threat, and d) detecting and preventing intrusion.

10. The method of claim 9, wherein the step of controlling risk includes one or more of a) inspecting inbound and outbound traffic to prevent malware execution and data loss, and b) using adaptive controls based on changes in behavior or context.

11. The method of claim 1, wherein enforcing policy checks includes one or more functions of Allow, Block, Caution, Isolate and Stream Pixels, Prioritize, and Deceive.

12. The method of claim 1, wherein the zero trust policy engine includes a proxy architecture independent of pass-through functionality associated with firewalls and Virtual Private Networks (VPNs).

13. The method of claim 1, wherein the zero trust policy engine is incorporated in one or more of a Work From Anywhere (WFA) system, WAN transformation system, and/or secure cloud migration system.

14. The method of claim 1, wherein, upon detection of a request by the user device to download sensitive data from a network resource, the method further comprises the steps of:
pixelating the sensitive data; and
streaming the pixelated sensitive data from the network resource to the user device.

15. The method of claim 1, wherein, in response to receiving a merge request related to a merging event associated with two or more companies each having a heterogeneous network, the method further comprises the step of seamlessly integrating the heterogeneous networks using application-based or connection-based segmentation to enable users associated with any of the two or more companies to access network applications from any of the heterogeneous networks of the merged companies.

16. The method of claim 1, further comprising the steps of:
obtaining security-related information associated with one or more of a) operations and results of the zero trust policy engine, b) applicable networks, c) applicable users, d) applicable user devices, e) accessed network applications, and f) accessed data; and
displaying the security-related information on one or more dashboards or user interfaces associated with a network administrator.

17. A method comprising the steps of:
monitoring and controlling access between a user device and a network application using a zero trust policy engine having a Zero Trust Architecture (ZTA) in which no user, user device, or network application is inherently trusted; and
granting trust by allowing the user device to access the network application when identity and context information associated with a user of the user device is verified and when policy checks of the zero trust policy engine are enforced, wherein enforcing policy checks includes one or more functions of Allow, Block, Caution, Isolate and Stream Pixels, Prioritize, and Deceive.

18. The method of claim 17, wherein the zero trust policy engine is configured to act as an inline switchboard controller for monitoring and controlling the access from an inline perspective communicatively positioned between the user device and the network application.

19. A method comprising the steps of:
monitoring and controlling access between a user device and a network application using a zero trust policy engine having a Zero Trust Architecture (ZTA) in which no user, user device, or network application is inherently trusted;
granting trust by allowing the user device to access the network application when identity and context information associated with a user of the user device is verified and when policy checks of the zero trust policy engine are enforced; and
in response to receiving a merge request related to a merging event associated with two or more companies each having a heterogeneous network, seamlessly integrating the heterogeneous networks using application-based or connection-based segmentation to enable users associated with any of the two or more companies to access network applications from any of the heterogeneous networks of the merged companies.

20. The method of claim 19, wherein the zero trust policy engine is configured to act as an inline switchboard controller for monitoring and controlling the access from an inline perspective communicatively positioned between the user device and the network application.

* * * * *